US009665471B1

(12) United States Patent
Bienkowski et al.

(10) Patent No.: US 9,665,471 B1
(45) Date of Patent: *May 30, 2017

(54) PROGRAM CODE INTERFACE FOR PROVIDING PROGRAM CODE AND CORRESPONDING RESULTS OF EVALUATING THE PROGRAM CODE

(71) Applicant: The MathWorks, Inc., Natick, MA (US)

(72) Inventors: Joseph R. Bienkowski, Ashland, MA (US); Claudia G. Wey, Wayland, MA (US); Michelle D. Erickson, Watertown, MA (US); Benjamin V. Hinkle, Brookline, MA (US); Jared D. MacDonald, Cambridge, MA (US); John E. Booker, Natick, MA (US); Amit Mahajan, Natick, MA (US); Rohit J. Girme, San Jose, CA (US)

(73) Assignee: The MathWorks, Inc., Natick, MA (US)

( * ) Notice: Subject to any disclaimer, the term of this patent is extended or adjusted under 35 U.S.C. 154(b) by 72 days.

This patent is subject to a terminal disclaimer.

(21) Appl. No.: 14/733,522

(22) Filed: Jun. 8, 2015

Related U.S. Application Data

(63) Continuation of application No. 14/059,872, filed on Oct. 22, 2013, now Pat. No. 9,053,235.

(51) Int. Cl.

| | |
|---|---|
| *G06F 9/44* | (2006.01) |
| *G06F 11/36* | (2006.01) |
| *G06F 3/0484* | (2013.01) |

(52) U.S. Cl.
CPC ........ *G06F 11/3664* (2013.01); *G06F 3/0484* (2013.01); *G06F 11/3668* (2013.01)

(58) Field of Classification Search
CPC .................................................. G06F 11/3664
(Continued)

(56) References Cited

U.S. PATENT DOCUMENTS 5,317,740 A 5/1994 Sites
5,339,428 A 8/1994 Burmeister et al.
(Continued)

OTHER PUBLICATIONS

Dyer et al, "A Decision Tree-based Approach to Dynamic Pointcut Evaluation", ACM, pp. 1-10, 2008.*
(Continued)

*Primary Examiner* — Anil Khatri
(74) *Attorney, Agent, or Firm* — Harrity & Harrity, LLP

(57) ABSTRACT

A device may receive an indication to evaluate a first portion of program code and a second portion of program code provided in a first section of a user interface. The device may evaluate the first portion of program code and the second portion of program code. The device may generate a first result corresponding to the first portion of program code and may generate a second result corresponding to the second portion of program code based on evaluating the first portion of program code and the second portion of program code. The device may provide the first result and the second result in a second section of the user interface. The second section may be separate from the first section. The device may provide a correspondence indicator that indicates a correspondence between the first result and the first portion of program code.

20 Claims, 44 Drawing Sheets

(58) Field of Classification Search
USPC .................................................. 717/123–129
See application file for complete search history.

(56) References Cited

U.S. PATENT DOCUMENTS

| | | | | |
|---|---|---|---|---|
| 5,842,017 | A * | 11/1998 | Hookway | G06F 8/52 712/E9.037 |
| 6,263,489 | B1 | 7/2001 | Olsen et al. | |
| 6,282,701 | B1 * | 8/2001 | Wygodny | G06F 11/3466 702/183 |
| 6,915,509 | B1 | 7/2005 | Chkodrov et al. | |
| 7,020,852 | B2 | 3/2006 | Oeltjen et al. | |
| 7,055,140 | B2 * | 5/2006 | Bystricky | G06F 11/3644 712/227 |
| 7,058,928 | B2 | 6/2006 | Wygodny et al. | |
| 7,146,613 | B2 | 12/2006 | Chauvel et al. | |
| 7,171,655 | B2 | 1/2007 | Gordon et al. | |
| 7,343,588 | B2 | 3/2008 | Bates et al. | |
| 7,496,906 | B2 * | 2/2009 | Black-Ziegelbein | G06F 11/3624 717/124 |
| 7,669,188 | B2 * | 2/2010 | Nickell | G06F 8/72 714/19 |
| 7,685,570 | B2 | 3/2010 | Draine et al. | |
| 7,913,232 | B2 * | 3/2011 | Erkkinen | G06F 11/3672 717/125 |
| 7,917,894 | B2 | 3/2011 | Chen et al. | |
| 8,079,019 | B2 | 12/2011 | Lindo et al. | |
| 8,104,021 | B2 | 1/2012 | Erlingsson et al. | |
| 8,146,058 | B2 | 3/2012 | Sarkar et al. | |
| 8,296,738 | B1 * | 10/2012 | Kiel | G06F 11/3624 717/125 |
| 8,312,435 | B2 | 11/2012 | Wygodny et al. | |
| 8,365,149 | B2 * | 1/2013 | Frank | G06F 8/44 717/125 |
| 8,392,885 | B2 | 3/2013 | Stall et al. | |
| 8,593,703 | B2 | 11/2013 | Kort | |
| 8,595,703 | B2 * | 11/2013 | van Gogh | G06F 11/3604 714/38.1 |
| 8,601,442 | B2 * | 12/2013 | Shafi | G06F 11/323 717/125 |
| 8,640,086 | B2 * | 1/2014 | Bonev | G06F 9/4443 717/105 |
| 8,640,100 | B2 * | 1/2014 | Neumann | G06F 8/34 717/104 |
| 8,656,351 | B2 | 2/2014 | Kodosky et al. | |
| 8,689,188 | B2 * | 4/2014 | Bassin | G06F 11/3672 702/182 |
| 8,762,956 | B1 * | 6/2014 | Simoneau | G06F 17/2229 717/125 |
| 8,799,871 | B2 | 8/2014 | Baker | |
| 8,863,085 | B1 | 10/2014 | Stahlberg | |
| 8,893,084 | B2 * | 11/2014 | Parker | G06F 9/4443 345/619 |
| 8,935,673 | B1 * | 1/2015 | Ashkenazi | G06F 11/3612 702/186 |
| 9,053,235 | B1 | 6/2015 | Bienkowski et al. | |

OTHER PUBLICATIONS

Reps et al, "Intermediate-Representation Recovery from Low-Level Code", ACM, pp. 100-111, 2006.*

Yin et al, "A Fine-Grained Debugger for Aspect-Oriented Programming" ACM, pp. 59-70, 2012.*

Strecker et al, "Accounting for Defect Characteristics in Evaluations of Testing Techniques" ACM Transactions on Software Engineering and Methodology, vol. 21, No. 3, Article 17, pp. 1-43, 2012.*

Daniel et al, Automated GUI Refactoring and Test Script Repair:, ACM, pp. 38-41, 2011.*

Ganov et al, "Test Generation for Graphical User Interfaces Based on Symbolic Execution", ACM, pp. 33-40, 2011.*

Jelinek et al, "GUI Generation from Annotated Source Code", ACM, pp. 129-136, 2004.*

Xie et al, "Smart: A Tool for Application Reference Testing", ACM, pp. 537-538, 2007.*

Chang, "Using Graphical Representation of User Interfaces as Visual References", ACM, pp. 27-30, 2011.*

Ficco et al., "Bug Localization in Test-Driven Development", Hindawi Publishing Corporation, Advances in Software Engineering, vol. 2011, Article ID 492757, 2011, 18 pages.

Fontana et al., "Impact of Refactoring on Quality Code Evaluation", ACM, pp. 37-40, 2011.

DiGiuseppe, "Automatically Describing Software Faults", ACM, pp. 711-714, 2013.

Fontana et al., "Investigating the Impact of Code Smells Debt on Quality Code Evaluation", IEEE, pp. 15-22, 2012.

* cited by examiner

700 →

TECHNICAL COMPUTING ENVIRONMENT (TCE 220)     _ □ x

File   Edit   Tools   View   Evaluate   Execute   Debug   Help

↑
705

| Code Editor Window | _ □ x |

```
x = [1 2, 3 4, 5 6]
```
← 710

```
plot(x)
y = 4
z = sqrt(x, y)
help(sqrt)
```

| Code Evaluation Window | _ □ x | x =

| 1 | 2 |
|---|---|
| 3 | 4 |
| 5 | 6 | plot(x)

y = 4

Error in "z=sqrt(x, y)": Too many input arguments

Help(sqrt): The sqrt function returns the square root of a single input argument. <u>Hyperlink</u>

TECHNICAL COMPUTING ENVIRONMENT (TCE 220)

File | Edit | Tools | View | Evaluate | Execute | Debug | Help

Code Editor Window

```
a = 1
b = 2
c = 3
d = 4
e = 5
x = [1 2, 3 4, 5 6]    ← 750
plot(x)
y = 4
z = sqrt(x, y)
help(sqrt)
help(func)
help(math)
```

Code Evaluation Window

```
a = 1
b = 2
c = 3
d = 4
e = 5 x =  | 1 | 2 |
     | 3 | 4 |
     | 5 | 6 |
```

TECHNICAL COMPUTING ENVIRONMENT (TCE 220)

File  Edit  Tools  View  Evaluate  Execute  Debug  Help

Code Editor Window

```
x = [1 2, 3 4, 5 6]

plot(x)

y = 4 z = sqrt(x, y)

help(sqrt)

For i = 1 to 10
    y = y + i
    plot(y, 1)
End
```

1010
1020
1030

Code Evaluation Window plot(x)

y = 4

Error in "z=sqrt(x, y)": Too many input arguments

Help(sqrt): The sqrt function returns the square root of a single input argument. Hyperlink i = | 1 | 2 | 3 | 4 | 5 | 6 | 7 | 8 | 9 | 10 |
y = | 5 | 6 | 7 | 8 | 9 | 10 | 11 | 12 | 13 | 14 |

1040 plot(y, 1)

1050

Technical Computing Environment (TCE 220)

File  Edit  View  Tools  Evaluate  Execute  Debug  Help

Code Editor Window

```
for i = 1 to 2
   for j = 1 to 3
      k = [i, j];
      disp(k)
      disp('Hello!')
   end
end
```

Code Evaluation Window k = [1, 1]
Hello!
k = [1, 2]
Hello!
k = [1, 3]
Hello!
k = [2, 1]
Hello!
k = [2, 2]
Hello!
k = [2, 3]
Hello!

1060

1000

```
TECHNICAL COMPUTING ENVIRONMENT (TCE 220)
File  Edit  Tools  View  Evaluate  Execute  Debug  Help
```

Code Editor Window

```
for i = 1 to 2
    for j = 1 to 3
        k = [i, j];
        disp(k)
        disp('Hello!')
    end
end
```

Code Evaluation Window

Select i:  | 1 | 2 |

Select j:  | 1 | 2 | 3 |

1070 k = [2, 1]

1080

Hello!

1090

TECHNICAL COMPUTING ENVIRONMENT (TCE 220)

File  Edit  Tools  View  Evaluate  Execute  Debug  Help

Code Editor Window

```
x = [1 2 3 4, 5 6]
plot(x)
y = 4
z = sqrt(x, y)
help(sqrt)
For i = 1 to 10
    y = y + i
    plot(y, 1)
End
y = y * y
```

Code Evaluation Window

1202 — x =
| 1 | 2 |
|---|---|
| 3 | 4 |
| 5 | 6 |

1204 — plot(x)

1206 — y = 4

1208 — Error in "z=sqrt(x, y)": Too many input arguments

1210 — Help(sqrt): The sqrt function returns the square root of a single input argument. Hyperlink

Configuration Parameter Options

Size of Inactive Results

Smaller ← → Larger

Not visible    Same size as active results

1218

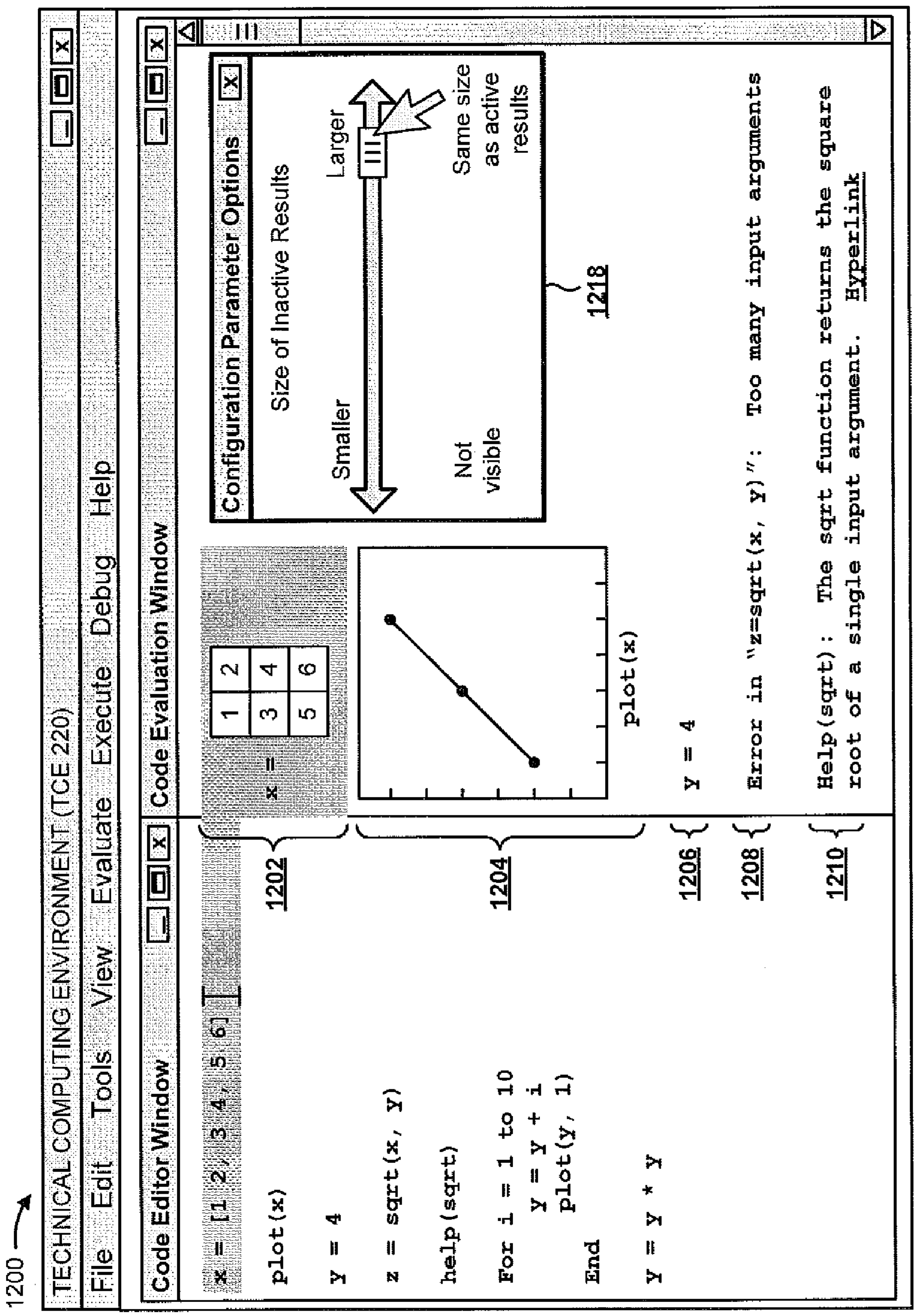

FIG. 12A

PROGRAM CODE INTERFACE FOR PROVIDING PROGRAM CODE AND CORRESPONDING RESULTS OF EVALUATING THE PROGRAM CODE

RELATED APPLICATION

This application is a continuation of U.S. patent application Ser. No. 14/059,872, filed Oct. 22, 2013, (now U.S. Pat. No. 9,053,235) which is incorporated herein by reference.

DETAILED DESCRIPTION

The following detailed description of example implementations refers to the accompanying drawings. The same reference numbers in different drawings may identify the same or similar elements.

A user, such as a computer programmer, may create program code, and may cause a client device to evaluate the program code and display a result of evaluating the program code. The client device may only output an end result of evaluating the program code, without outputting intermediate results. However, the user may wish to view the intermediate results, and may wish to view a correspondence between the intermediate results and a corresponding portion of program code used to generate the results. For example, the user may wish to view such correspondence to understand how a program operates step-by-step, to check a program for errors, to get help with a particular portion of program code, or the like. Implementations described herein allow a user to view such correspondence between program code and program code evaluation results, thereby enhancing the user's knowledge of how the program code operates.

Figure 1:
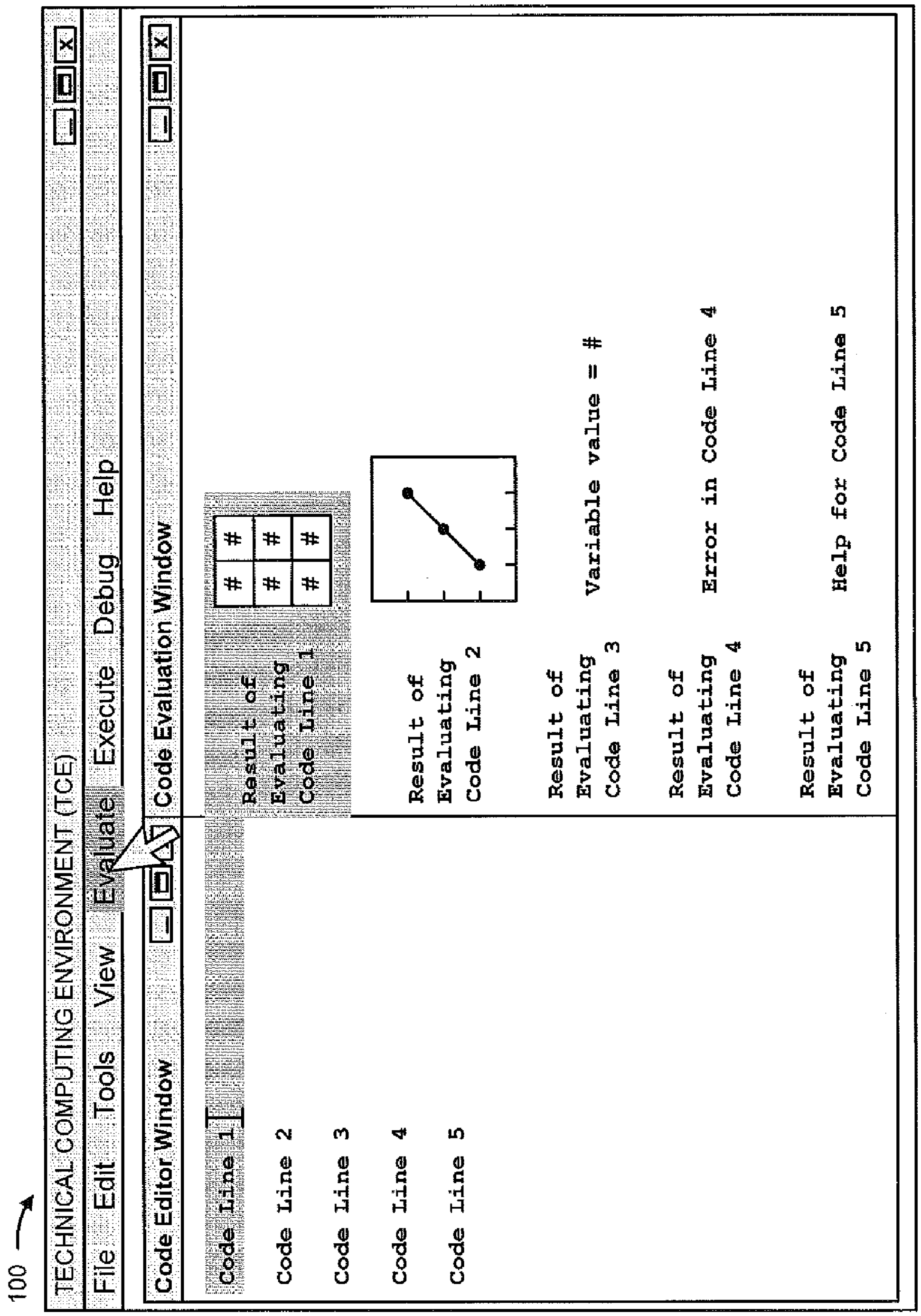
FIG. 1 is a diagram of an overview of an example implementation described herein.

FIG. 1 is a diagram of an overview of an example implementation 100 described herein. As shown in FIG. 1, a technical computing environment (TCE), such as a TCE running on a client device, may provide a code editor window that permits a user to input and/or view program code. The TCE may also provide a code evaluation window that provides a result of evaluating the program code. As shown, a user may interact with an input mechanism, such as an "Evaluate" button provided via the TCE. Based on the user interaction, the client device may evaluate the program code provided in the code editor window, and may display results of evaluating the program code in the code evaluation window.

The TCE may provide multiple results associated with multiple portions (e.g., lines) of program code. A result may include a result of executing a portion of program code. For example, as shown in FIG. 1, the TCE may provide a table generated by executing the first line of program code, may display a graph generated by executing the second line of program code, and may display a variable value determined by executing the third line of program code. As another example, a result may indicate an error associated with a portion of program code, or may provide help for a particular portion of program code. For example, as shown in FIG. 1, the TCE may provide an indication of an error associated with the fourth line of program code, and may provide help associated with the fifth line of program code.

The TCE may provide an indication of a correspondence between a result and a portion of program code used to generate the result. For example, as shown in FIG. 1, the list of results shown in the code evaluation window may be displayed in the same order as the lines of program code, displayed in the code editor window, used to generate the results. As further shown in FIG. 1, when the user places a cursor on a particular line of code (e.g., line 1, as shown), the TCE may highlight the particular line of code and a result that corresponds to the particular line of code (e.g., a table generated by executing line 1, as shown). The TCE may permit the user to input a variety of configuration parameters that control a manner in which the results are displayed, as described in more detail herein. In this way, a user may gain a deeper understanding of a program by viewing a correspondence between multiple portions of program code and respective results of evaluating the portions of program code.

Figure 2:
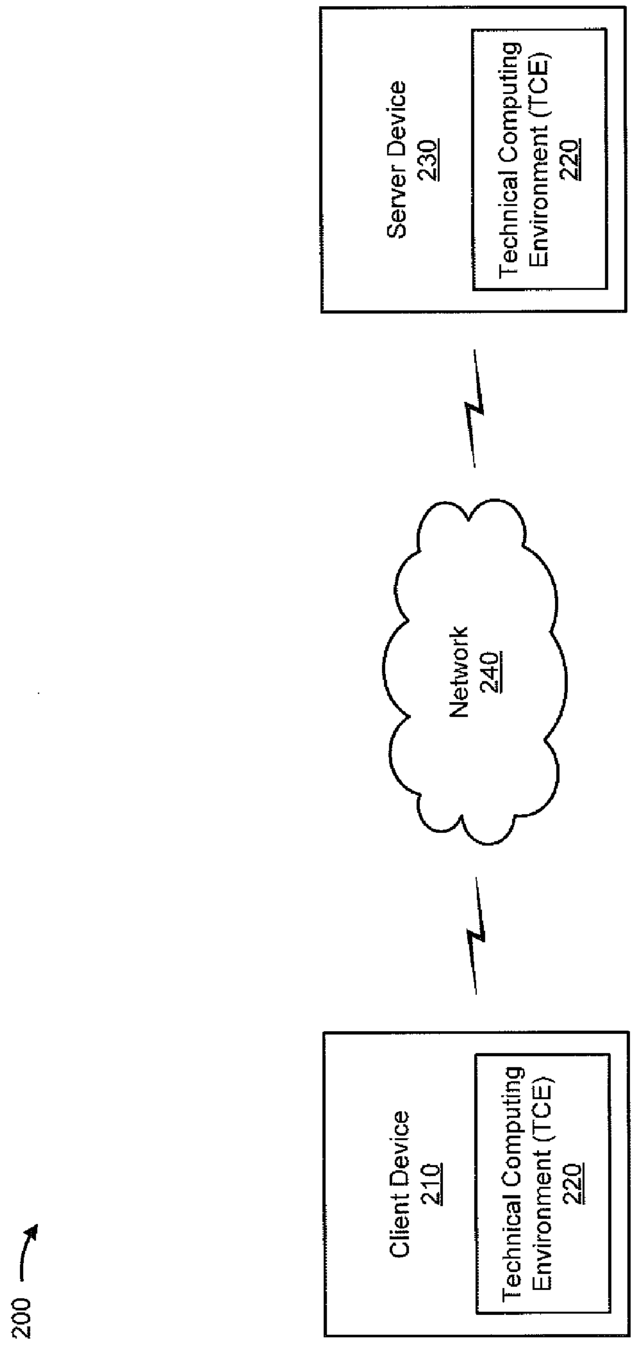
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, evaluating, and/or providing program code and/or information associated with program code (e.g., a result of evaluating program code). For example, client device 210 may include a computing device, such as a desktop computer, a laptop computer, a tablet computer, a handheld computer, a server, a mobile phone (e.g., a smart phone, a radiotelephone, etc.), or a similar device. Client device 210 may evaluate program code by, for example, executing the program code, determining an error associated with the program code (e.g., by validating the program code, debugging the program code, etc.), determining information associated with the program code (e.g., determining help information associated with the program code), or the like. In some implementations, client device 210 may receive information from and/or transmit information to server device 230 (e.g., program code and/or information associated with program code).

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

TCE 220 may include, for example, a user interface that provides a code editor portion that permits a user to input program code (e.g., textual program code, graphical program code, etc.). Additionally, or alternatively, TCE 220 may include a user interface that provides a code evaluation portion that provides results corresponding to program code displayed in the code editor portion. TCE 220 may provide one or more correspondence indicators that indicate a correspondence between different portions of program code and respective results associated with the different portions of program code. TCE 220 may permit a user to input one or more configuration parameters that may control, for example, a manner in which a result is displayed and/or provided, a manner in which program code is displayed and/or provided, a manner in which a correspondence indicator is displayed and/or provided, or the like.

Server device 230 may include one or more devices capable of receiving, generating, storing, evaluating, and/or providing program code and/or information associated with program code. For example, server device 230 may include a computing device, such as a server, a desktop computer, a laptop computer, a tablet computer, a handheld computer, a mobile device, or a similar device. In some implementations, server device 230 may include an embedded device, such as a microcontroller (e.g., an Arduino microcontroller, a device utilizing an ARM architecture, a device utilizing an x86 architecture, etc.). In some implementations, server device 230 may host TCE 220. In some implementations, client device 210 may be used to access one or more TCEs 220 running on one or more server devices 230. For example, multiple server devices 230 may be used to evaluate program code (e.g., serially or in parallel) and may provide respective results of evaluating the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution).

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
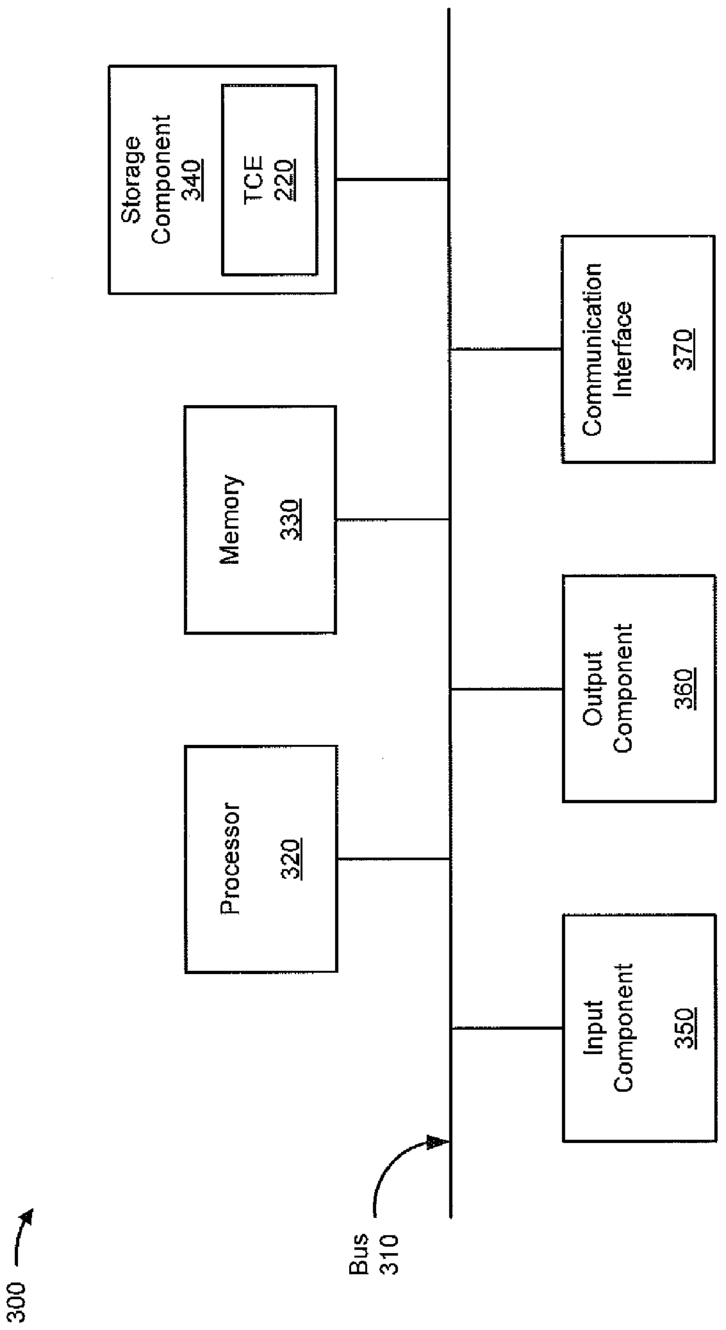
FIG. 3 is a diagram of example components of one or more devices of FIG. 2.

FIG. 3 is a diagram of example components of a device 300, which may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit, a graphics processing unit, an accelerated processing unit, etc.), a microprocessor, a microcontroller, and/or any processing component (e.g., a field-programmable gate array (FPGA), an application-specific integrated circuit (ASIC), an Arduino microcontroller, etc.) that interprets and/or executes instructions (e.g., according to an instruction set architecture, such as ARM, x86, etc.), and/or that is designed to implement one or more computing tasks. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform one or more processes described herein. Device 300 may perform these processes in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
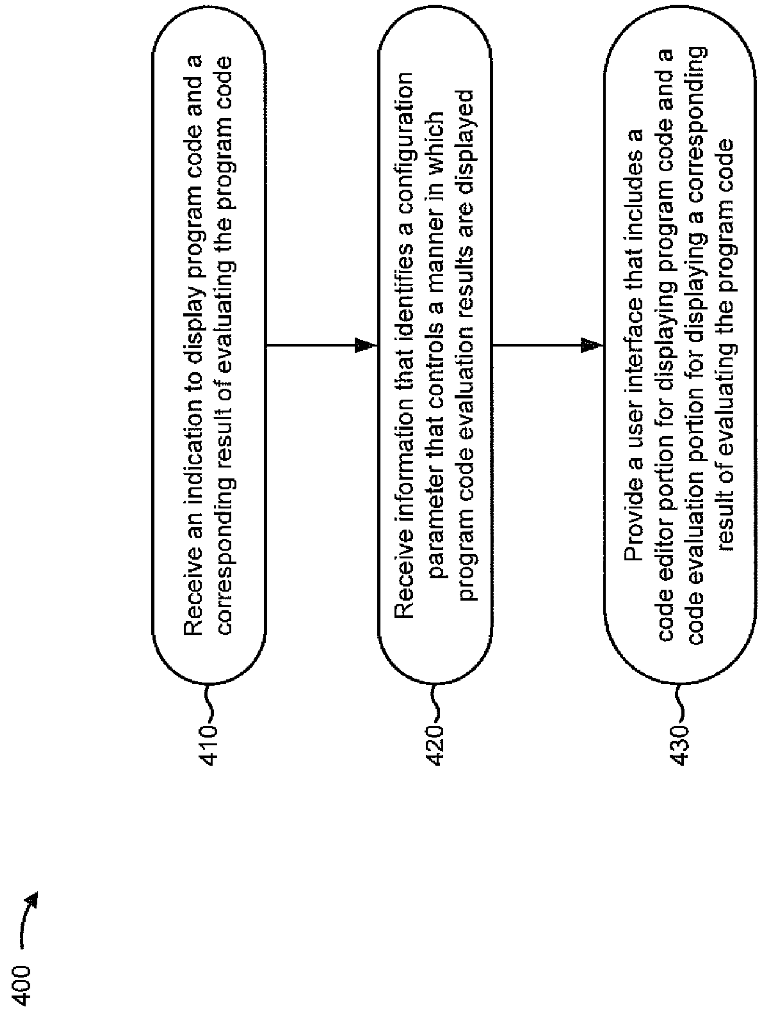
FIG. 4 is a flow chart of an example process for providing a user interface that displays program code and a result of evaluating the program code.

FIG. 4 is a flow chart of an example process 400 for providing a user interface that displays program code and a result of evaluating the program code. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include receiving an indication to display program code and a corresponding result of evaluating the program code (block 410). For example, client device 210 may receive (e.g., based on user input) an indication to display program code and a corresponding result of evaluating the program code. Client device 210 may receive the indication based on a user interaction with a user interface of TCE 220, in some implementations. For example, a user may interact with an input mechanism (e.g., a menu item, a button, etc.) to provide the indication to client device 210. In some implementations, the program code may be associated with a model element of a model (e.g., a block in a block diagram model, a portion of text in a textual model, etc.), and the user may interact with an element of the model (e.g., a block) to provide the indication to display the program code and a corresponding result of evaluating the program code.

Program code (sometimes referred to herein as code) is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like.

In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

As further shown in FIG. 4, process 400 may include receiving information that identifies a configuration parameter that controls a manner in which program code evaluation results are displayed (block 420). For example, client device 210 may receive (e.g., based on user input) information that identifies a configuration parameter. The configuration parameter may control a manner in which client device 210 provides and/or displays a result associated with the program code (sometimes referred to herein as a program code evaluation result), or the like. Configuration parameters are discussed in more detail elsewhere herein.

As further shown in FIG. 4, process 400 may include providing a user interface that includes a code editor portion for displaying program code and a code evaluation portion for displaying a corresponding result of evaluating the program code (block 430). For example, client device 210 may provide, via TCE 220, a user interface that includes a code editor portion (e.g., a code editor window) for displaying program code, and that further includes a code evaluation portion (e.g., a code evaluation window) for displaying a result of evaluating the program code. In some implementations, client device 210 may provide multiple portions of program code via the code editor portion of the user interface, and may provide multiple corresponding results via the code evaluation portion of the user interface.

Client device 210 may concurrently provide both the code editor portion and the code evaluation portion via the user interface (e.g., both portions may be displayed on the user interface at the same time). In some implementations, client device 210 may provide the code editor portion and the code evaluation portion side-by-side, so as to convey a correspondence between a result, displayed in the code evaluation portion, and program code, displayed in the code editor portion, used to generate the result. Additionally, or alternatively, client device 210 may provide the code editor portion and the code evaluation portion in another manner (e.g., top to bottom).

In some implementations, client device 210 may receive input to toggle between displaying one or more results side-by-side (e.g., side-by-side with the program code, such as via a separate window) or in-line (e.g., in-line with program code, such as in the same window). As an example, a user may identify one or more results to be provided in-line with program code, and client device 210 may provide the results in-line with corresponding program code (e.g., in the code editor window), where a result is provided immediately after program code used to generate the result. As another example, the user may identify one or more results to be provided side-by-side with program code (e.g., in the code evaluation window), and client device 210 may provide the results side-by-side with corresponding program code (e.g., as described elsewhere herein). In some implementations, client device 210 may differentiate program code from results provided in-line, such as by marking the program code and/or results in a different manner (e.g., highlighting the results, highlighting the code, etc.).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E depict an example where client device 210 receives input to display program code and corresponding program code evaluation results, receives configuration parameters for controlling display of the program code evaluation results, and provides a user interface for displaying the program code and the program code evaluation results based on the configuration parameters.

Figure 5A:
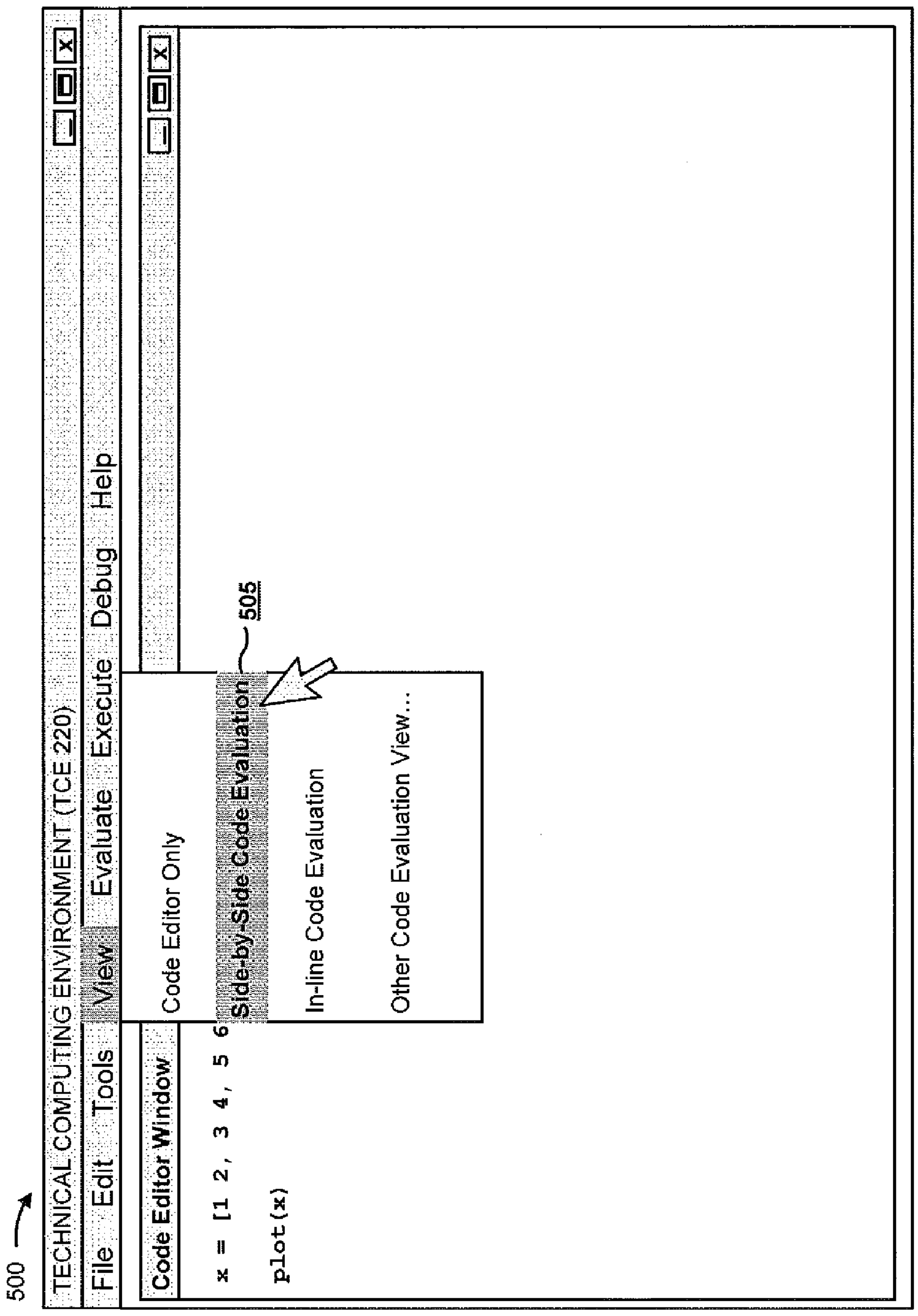
FIGS. 5A-5E are diagrams of an example implementation relating to the example process shown in FIG. 4.

As shown in FIG. 5A, a user may interact with TCE 220 to provide an indication, to client device 210, to display program code and corresponding program code evaluation results. For example, as shown by reference number 505, the user may interact with a "View" menu, and may further interact with a "Side-by-Side Code Evaluation" menu item in the "View" menu.

Figure 5B:
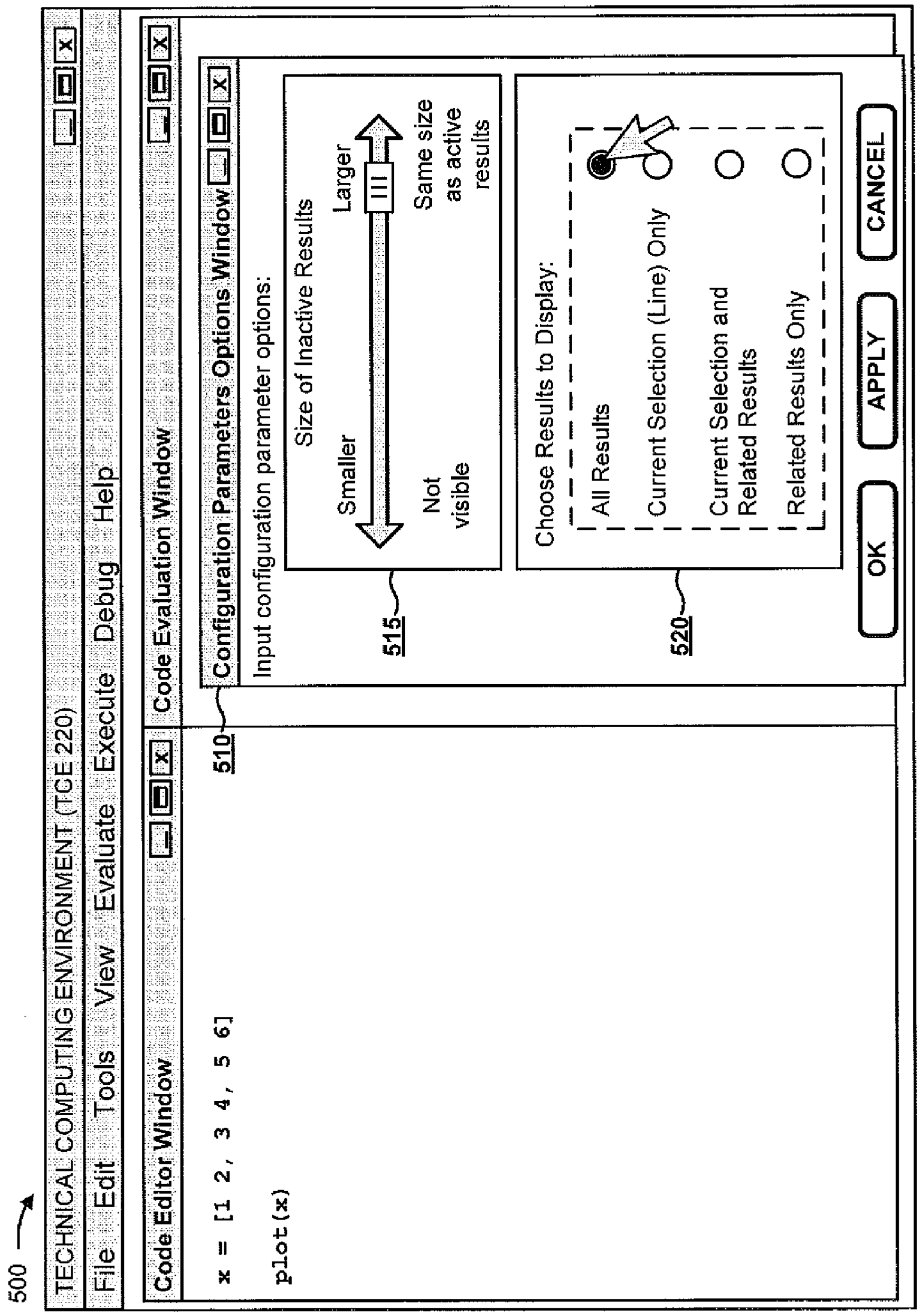

As shown in FIG. 5B, user interaction with the "Side-by-Side Code Evaluation" menu item may cause client device 210 to provide, via TCE 220, a code editor window for displaying program code, and a code evaluation window for displaying one or more program code evaluation results. As shown by reference number 510, client device 210 may provide a configuration parameter options window to permit a user to input one or more configuration parameters (e.g., one or more configuration parameter values) that control a manner in which program code evaluation results are displayed. As shown by reference number 515, assume that the user inputs an option to display inactive results and active results using the same size (e.g., the same relative size). As shown by reference number 520, further assume that the user inputs an option to display all results (e.g., rather than only displaying a result associated with selected program code). Finally, assume that the user interacts with an "OK" button to provide information identifying the options to client device 210, and to close the configuration parameter options window.

Figure 5C:
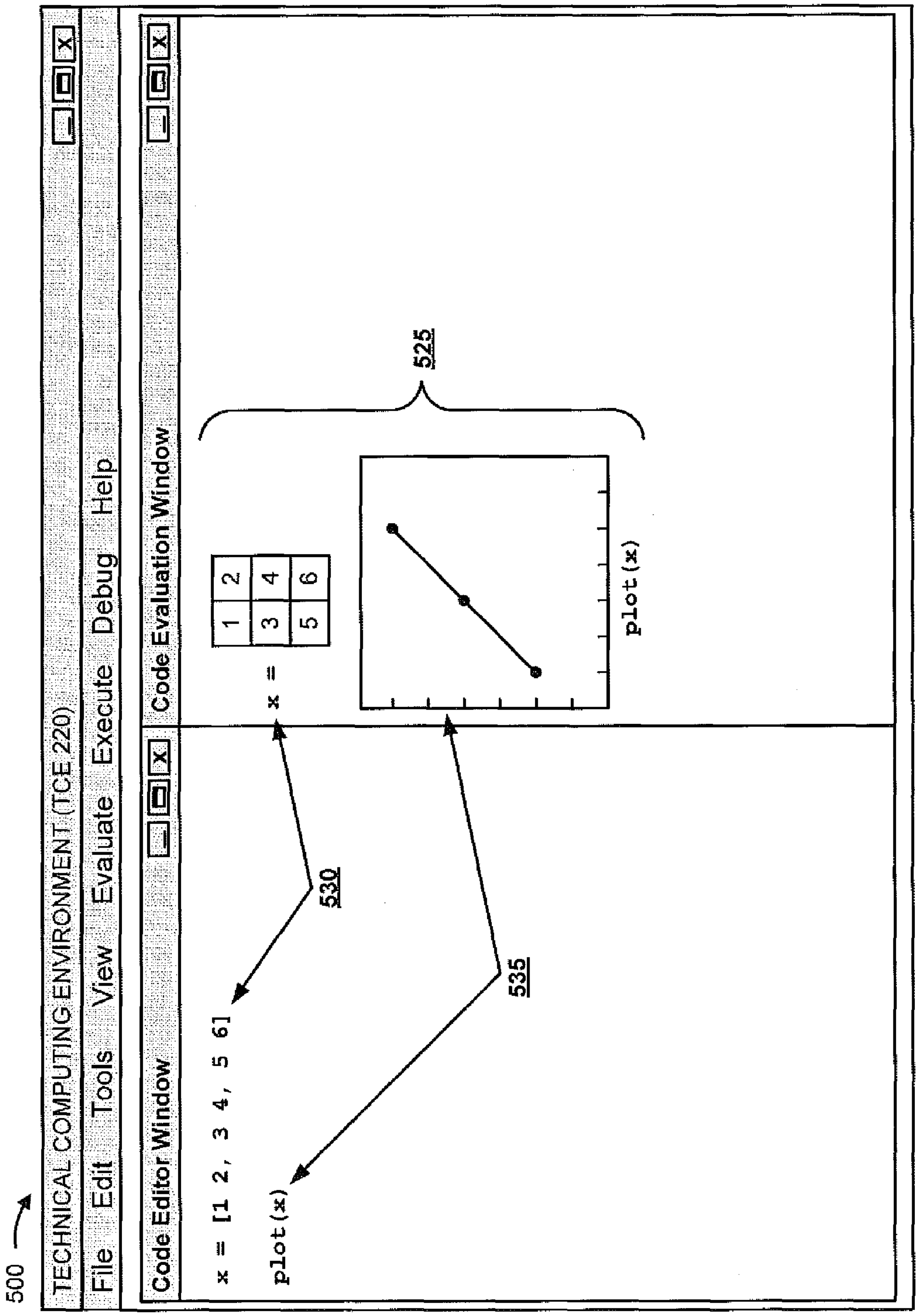

As shown in FIG. 5C, user interaction with the "OK" button may cause client device 210 to provide results in the code evaluation window, based on the input configuration parameters. As shown by reference number 525, the code evaluation window may display all results corresponding to the program code displayed in the code editor window, and may provide the results using the same relative size (e.g., based on the input configuration parameters). For example, as shown by reference number 530, a table of numbers displayed in the code evaluation window corresponds to the first line of program code displayed in the code editor window. As another example, and as shown by reference number 535, a graph displayed in the code evaluation window corresponds to the second line of program code displayed in the code editor window.

Figure 5D:
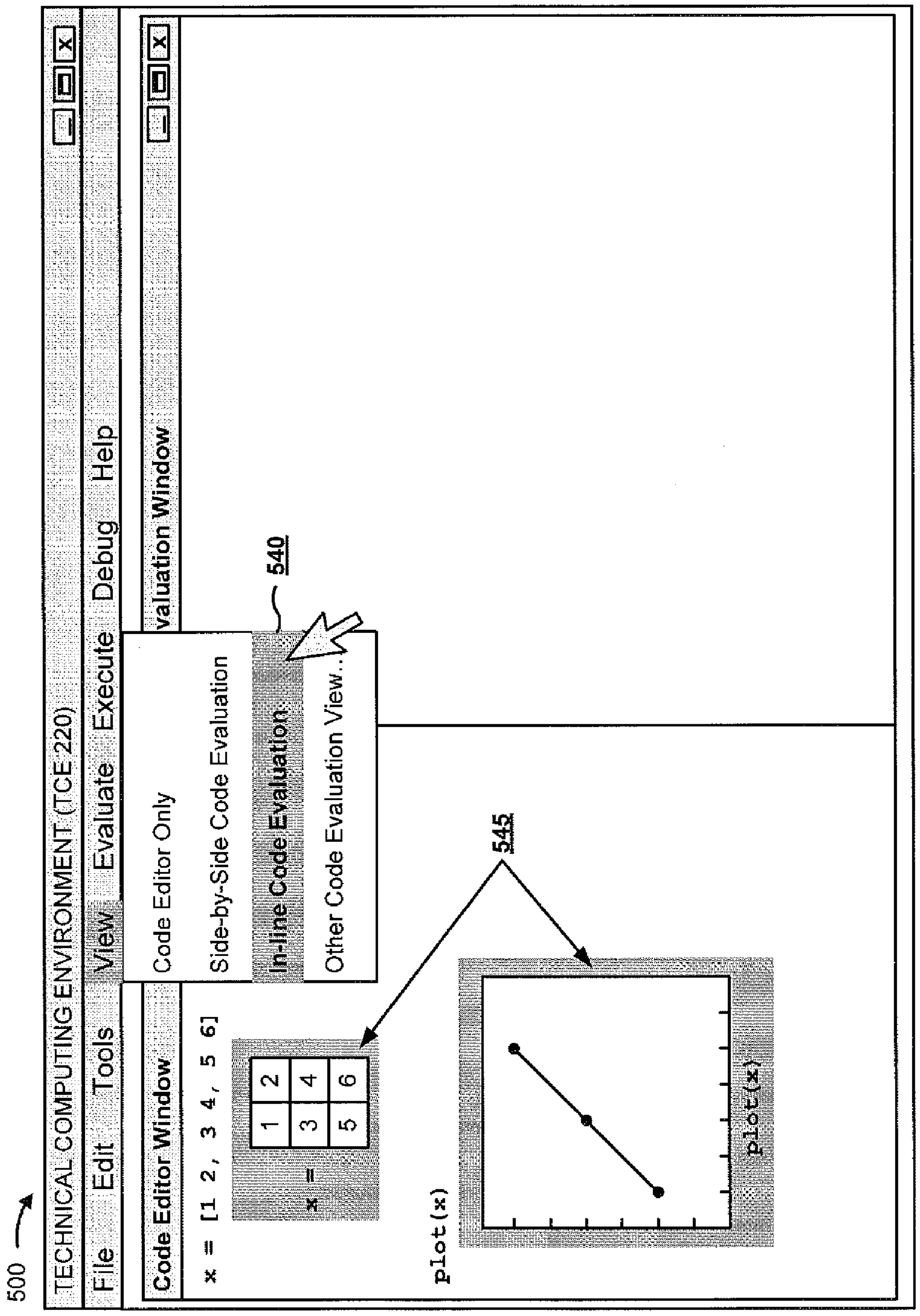

As shown in FIG. 5D, a user may interact with TCE 220 to toggle display of one or more results in the code evaluation window (e.g., side-by-side) or in the code editor window (e.g., in-line). For example, as shown by reference number 540, the user may interact with the "View" menu, and may further interact with an "In-line Code Evaluation" menu item in the "View" menu. User interaction with the "In-line Code Evaluation" menu item may cause client device 210 to provide, via TCE 220, the program code evaluation results in-line with program code (e.g., both may be provided via the code editor window). As shown by reference number 545, client device 210 may differentiate program code from evaluation results, such as by highlighting the evaluation results. While FIG. 5D shows an example of providing all results in-line with program code, a user may select one or more results to be provided in-line with program code (e.g., by clicking and dragging a result from the code evaluation window to the code editor window), and unselected results may be displayed via the code evaluation window. In this way, a portion of the results may be provided in-line with corresponding program code, and a portion of the results may be provided side-by-side with corresponding program code.

Figure 5E:
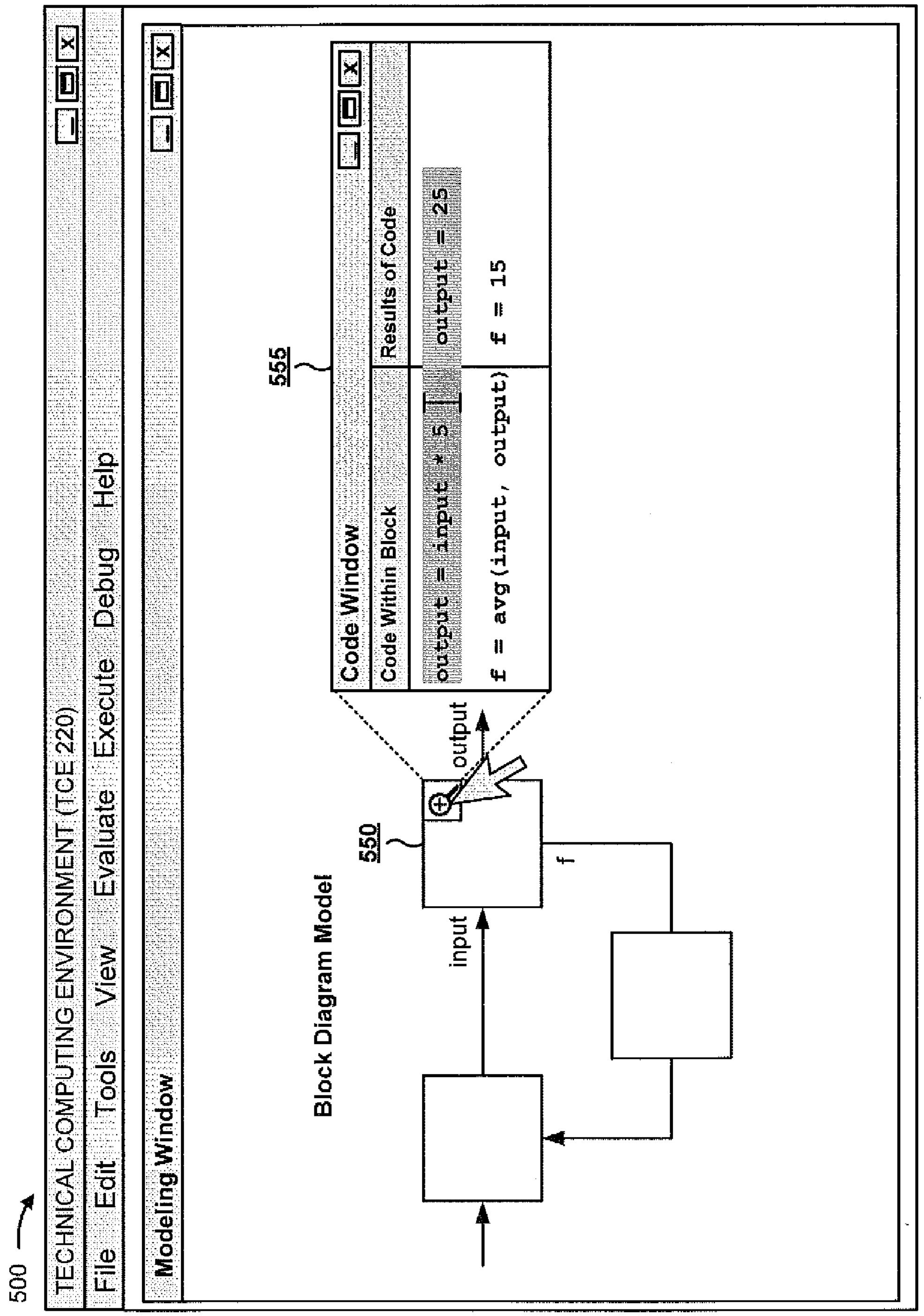

As shown in FIG. 5E, assume that TCE 220 provides a block diagram modeling environment with which a user can create, edit, and/or view a block diagram model. Further, assume that the block diagram model includes a block 550 associated with program code (e.g., program code that is evaluated when the block is executed during execution of the model). As shown, the user may interact with block 550, such as by clicking on an icon that indicates that the block is associated with program code, and that the user may cause TCE 220 to provide the program code and corresponding results of evaluating the program code. Based on user interaction with block 555, assume that TCE 220 provides code window 555. Code window 555 may provide program code in a first portion of code window 555, may provide corresponding results of evaluating the program code in a second portion of code window 555, and may provide a correspondence indicator that indicates a correspondence between a particular portion of the program code and a particular result, as shown.

As indicated above, FIGS. 5A-5E are provided merely as an example. Other examples are possible and may differ from what was described with regard to FIGS. 5A-5E.

Figure 6:
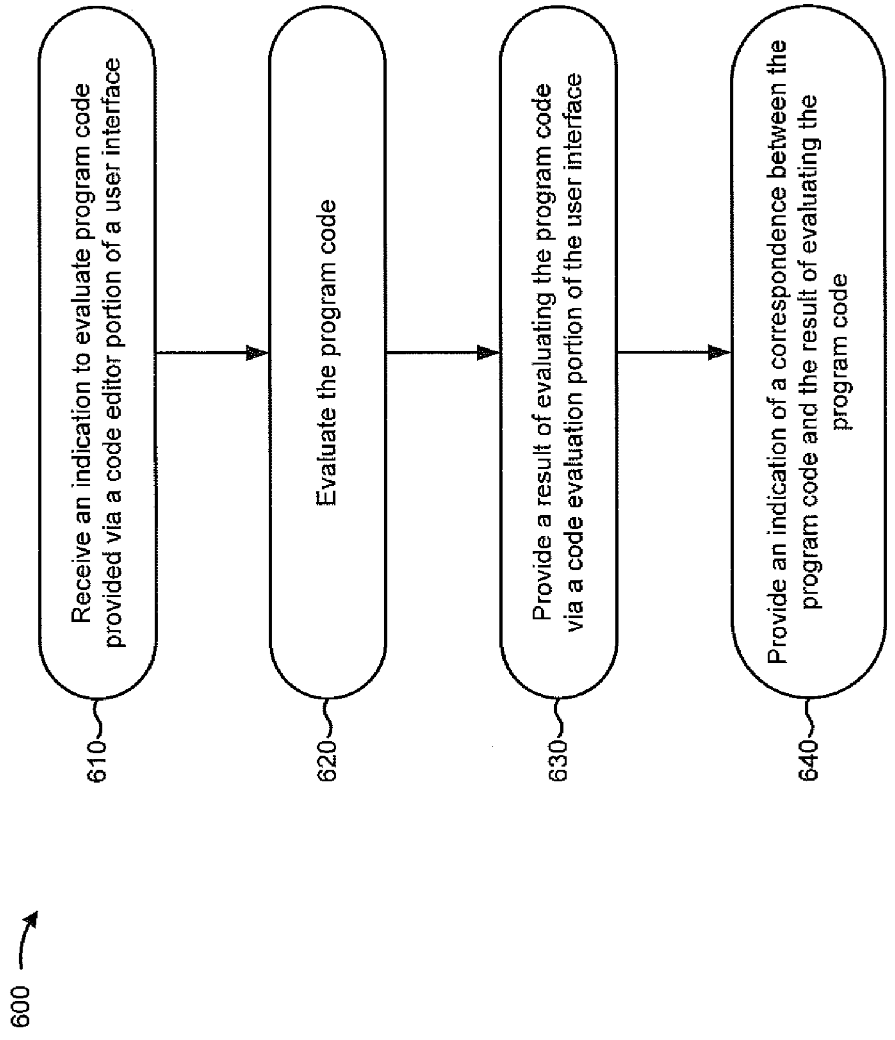
FIG. 6 is a flow chart of an example process for providing an indication of a correspondence between program code and a result of evaluating the program code.

FIG. 6 is a flow chart of an example process 600 for providing an indication of a correspondence between program code and a result of evaluating the program code. In some implementations, one or more process blocks of FIG. 6 may be performed by client device 210. In some implementations, one or more process blocks of FIG. 6 may be performed by another device or a group of devices separate from or including client device 210, such as server device 230.

As shown in FIG. 6, process 600 may include receiving an indication to evaluate program code provided via a code editor portion of a user interface (block 610). For example, client device 210 may receive (e.g., based on user input) an indication to evaluate program code (e.g., an evaluation indicator) provided via a code editor window of a user interface (e.g., program code provided via TCE 220). Client device 210 may receive the evaluation indicator based on a user interaction with a user interface of TCE 220, in some implementations. For example, a user may interact with an input mechanism (e.g., a menu item, a button, a tool bar item, a gesture, an interaction with a touch screen, etc.) to provide the evaluation indicator to client device 210.

In some implementations, the evaluation indicator may include an indication to evaluate all of the program code provided via the code editor window. In some implementations, the evaluation indicator may include an indication to evaluate a portion of the program code provided via the code editor window. A portion of program code (sometimes referred to herein as a program code portion) may refer to a portion of a program, such as one or more lines of program code, a string of one or more characters of program code, a set of strings of program code, a block of program code, a function, a method, a script, an object, or the like.

In some implementations, a user may provide input identifying a portion of program code (e.g., by interacting with a portion of program code, by indicating one or more line numbers of code to be evaluated, by highlighting a portion of program code, etc.), and client device 210 may evaluate the identified portion of program code. For example, the user may select a portion of program code, may leave a portion of program code (e.g., by pressing “Enter” on a keyboard to cause a line of program code to be left), may input a portion of program code, may input a syntactically correct portion of program code, or the like, to provide the evaluation indicator. Additionally, or alternatively, the evaluation indicator may be triggered based on a timer. For example, a user may input a portion of program code, and a particular amount of time may elapse that causes the evaluation indicator to be triggered.

Additionally, or alternatively, the evaluation indicator may identify an evaluation mode. The evaluation mode may include an execute mode for evaluating executable program code (e.g., program code without errors), a debug mode for evaluating the program code for errors, a help mode for evaluating the program code to provide help information associated with the program code, and/or another mode.

As further shown in FIG. 6, process 600 may include evaluating the program code (block 620). For example, client device 210 may evaluate the program code based on receiving the indication to evaluate the program code.

Client device 210 may evaluate the program code based on one or more selected evaluation modes. In some implementations (e.g., when the execute mode is specified), client device 210 may evaluate the program code by executing the program code. Additionally, or alternatively (e.g., when the debug mode is specified), client device 210 may evaluate the program code by determining one or more errors associated with the program code (e.g., by determining one or more portions of program code that fail to execute). Additionally, or alternatively (e.g., when the help mode is specified), client device 210 may evaluate the program code by determining to provide help information associated with the program code.

In some implementations, client device 210 may provide information identifying one or more portions of program code to one or more server devices 230 for evaluation (e.g., serially or in parallel). Server device(s) 230 may evaluate the portion(s) of program code, and may provide one or more respective results of evaluating the portion(s) of program code to client device 210.

As further shown in FIG. 6, process 600 may include providing a result of evaluating the program code via a code evaluation portion of the user interface (block 630). For example, client device 210 may provide a result of evaluating the program code via a code evaluation window of a user interface provided via TCE 220.

Client device 210 may evaluate multiple portions of program code, and may provide one or more respective results corresponding to the multiple portions of evaluated program code, in some implementations. For example, client device 210 may evaluate a first portion of program code (e.g., provided via the code editor window), may provide a first result corresponding to the first portion of program code (e.g., via the code evaluation window), may evaluate a second portion of program code (e.g., provided via the code editor window), may provide a second result corresponding to the second portion of program code (e.g., via the code evaluation window), etc.

In some implementations, a result provided by client device 210 may be interactive (e.g., a user may be permitted to manipulate the result). For example, a result may be displayed in a portion of the code evaluation window, and the result may be modified and/or displayed differently within the portion based on user input that zooms the result (e.g., zooms in or zooms out), rotates the result (e.g., rotates clockwise, rotates counterclockwise, etc.), scrolls the result through the portion (e.g., scrolls left, right, up, down, etc.), or the like. As another example, a user may select a portion of the result (e.g., a cell in a table, a point on a graph, etc.), and client device 210 may provide information associated with the selected portion (e.g., a formula used to calculate a value in the cell, a value associated with the point on the graph, etc.). Interactive results may include, for example, interactive tables, charts, plots, graphs, etc.

Additionally, or alternatively, a result provided by client device 210 and/or program code corresponding to the result may be exported. For example, a user may select a result, and may interact with an input mechanism that causes client device 210 to export the result to a file (e.g., a file different than the file being used), to export the result to a workspace (e.g., a workspace other than the workspace being used, such as a global workspace, a base workspace, etc.), or the like. In some implementations, the user may provide input that indicates whether the result is to be exported, whether corresponding program code is to be exported, and/or whether both the result and corresponding program code are to be exported.

Client device 210 may provide one or more results based on one or more configuration parameters, in some implementations. For example, client device 210 may receive information identifying a configuration parameter that controls a manner in which results are provided and/or displayed. Client device 210 may provide and/or display the results based on the identified configuration parameter. Configuration parameters are described in more detail elsewhere herein.

In some implementations, client device 210 may provide the program code and the program code evaluation results in separate windows and/or separate portions of the user interface. For example, client device 210 may not provide the results in-line with the code. Client device 210 may not provide the results in between portions (e.g., lines) of program code, so that consecutive (e.g., adjacent) portions of program code are not interrupted by providing results in between the consecutive portions. For example, a group of program code portions may be provided together, and a group of results may be provided together, but the two groups may be provided separately, such that the program code portions and the results are not interlaced in the user interface (e.g., in the code editor window).

As further shown in FIG. 6, process 600 may include providing an indication of a correspondence between the program code and the result of evaluating the program code (block 640). For example, client device 210 may provide, via a user interface of TCE 220, an indication of a correspondence (e.g., a correspondence indicator) between the program code and the result of evaluating the program code (e.g., a program code evaluation result).

Client device 210 may provide the correspondence indicator via the code editor window and/or the code evaluation window, in some implementations. For example, client device 210 may provide a first correspondence indicator related to a particular portion of code, and/or may provide a second correspondence indicator related to a particular result generated by evaluating the particular portion of code. A correspondence indicator may include, for example, highlighting the particular portion of code and the corresponding result (e.g., using a same color), outlining the particular portion of code and the corresponding result (e.g., using a same color, line weight, line style, etc.), marking the particular portion of code and the corresponding result (e.g., using a same number, letter, character, symbol, etc.), or the like.

Additionally, or alternatively, client device 210 may provide the correspondence indicator by aligning the particular portion of code and the corresponding result (e.g., aligning a top boundary of the portion of code with a top boundary of the result, aligning a bottom boundary of the portion of code with a bottom boundary of the result, aligning a center, such as a vertical or horizontal center, of the portion of code with a center of the result, aligning a top boundary with a vertical center, aligning a bottom boundary with a vertical center, etc.). Additionally, or alternatively, client device 210 may provide multiple results, in the code evaluation window, in the same order that respective multiple portions of program code, used to generate the multiple results, are provided in the code editor window.

Client device 210 may align a portion of code and a corresponding result by inserting a top padding above the code and/or result (e.g., to move the code and/or result downward on a display), and/or by inserting a bottom padding below the code and/or the result (e.g., to move the code and/or the result upward on a display). In some implementations, client device 210 may add the padding to the code evaluation window (e.g., above or below the result) so that a user may focus on the code without the code moving around on the display.

If a vertical position (e.g., a y-axis position) of a portion of code (e.g., a position corresponding to the top of the portion of code, a position corresponding to the bottom of the portion of code, a position corresponding to the vertical center of the portion of code, etc.) is the same as (e.g., matches) a vertical position of a corresponding result (e.g., a position corresponding to the top of the result, a position corresponding to the bottom of the result, a position corresponding to the vertical center of the result, etc.), then client device 210 may not insert top or bottom padding to adjust the vertical position of the code and/or the result, in some implementations. For example, when a code portion is at or near the top (e.g., within a threshold distance of the top) of a display portion of a user interface, client device 210 may align the top of the code portion with a top of a corresponding result. As another example, when a code portion is at or near the bottom (e.g., within a threshold distance of the bottom) of a display portion of a user interface, client device 210 may align the bottom of the code portion with a bottom of a corresponding result. Client device 210 may align other vertical positions of the code portion and the corresponding code based on a position of the code portion and/or the corresponding code within the display portion of the user interface. Additionally, or alternatively, if the portion of code is provided higher than (e.g., closer to a top of the display) than the corresponding result, then client device 210 may not insert top or bottom padding to adjust the vertical position of the code and/or the result (e.g., so long as the result is provided via the display and has not scrolled off of the display).

In some implementations, if the portion of code is provided lower than (e.g., closer to the bottom of the display) than the corresponding result, then client device 210 may insert top padding in the code evaluation window, above the corresponding result, to align a vertical position of the corresponding result with a vertical position of the portion of code. In some implementations, if the portion of code is provided higher than (e.g., closer to the top of the display) than the corresponding result, then client device 210 may insert bottom padding in the code evaluation window, below the corresponding result, to align a vertical position of the corresponding result with a vertical position of the portion of code.

The amount of top padding to insert above the result and/or the amount of bottom padding to insert below the result may be determined based on, for example, a vertical position of the code portion, a vertical position of the result, a height of the code portion (e.g., a quantity of vertical positions occupied by the code portion), a height of all code portions (e.g., a quantity of vertical positions occupied by all code portions), a height of the result (e.g., a quantity of vertical positions occupied by the result), a height of all results (e.g., a quantity of vertical positions occupied by all results), a height of the display (e.g., a quantity of vertical positions available on the display), a height of a user interface associated with TCE 220 (e.g., a display portion of the user interface), a height of the code editor window (e.g., a display portion of the code editor window that displays code), a height of the code evaluation window (e.g., a display portion of the code evaluation window that displays results), or the like.

As an example, client device 210 may determine an amount of top padding, to insert above a result, as follows:

If $VertPos_{code} > VertPos_{result}$, then:

$$padding_{top} = \max(0, VertPos_{code} - VertPos_{result}) - \max(0, VertPos_{code} + Height_{result} - ClientHeight_{result}$$

In other words, if the vertical position of the code is greater than the vertical position of the result (e.g., where a larger value for a vertical position indicates a position further down on a display than a smaller value), then client device 210 may insert padding above the vertical position of the result. The amount of inserted padding (e.g., paddingtop) may be calculated by determining a first maximum value that is equal to the greater of zero (e.g., 0) or the difference between the vertical position of the code and the vertical position of the result (e.g., $VertPos_{code} - VertPos_{result}$), by determining a second maximum value that is equal to the greater of zero (e.g., 0) or the sum of the vertical position of the code and the height of the result minus the height of a display portion via which the result is provided (e.g., $VertPos_{code} + Height_{result}\ ClientHeight_{result}$), and subtracting the second maximum value from the first maximum value (e.g., $\max(0, VertPos_{code} - VertPos_{result}) - \max(0, VertPos_{code} + Height_{result} - ClientHeight_{result})$).

As an example, client device 210 may determine an amount of bottom padding, to insert below a result, as follows:

If $VertPos_{code}<VertPos_{result}$, then:

$$padding_{bottom}=max(0,VertPos_{result}+ClientHeight_{result}-TotalHeight_{result}-ViewportPos_{min}),\text{ where}$$

$$ViewportPos_{min}=min(VertPos_{code},\ max(0,\ VertPos_{code}+ClientHeight_{code}-TotalHeight_{code})).$$

In other words, if the vertical position of the code is less than the vertical position of the result (e.g., where a smaller value for a vertical position indicates a position higher up on a display than a larger value), then client device 210 may insert padding below the vertical position of the result. The amount of inserted padding (e.g., $padding_{bottom}$) may be calculated by determining a first maximum value that is equal to the greater of zero (e.g., 0) or a calculation equal to the vertical position of the result (e.g., $VertPos_{result}$) plus the height of a display portion via which the result is provided (e.g., $ClientHeight_{result}$) minus the total height of all results (e.g., $TotalHeight_{result}$) minus a minimum viewport position (e.g., $ViewportPos_{min}$). The minimum viewport position may be calculated by determining a minimum value that is equal to the lesser of the vertical position of the code (e.g., $VertPos_{code}$) and a second maximum value. The second maximum value may be equal to the greater of zero (e.g., 0) or a calculation equal to the vertical position of the code (e.g., $VertPos_{code}$) plus the height of a display portion via which the code is provided (e.g., $ClientHeight_{code}$) minus the total height of all code (e.g., $TotalHeight_{code}$). The minimum viewport position may provide an indication of whether the code can be scrolled (e.g., whether the amount of displayed code is less than the total amount of code).

In some implementations, client device 210 may determine an amount of top and/or bottom padding required for each result to align the result with a corresponding code portion. Client device 210 may then determine the maximum top and/or bottom padding value of the set of top and/or bottom padding values determined for each result. Client device 210 may determine this maximum top and/or bottom padding when code is added, removed, and/or modified, and/or when a result is generated, removed, and/or modified. Client device 210 may insert the maximum top padding before a result, or may insert the maximum bottom padding after a result, when aligning a portion of code and a result. Client device 210 may use the maximum padding to prevent flickering on the display as a user selects a different code portion, or when code portions are added, removed, or modified.

Client device 210 may scroll a portion of a user interface to align a code portion and a corresponding result, in some implementations. For example, client device 210 may scroll the code evaluation window. Client device 210 may determine an amount by which to scroll the code evaluation window based on a position of a corresponding result within all results, a position of a corresponding result on a display portion of the user interface (e.g., within a visible display portion of the code evaluation window), an amount of padding inserted in the code evaluation window (e.g., top padding and/or bottom padding inserted above or below a corresponding result, a maximum padding value, etc.), a position of corresponding code within all code, a position of corresponding code on a display portion of the user interface (e.g., within a visible portion of the code editor window), an amount by which a display portion has been scrolled (e.g., the code editor window, the code evaluation window, etc.), or the like.

For example, client device 210 may determine a padded position of a result by summing a position of the result within all results (e.g., a vertical position, a result line, etc.) and the maximum top padding value (e.g., an amount of top padding inserted above the result). Client device 210 may also determine a position of corresponding code, to be aligned with the result, in the display portion by determining a difference between a position of the code within all code (e.g., a vertical position, a code line, etc.) and an amount by which the code has been scrolled (e.g., an amount by which the code editor window has been scrolled). Client device 210 may determine a first amount by which to scroll the code evaluation window by calculating a difference between the padded position of the result and the position of corresponding code in the display portion. Client device 210 may scroll the code evaluation window by the first amount to align the code and the corresponding result.

In some implementations, client device 210 may scroll the code evaluation window in a manner that displays an entire result at the top and/or bottom of the code evaluation window, rather than displaying a portion of the result (e.g., cut off at the edges of the window). For example, client device 210 may determine a second amount (e.g., a scroll amount, a quantity of vertical positions, etc.) by which a result is scrolled off the bottom of the screen, and may scroll the code evaluation window by the second amount (e.g., in addition to the first amount). The second amount may be equal to the greater of zero (e.g., 0) or a calculation equal to the position of corresponding code in the display portion plus the height the corresponding result minus the display height of the display portion. When client device 210 scrolls results in this manner, a portion of code may not be exactly aligned with a corresponding result (e.g., the top of the code portion may not be aligned with the top of the corresponding result), but the code portion and the corresponding result may be substantially aligned (e.g., a vertical position of the code portion may align with a vertical position of the corresponding result). In this way, client device 210 may increase the quantity of results provided via the code evaluation window.

Client device 210 may provide the correspondence indicator based on one or more configuration parameters, in some implementations. For example, client device 210 may receive information identifying a configuration parameter. Client device 210 may provide the correspondence indicator based on the identified configuration parameter. Configuration parameters are described in more detail elsewhere herein.

In this way, client device 210 may separate program code from results (e.g., may group program code in a first portion of a user interface, and may group results in a second portion of the user interface), while still providing an indication of a correspondence between the program code and the results.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7G are diagrams of an example implementation 700 relating to example process 600 shown in FIG. 6. FIGS. 7A-7G depict an example where client device 210 receives an indication to evaluate (e.g., execute, debug, provide help with, etc.) program code, provides a result of evaluating the program code, and provides an indication of a correspondence between the program code and the result.

Figure 7A:
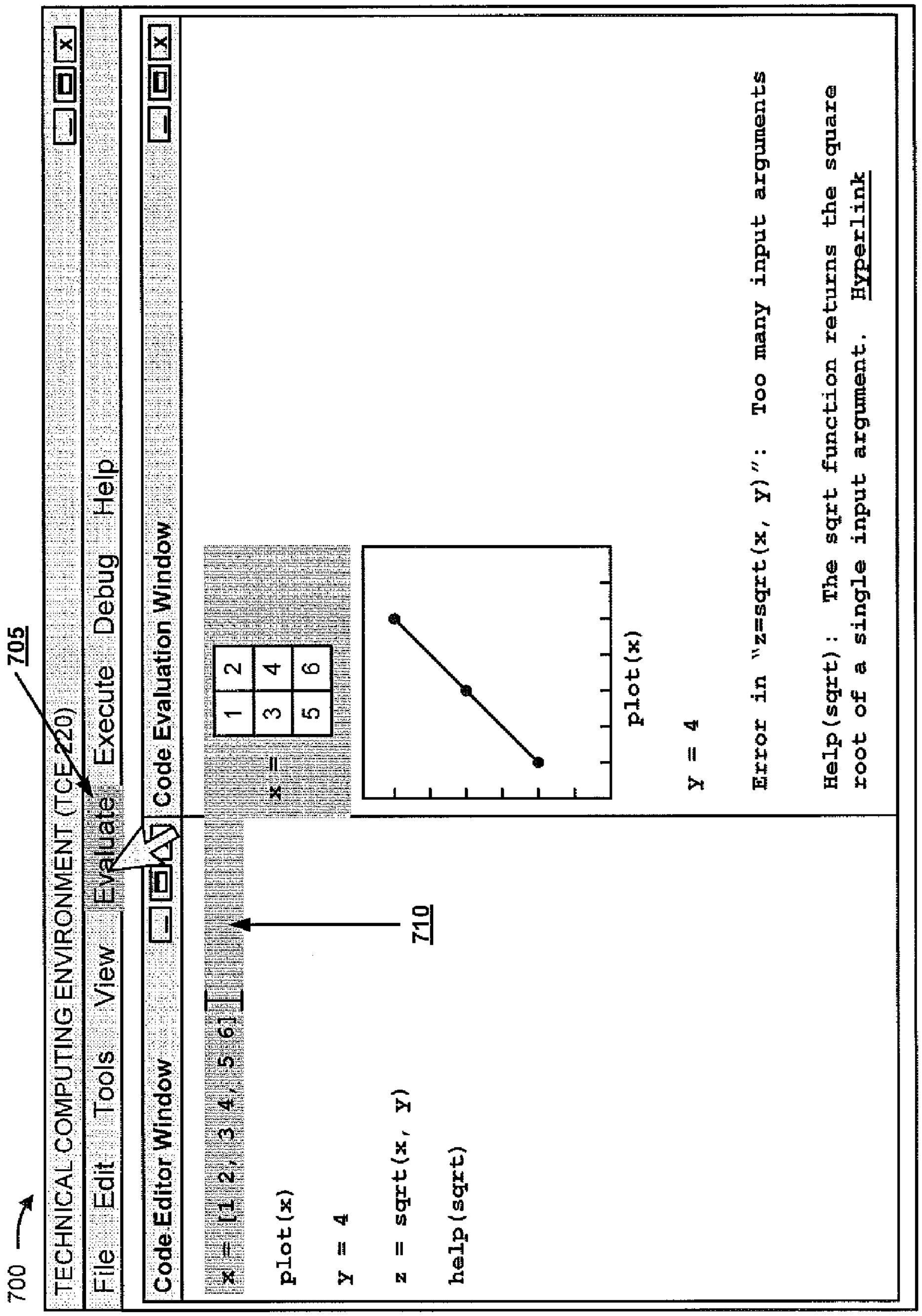
FIGS. 7A-7G are diagrams of an example implementation relating to the example process shown in FIG. 6.

As shown in FIG. 7A, a user may interact with TCE 220 to provide an indication, to client device 210, to evaluate program code via in a code editor window of a user interface associated with TCE 220. For example, as shown by reference number 705, the user may interact with an "Evaluate" button and/or another input mechanism (e.g., to trigger an evaluation using the execute mode, the debug mode, and the help mode).

Assume that user interaction with the "Evaluate" button causes client device 210 to evaluate program code in the code editor window, and to provide corresponding program code evaluation results in the code evaluation window. For example, assume that client device 210 evaluates the first line of program code, x=[2, 3 4, 5 6], to generate a three by two array stored using the variable x, and provides a representation of the three by two array stored in x, as shown. Further, assume that client device 210 evaluates the second line of program code, plot(x), to generate a plot based on the three by two array stored in x, and provides a representation of the plot, as shown. Further, assume that client device 210 evaluates the third line of program code, y=4, to store a value of 4 using the variable y, and provides a representation of the value stored using y, as shown.

Further, assume that client device 210 evaluates the fourth line of program code, z=sqrt(x, y), and determines that the fourth line of program code cannot be executed. As shown, assume that client device 210 provides an error message indicating that the fourth line of program code cannot be executed (e.g., "Error in z=sqrt(x, y)"), and provides an explanation indicating a reason that the fourth line of code cannot be executed (e.g., "Too many input arguments"). Finally, assume that client device 210 evaluates the fifth line of program code, help(sqrt), and determines that the fifth line of program code corresponds to a request for help. As shown, assume that client device 210 provides a help message that indicates a computing operation performed by the sqrt function, and provides a link to a help document that includes additional help information associated with the sqrt function.

As shown by reference number 710, assume that client device 210 highlights a selected line of program code (e.g., the first line of code), and also highlights a program code evaluation result that corresponds to the selected line of program code (e.g., a table generated by executing the first line of program code). As shown, assume that client device 210 highlights the first line of program code and the corresponding table using the same color. As further shown, assume that client device 210 aligns the first line of program code and the corresponding table along a top boundary of the line of program code and the table.

Figure 7B:
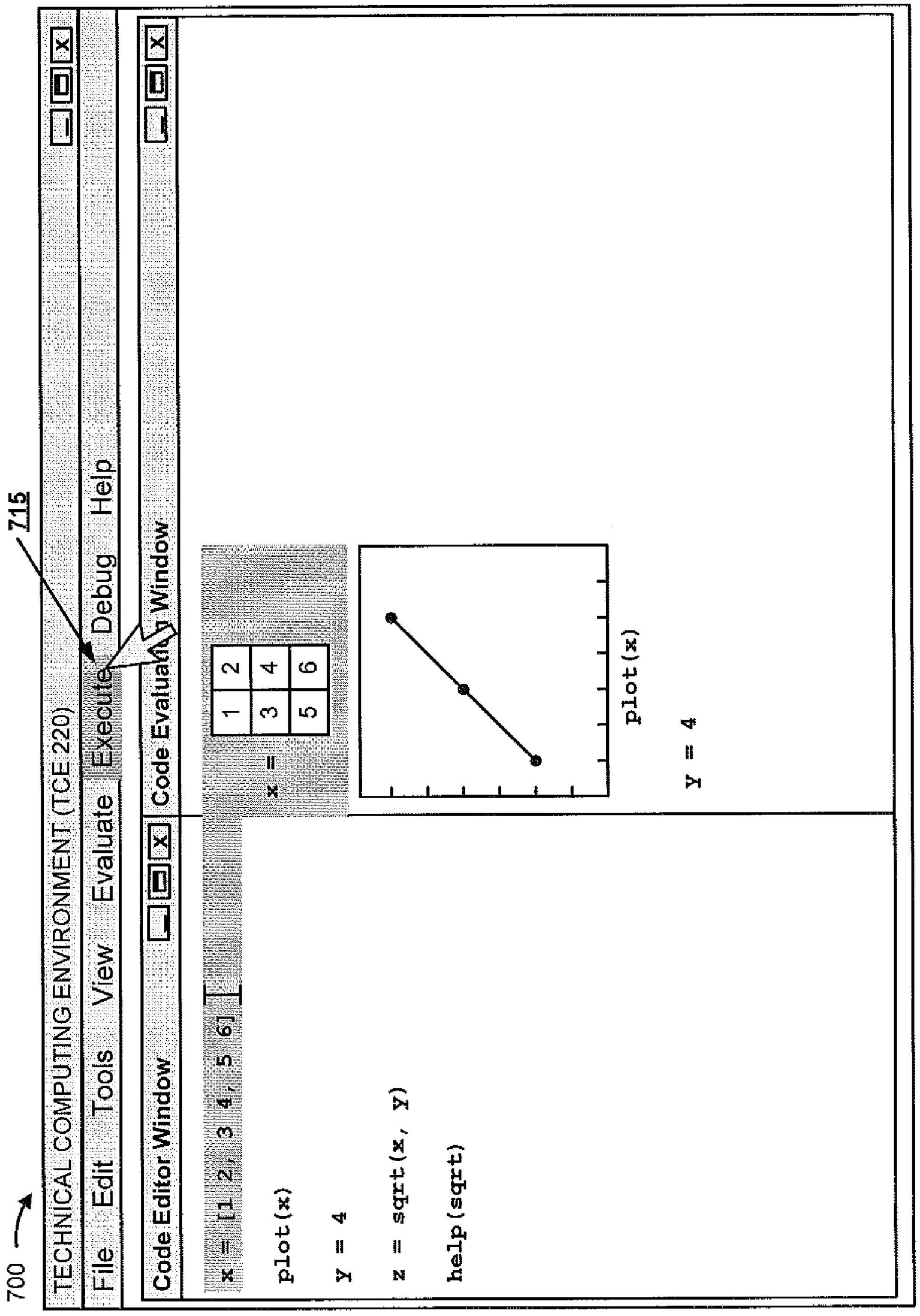

As shown in FIG. 7B, a user may interact with different input mechanisms (e.g., buttons, menu items, etc.) to cause client device 210 to provide different program code evaluation results. For example, as shown by reference number 715, the user may interact with an "Execute" button and/or another input mechanism (e.g., to trigger an evaluation using only the execute mode), which may cause client device 210 to only provide program code evaluation results obtained by executing the program code displayed in the code editor window, and may cause client device 210 to not display program code evaluation results associated with error messages and/or help messages.

As further shown in FIG. 7B, assume that user interaction with the "Execute" button causes client device 210 to provide program code evaluation results corresponding to the first, second, and third lines of program code (e.g., a table generated by executing the first line of code, a plot generated by executing the second line of code, and a variable value generated by executing the third line of code). As further shown (e.g., in comparison with FIG. 7A), assume that user interaction with the "Execute" button causes client device 210 to hide (e.g., not display) program code evaluation results associated with the fourth and fifth lines of program code (e.g., an error message generated based on evaluating the fourth line of code, and a help message generated based on evaluating the fifth line of code).

Figure 7C:
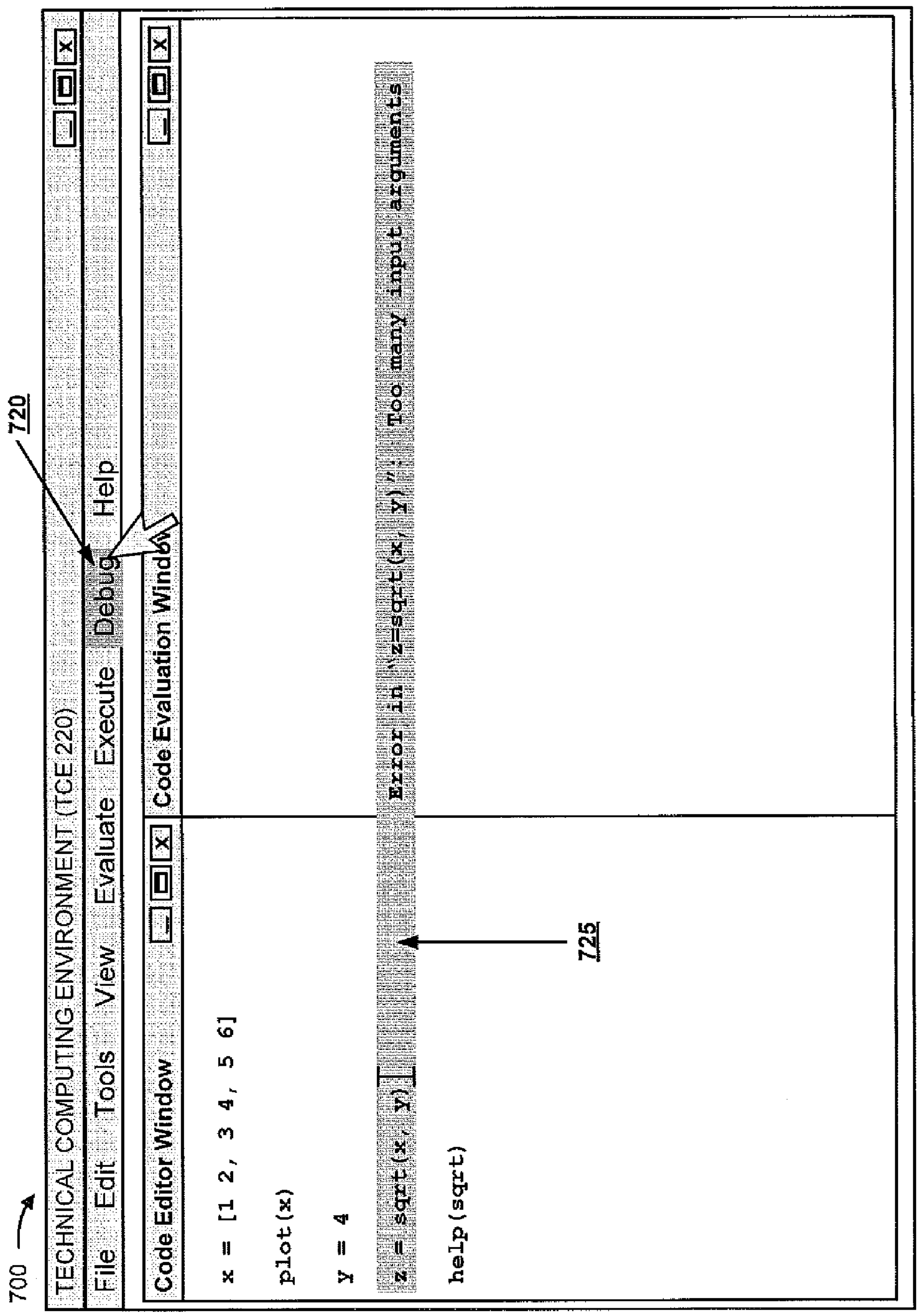

As shown in FIG. 7C, and by reference number 720, the user may interact with a "Debug" button and/or another input mechanism (e.g., to trigger an evaluation using only the debug mode), which may cause client device 210 to only provide program code evaluation results obtained by debugging the program code displayed in the code editor window (e.g., determining errors associated with the program code), and may cause client device 210 to hide program code evaluation results associated with help messages (e.g., explicit help requests input by a user, such as "help (sqrt)") and/or executable (e.g., error-free) lines of code.

As further shown in FIG. 7C, assume that user interaction with the "Debug" button causes client device 210 to provide program code evaluation results corresponding to the fourth line of program code (e.g., an error message generated based on evaluating the fourth line of code). As further shown (e.g., in comparison with FIG. 7A), assume that user interaction with the "Debug" button causes client device 210 to hide program code evaluation results associated with the first, second, third, and fifth lines of program code (e.g., a table generated by executing the first line of code, a plot generated by executing the second line of code, a variable value generated by executing the third line of code, and a help message generated based on evaluating the fifth line of code).

As shown by reference number 725, user interaction with the "Debug" button may cause client device 210 to highlight one or more lines of code (e.g., the fourth line of code) associated with a debug operation (e.g., lines of program code that generate errors), and to also highlight a program code evaluation result that corresponds to the highlighted lines of program code (e.g., an error message generated based on evaluating the fourth line of code). As shown, assume that client device 210 highlights the fourth line of program code and the corresponding error message using the same color, and aligns the fourth line of program code and the corresponding error message along a top boundary of the fourth line of program code and the error message.

Figure 7D:
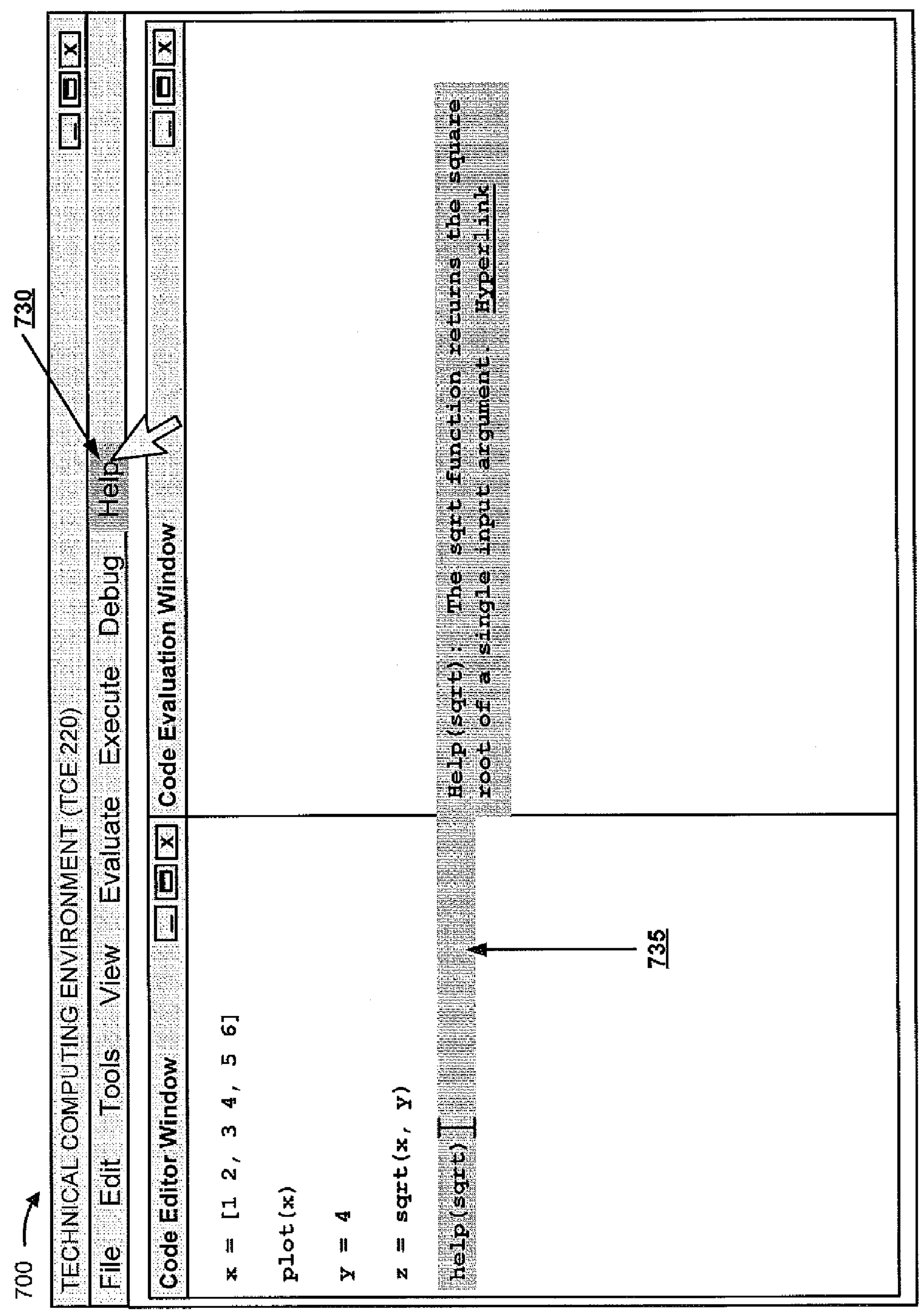

As shown in FIG. 7D, and by reference number 730, the user may interact with a "Help" button and/or another input mechanism (e.g., to trigger an evaluation using only the help mode), which may cause client device 210 to only provide program code evaluation results obtained by evaluating the program code, provided in the code editor window, for help requests (e.g., explicit help requests in the program code), and may cause client device 210 to hide program code evaluation results associated with error messages (e.g., errors determined based on evaluating and/or executing the program code) and/or executable (e.g., error-free) lines of code that do not include help requests.

As further shown in FIG. 7D, assume that user interaction with the "Help" button causes client device 210 to provide program code evaluation results corresponding to the fifth line of program code (e.g., a help message generated based on evaluating the fifth line of code). As further shown (e.g., in comparison with FIG. 7A), assume that user interaction with the "Help" button causes client device 210 to hide program code evaluation results associated with the first, second, third, and fourth lines of program code (e.g., a table generated by executing the first line of code, a plot generated by executing the second line of code, a variable value generated by executing the third line of code, and an error message generated based on evaluating the fourth line of code).

As shown by reference number 735, user interaction with the "Help" button may cause client device 210 to highlight one or more lines of code (e.g., the fifth line of code) associated with a help operation (e.g., lines of program code that include a help request), and to also highlight a program code evaluation result that corresponds to the highlighted lines of program code (e.g., a help message generated based on evaluating the fifth line of code). As shown, assume that client device 210 highlights the fifth line of program code and the corresponding help message using the same color, and aligns the fifth line of program code and the corresponding help message along a top boundary of the fifth line of program code and the help message.

Figure 7E:
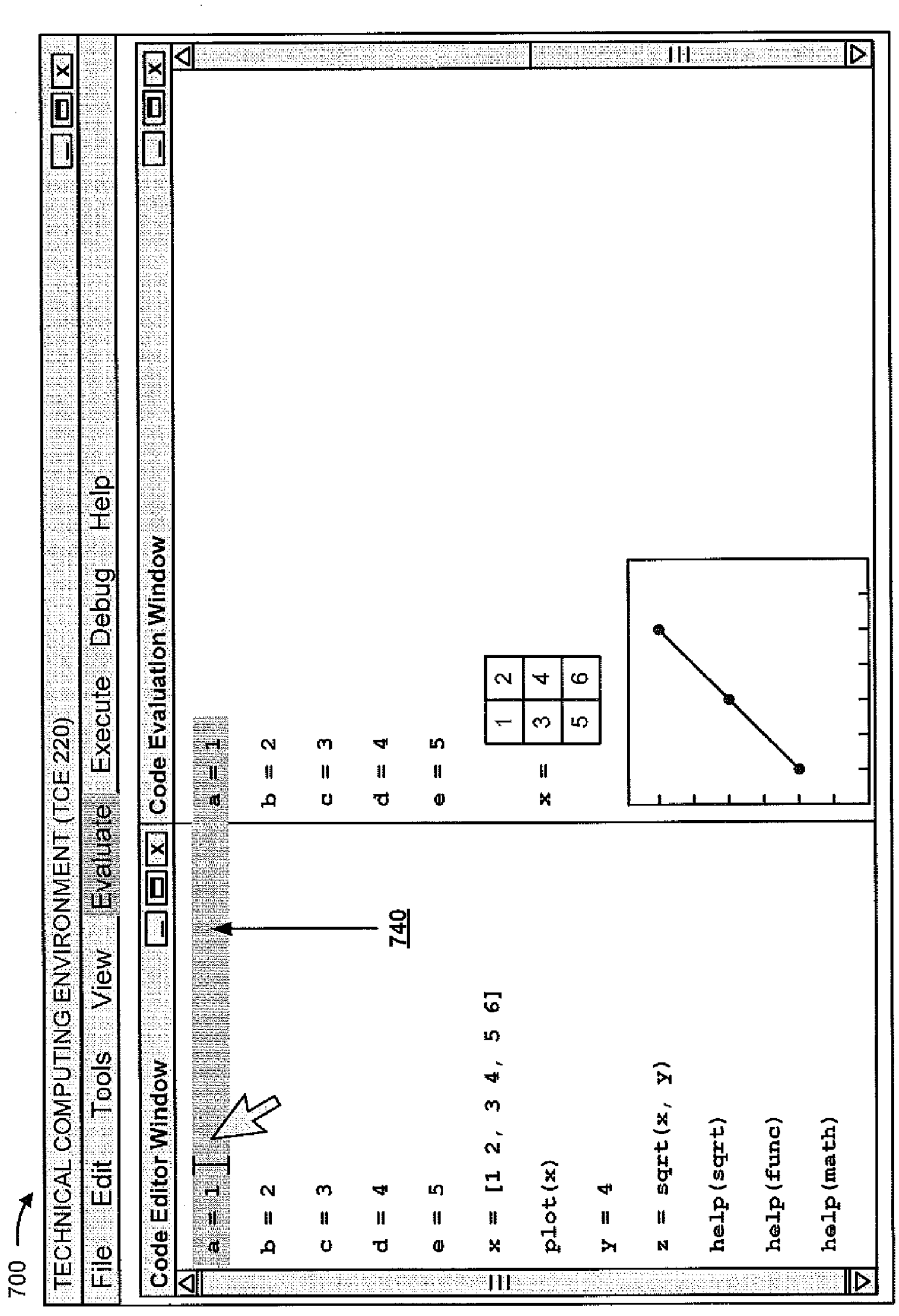
Figure 7F:
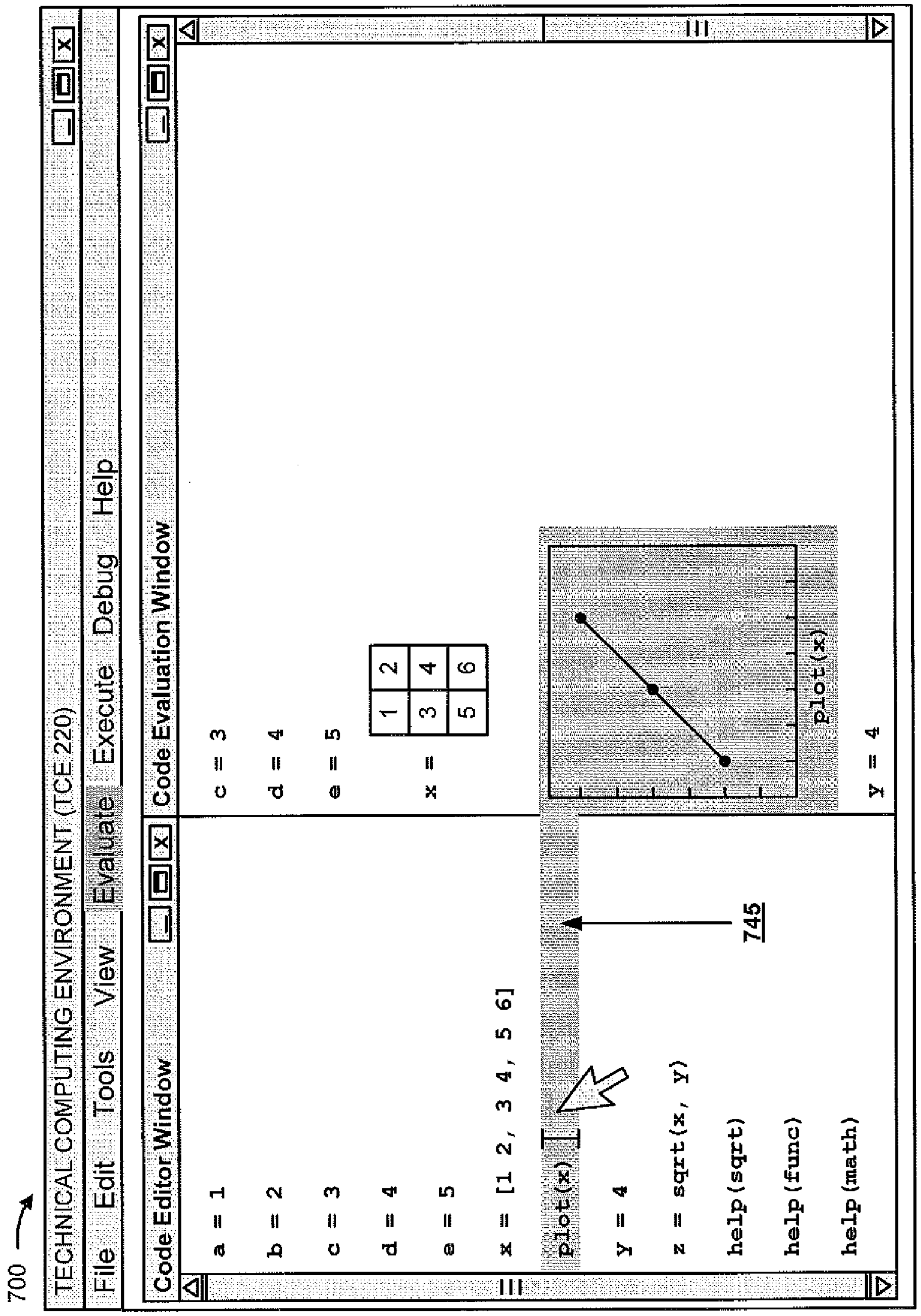
Figure 7G:
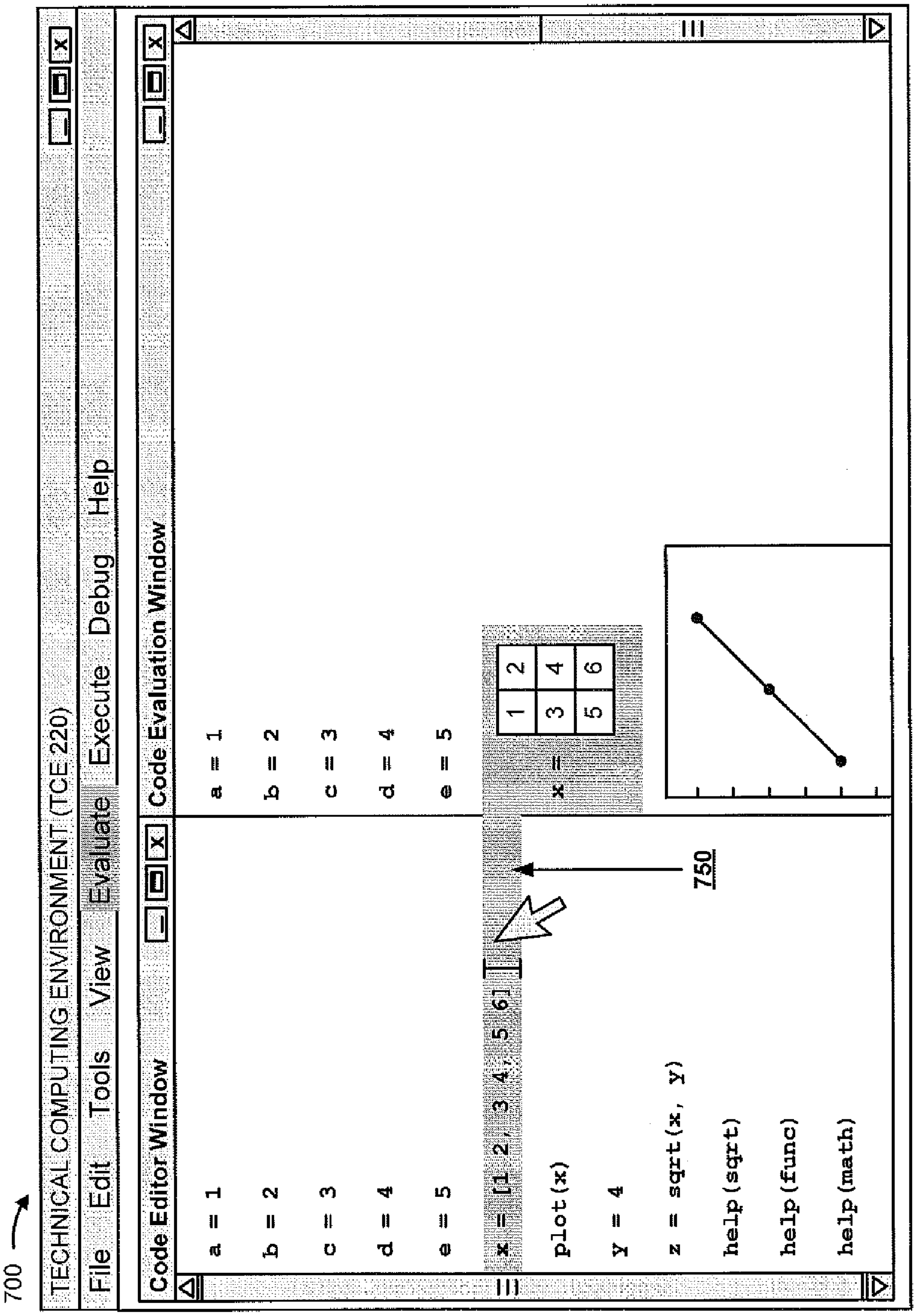

As shown in FIG. 7E, and by reference number 740, assume that a user selects a first line of code (e.g., a=1), and the first line of code and a corresponding result are aligned and highlighted. As shown in FIG. 7F, and by reference number 745, assume that the user selects a second line of code (e.g., plot(x)), and scrolls the code evaluation window upward so that a plot corresponding to the second line of code is aligned with the second line of code. For example, client device 210 may insert bottom padding below the plot so that the plot is aligned with the second line of code. As shown in FIG. 7G, and by reference number 750, assume that the user selects a third line of code (e.g., x=[1 2, 3 4, 5 6]), and scrolls the code evaluation window downward so that a table corresponding to the third line of code is aligned with the third line of code. For example, client device 210 may insert top padding above the table so that the table is aligned with the third line of code.

As indicated above, FIGS. 7A-7G are provided merely as an example. Other examples are possible and may differ from what was described with regard to FIGS. 7A-7G. For example, a user may specify any combination of the execute mode, the debug mode, the help mode, and/or other modes, and client device 210 may evaluate one or more portions of program code based on the specified evaluation modes.

FIGS. 8A-8D are diagrams of another example implementation 800 relating to example process 600 shown in FIG. 6. FIGS. 8A-8D provide examples of interactive results that may be provided by client device 210.

Figure 8A:
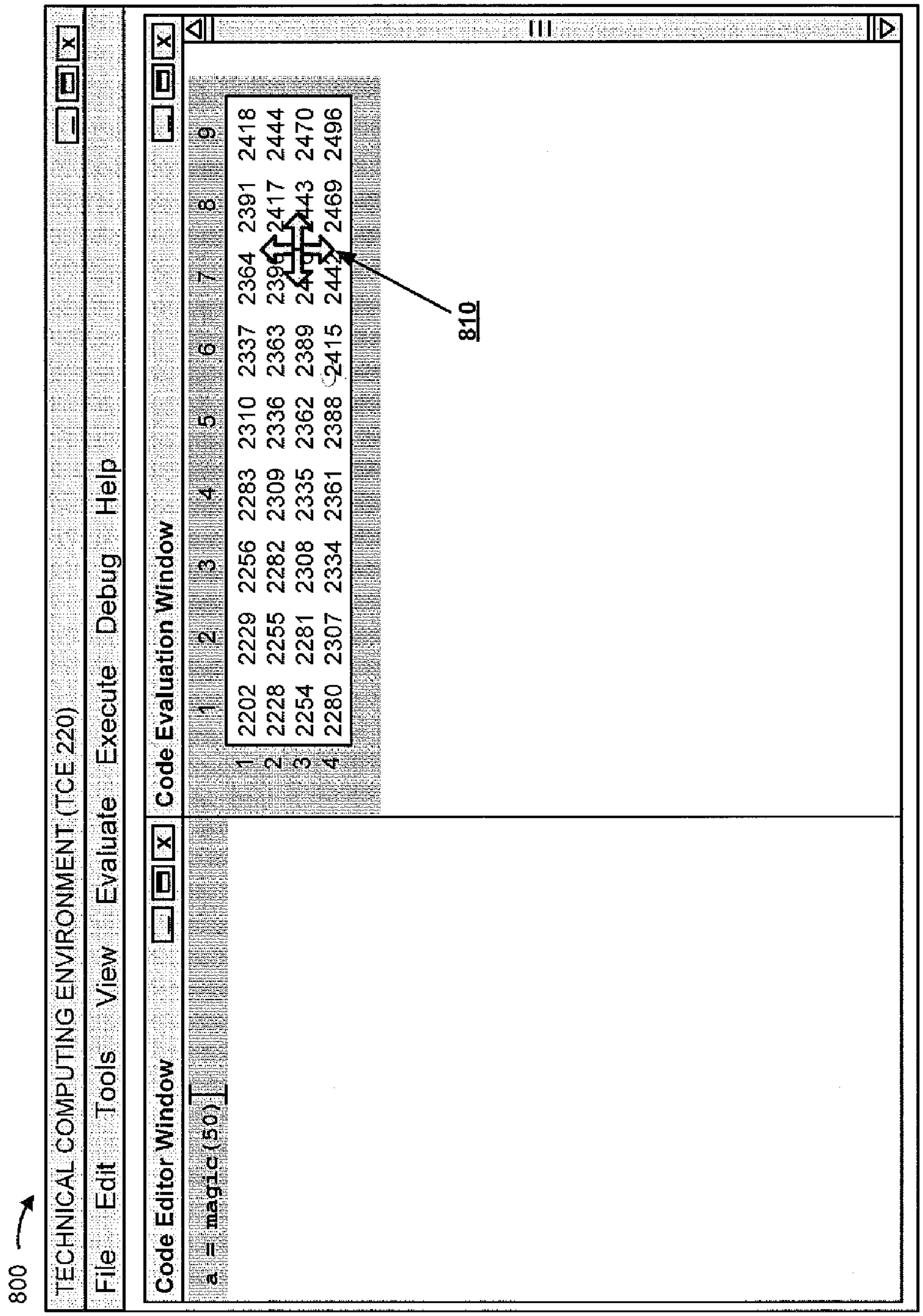
FIGS. 8A-8D are diagrams of another example implementation relating to the example process shown in FIG. 6.

As shown in FIG. 8A, a user may input program code (e.g., a=magic(50)) that causes client device 210 to display a table of values for a 50×50 magic square (e.g., a 50×50 matrix constructed using the integers from 1 through $50^2$, where every row and column of the matrix have equal sums). As shown by reference number 810, the user may move a cursor over the table to interact with the table, and the cursor may change to indicate that the user may interact with the table. For example, the user may click and drag to scroll through the rows, columns, cells, and/or values of the table. As another example, the user may zoom in to the table to view more detail associated with a particular cell of the table, or may zoom out of the table to view more cells. In some implementations, the user may select a cell (e.g., by selecting a value provided in the cell), and client device 210 may provide information associated with the selected cell (e.g., a value provided in the cell, a formula used to calculate a value provided in the cell, a list of cells with values used as input to the cell, a list of cells to which the cell provides input, etc.).

Figure 8B:
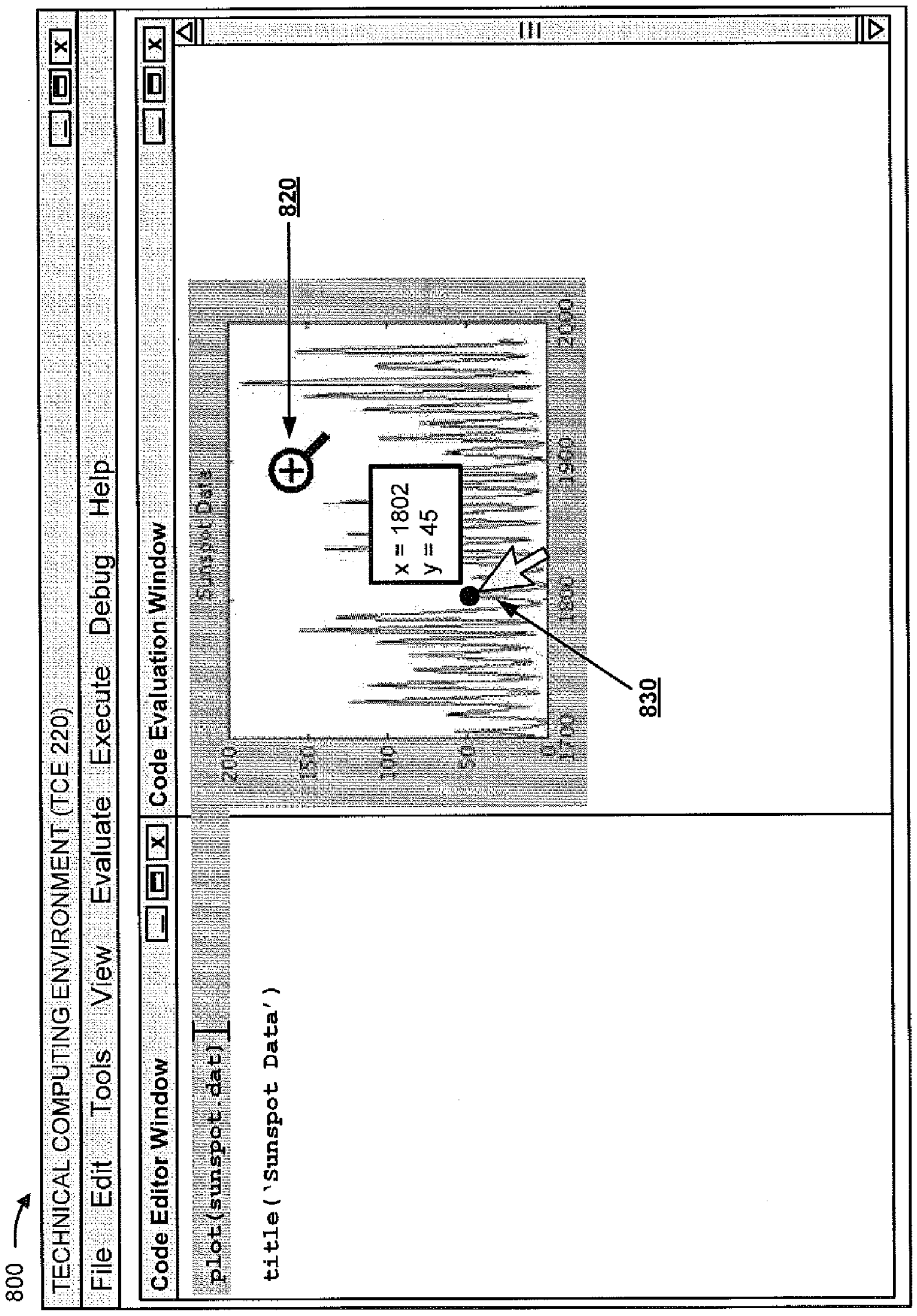

As shown in FIG. 8B, a user may input program code (e.g., plot(sunspot.dat)) that causes client device 210 to display a plot with data loaded from a file (e.g., a file named sunspot.dat). As shown by reference number 820, the user may move a cursor over the table to interact with the table, and the cursor may change to indicate that the user may interact with the table. For example, the user may zoom in to the plot to view more detail associated with a particular portion of the plot, or may zoom out of the plot to view more data. As another example, the user may click and drag and/or may interact with one or more input mechanisms to scroll through the plot. As shown by reference number 830, the user may select a portion of the plot (e.g., by clicking on a plotted point), and client device 210 may provide information associated with the selected portion of the plot (e.g., one or more values, such as x and y coordinates, associated with the plotted point, or the like).

Figure 8C:
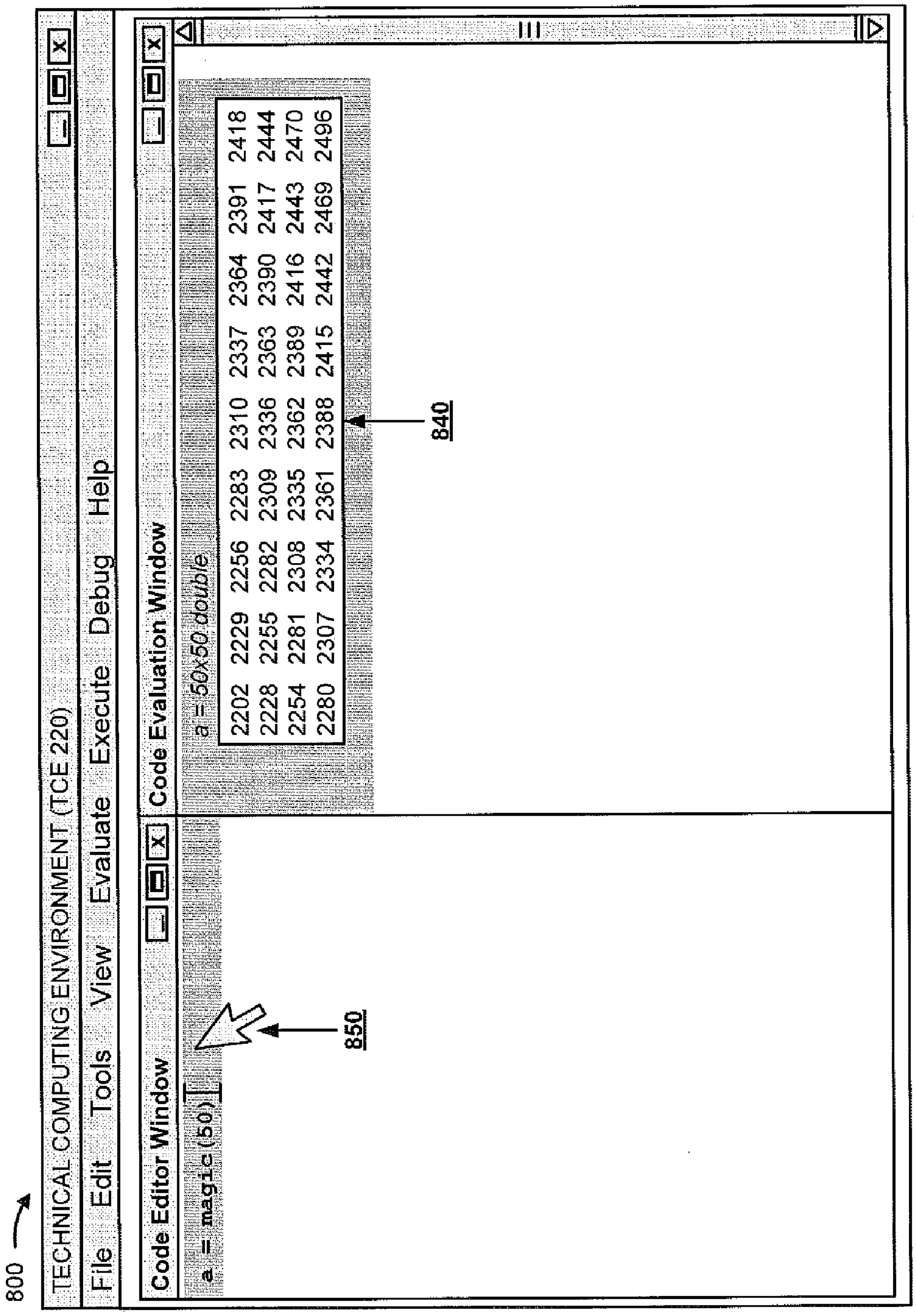

As shown in FIG. 8C, assume that the user inputs program code a=magic (50), which causes client device 210 to display a result 840, which represents a table of values for a 50×50 magic square. As further shown, assume that a cursor 850 is not placed on result 840. Due to cursor 850 not being placed over result 840, result 840 may include the text "a=50×50 double" to indicate that name of the variable (a), the dimensions of the variable (50×50), and a data type of the variable (double).

Figure 8D:
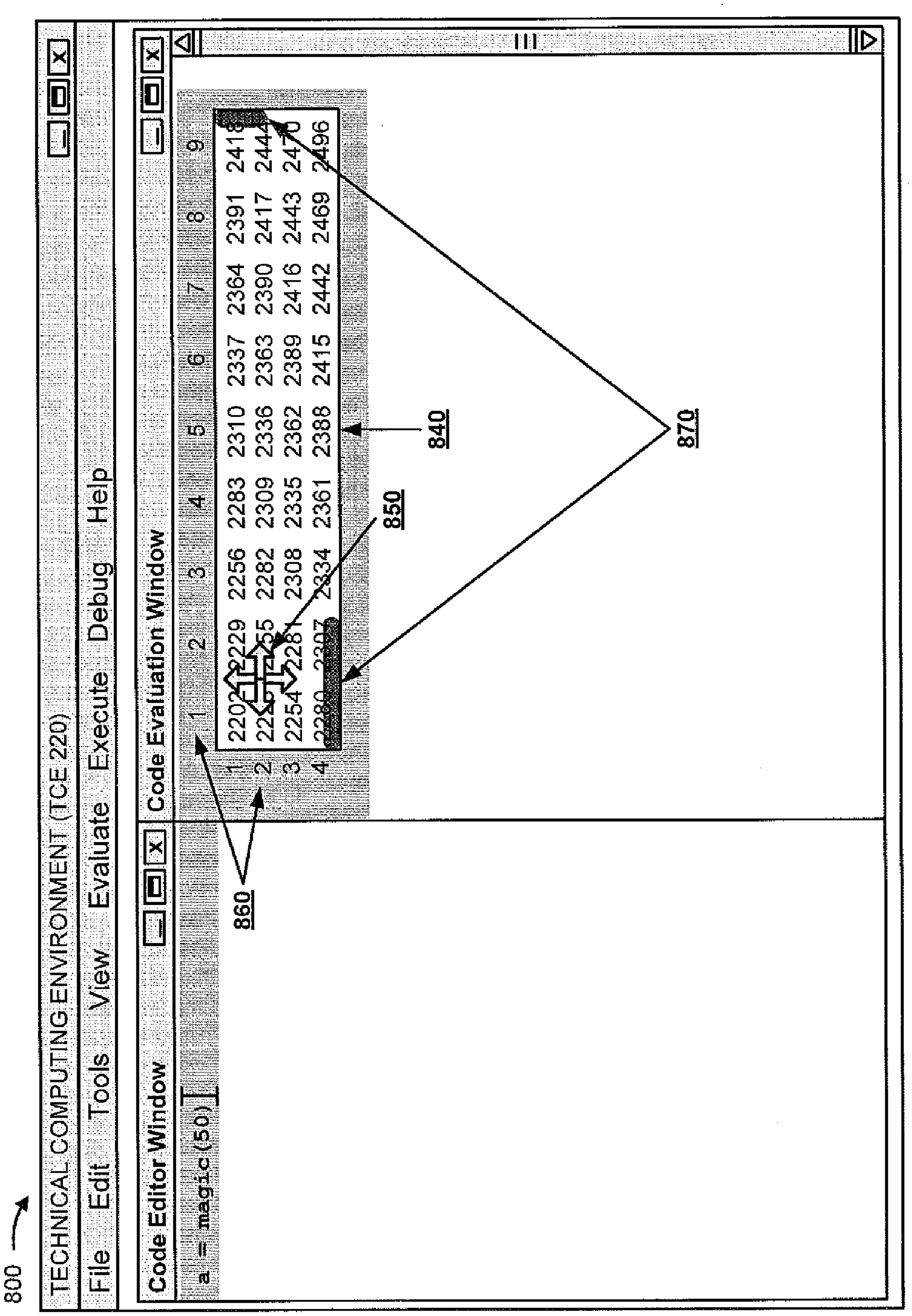

As shown in FIG. 8D, assume that the user interacts with TCE 220 to cause cursor 850 to be placed over result 840. Placing cursor 850 over result 840 may cause row and/or column headings to be provided in result 840 (e.g., row and column headings for the matrix), as shown by reference number 860. Furthermore, the row and/or column headings may replace the information that identifies the name, dimensions, and/or data type of the variable, so as to keep the size of result 840 the same when cursor 850 hovers over result 840, and to provide an indication that the user may interact with result 840 (e.g., by selecting one or more rows and/or columns). Placing cursor 850 over result 840 may further cause scroll bars 870 to appear to indicate that the user may interact with scroll bars 870 to scroll through result 840. As shown, client device 210 may provide scroll bars 870 transparently in front of a portion of result 840, so as keep a size of result 840 the same when cursor 850 hovers over result 840, and to provide an indication that the user may interact with result 840 (e.g. to scroll through result 840).

As indicated above, FIGS. 8A-8D are provided merely as an example. Other examples are possible and may differ from what was described with regard to FIGS. 8A-8D. For example, other result types besides tables and plots may be interactive, and may allow a user to perform a zooming operation for the result, to perform a scrolling operation for the result, to request and be provided with additional information associated with the result, or the like.

Figure 9:
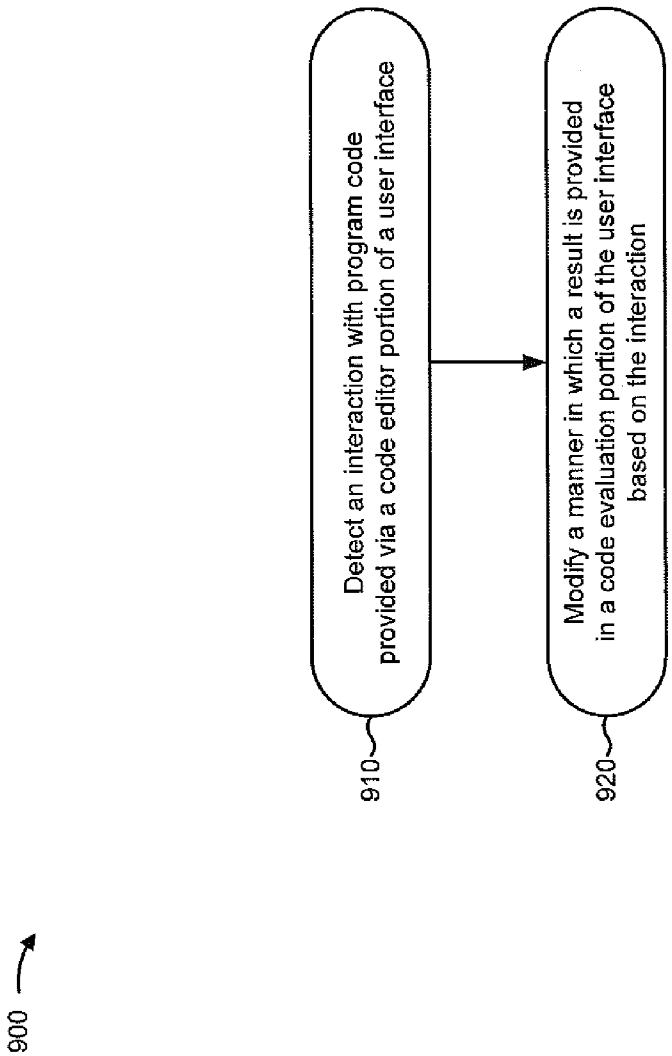
FIG. 9 is a flow chart of an example process for modifying a manner in which program code evaluation results are displayed based on an interaction with the program code.

FIG. 9 is a flow chart of an example process 900 for modifying a manner in which program code evaluation results are displayed based on an interaction with the program code. In some implementations, one or more process blocks of FIG. 9 may be performed by client device 210. In some implementations, one or more process blocks of FIG. 9 may be performed by another device or a group of devices separate from or including client device 210, such as server device 230.

As shown in FIG. 9, process 900 may include detecting an interaction with program code provided via a code editor portion of a user interface (block 910). For example, client device 210 may detect an interaction (e.g., a user interaction) with program code displayed in a code editor portion of a user interface (e.g., a user interface of TCE 220). Client device 210 may detect the interaction based on receiving user input, such as a user selection of a particular portion of program code. For example, a user may click on a particular portion of program code (e.g., may click on a line of code, may click on a function, may click on a block of code, etc.), may use a keyboard to select a particular portion of code (e.g., may navigate to a line of code using an up arrow or a down arrow), may select a particular portion of code using a finger (e.g., via a touch screen), may use a hand gesture to select a particular portion of code (e.g., touching, swiping, pinching, etc.), or the like. The interaction may cause a cursor (e.g., a text cursor, a mouse cursor, etc.) to be displayed in association with the selected portion of program code (e.g., within the text of the program code, on a selected line of code, etc.). In some implementations, client device 210 may detect the interaction by detecting and/or receiving user input of an additional portion of program code.

As further shown in FIG. 9, process 900 may include modifying a manner in which a result is provided in a code evaluation portion of the user interface based on the interaction (block 920). For example, client device 210 may modify a manner in which one or more program code evaluation results are displayed in a code evaluation window (e.g., of TCE 220), based on detecting the interaction with the program code displayed in the code editor window.

In some implementations, client device 210 may detect user selection of a portion of program code (e.g., displayed in the code editor window), may provide an indication of the selected portion of program code, and/or may provide an indication of a result (e.g., displayed in the code evaluation window) that corresponds to the selected portion of program code. Additionally, or alternatively, client device 210 may detect user selection of a result (e.g., displayed in the code evaluation window), may provide an indication of the selected result, and/or may provide an indication of a portion of program code (e.g., displayed in the code editor window) that corresponds to the selected result. In some implementations, client device 210 may provide the indication(s) using a correspondence indicator (or a portion of a correspondence indicator associated with one of the program code portion or the result), as discussed herein in connection with FIG. 6.

As an example, when a user selects a portion of code, client device 210 may highlight the selected portion of code and the corresponding result (e.g., using a same color, a similar color of different shades, a different color, etc.), may outline the selected portion of code and the corresponding result (e.g., using a same color, line weight, line style, etc.), may mark the selected portion of code and the corresponding result (e.g., using a same number, letter, character, symbol, etc.), or the like. In some implementations, the correspondence indicator may include multiple separate highlighted and/or outlined areas of the user interface, where the highlighted/outlined areas do not intersect or overlap (e.g., a first area highlighting selected code, and a second area highlighting a corresponding result). In some implementations, the correspondence indicator may include a single highlighted and/or outlined area of the user interface (e.g., an area highlighting selected code and a corresponding result, where there is no break in the highlighting).

Additionally, or alternatively, client device 210 may provide the correspondence indicator by aligning the selected portion of code and the corresponding result. For example, client device 210 may align a top boundary of the selected portion of code with a top boundary of the corresponding result. In some implementations, alignment of program code and a corresponding result may cause client device 210 to scroll program code displayed in a code editor window (e.g., scroll up or down), and/or may cause client device 210 to scroll results displayed in a code evaluation window. In some implementations, client device 210 may scroll information (e.g., program code and/or results) in a manner that increases (e.g., maximizes) the amount of information displayed in the code editor window and/or the code evaluation window (e.g., maximizes a quantity of displayed lines of code without reducing a size of the code text, maximizes a quantity of displayed results without reducing a size of the displayed results, etc.).

Client device 210 may scroll program code and/or results based on a user interaction with provided program code and/or provided results, in some implementations. For example, a user may scroll through program code provided via a code editor window, which may cause client device 210 to scroll through results provided via a code evaluation window such that one or more displayed results correspond to one or more displayed portions of program code. Similarly, the user may scroll through results provided via a code evaluation window, which may cause client device 210 to scroll through program code provided via a code editor window such that one or more displayed portions of program code correspond to one or more displayed results. In some implementations, client device 210 may detect that scrolling has stopped (e.g., after a threshold period of time), and may align one or more portions of code and one or more corresponding results (e.g., may align a top boundary of a portion of code, displayed at the top of the code editor window, and a top boundary of a result corresponding to the portion of code).

In some implementations, client device 210 may modify a manner in which a result is displayed based on detecting and/or receiving user input of an additional portion of program code. For example, when a user inputs an additional portion of program code, client device 210 may evaluate the additional portion of program code to generate a corresponding result (e.g., based on the detection and/or based on user interaction with an input mechanism), and may provide the corresponding result in the code evaluation window.

A result may be associated with a loop (e.g., a FOR loop, a WHILE loop, etc.), in some implementations. In this case, multiple results may correspond to the same portion of code (e.g., a line of code within the loop), and client device 210 may provide a correspondence indicator between the portion of code and the multiple results. In some implementations, client device 210 may provide the most recently calculated result (e.g., a result associated with the last iteration of the loop). Additionally, or alternatively, client device 210 may provide an input mechanism that permits a user to expand the result to view results associated with multiple iterations of the loop (e.g., all iterations, a subset of the iterations, etc.).

Additionally, or alternatively, client device 210 may change a provided result, associated with a loop, over time. For example, client device 210 may display a first result associated with a first iteration of the loop, may determine that a particular amount of time has elapsed, may replace the first result with a second result associated with a second iteration of the loop based on determining that the particular amount of time has elapsed, and may continue in this manner until a last result associated with a last iteration is displayed. After the particular amount of time has elapsed, client device 210 may replace the last result with the first result, and may continue to provide results associated with the loop in this manner.

Client device 210 may change the provided result based on receiving user input, in some implementations. For example, client device 210 may provide one or more input mechanisms (e.g., a play input mechanism, a pause input mechanism, a rewind input mechanism, a fast forward input mechanism, etc.) that permit a user to step forward through the loop (e.g., at one or more speeds), to step backward through the loop (e.g., at one or more speeds), to pause the stepping operation (e.g., to display a particular result until further input is received), or the like. For example, a loop may cause an animation to be displayed, and the user may interact with the input mechanism to cause the animation to play, pause, rewind, fast forward, etc.

In some implementations, client device 210 may provide a loop navigator mechanism that controls a result that is displayed and/or a result that is indicated by a correspondence indicator. A user may interact with the loop navigator mechanism to provide input that specifies a result, associated with the loop, that is to be displayed and/or indicated in the code evaluation window. For example, a user may provide input that identifies one or more values of one or more loop counters (e.g., one or more variables that control iterations of the loop), and client device 210 may provide one or more results that correspond to the selected value(s) of the loop counter(s). In this way, client device 210 may reduce the amount of information provided, at the same time, via the code evaluation window.

In some implementations, client device 210 may provide information associated with the loop. For example, client device 210 may identify one or more executed portions of code within the loop, a quantity of iterations that were executed, a quantity of times that a particular variable changed values during execution of the loop, or the like.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

FIGS. 10A-10E are diagrams of an example implementation 1000 relating to example process 900 shown in FIG. 9. FIGS. 10A-10E depict examples where client device 210 detects a user selection of a portion of program code provided in a code editor window, provides an indication of the selected portion of program code, and modifies a manner in which a result, corresponding to the selected portion of program code, is displayed.

Figure 10A:
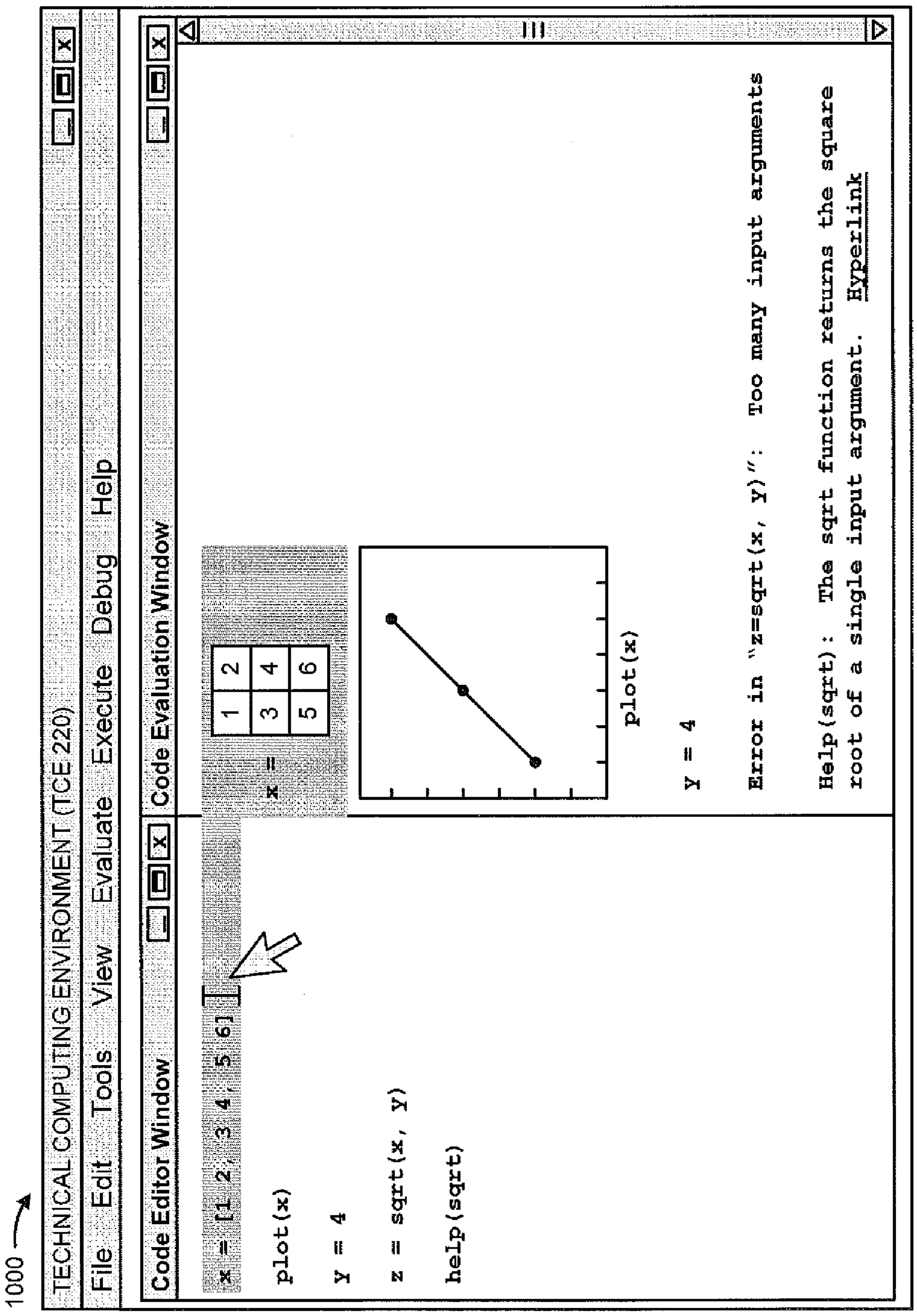
FIGS. 10A-10E are diagrams of an example implementation relating to the example process shown in FIG. 9.

As shown in FIG. 10A, assume that a user interacts with TCE 220 to select a first line of program code displayed in a code editor window, shown as "x=[1 2, 3 4, 5 6]." Based on receiving the user selection, client device 210 highlights the first line of program code, and also highlights a corresponding result displayed in the code evaluation window, shown as a table of an array generated by executing the first line of program code. In this example, client device 210 highlights the first line of code and the corresponding result using a single continuous highlighted area of the same color, and also aligns the top boundaries of the first line of code and the corresponding result.

Figure 10B:
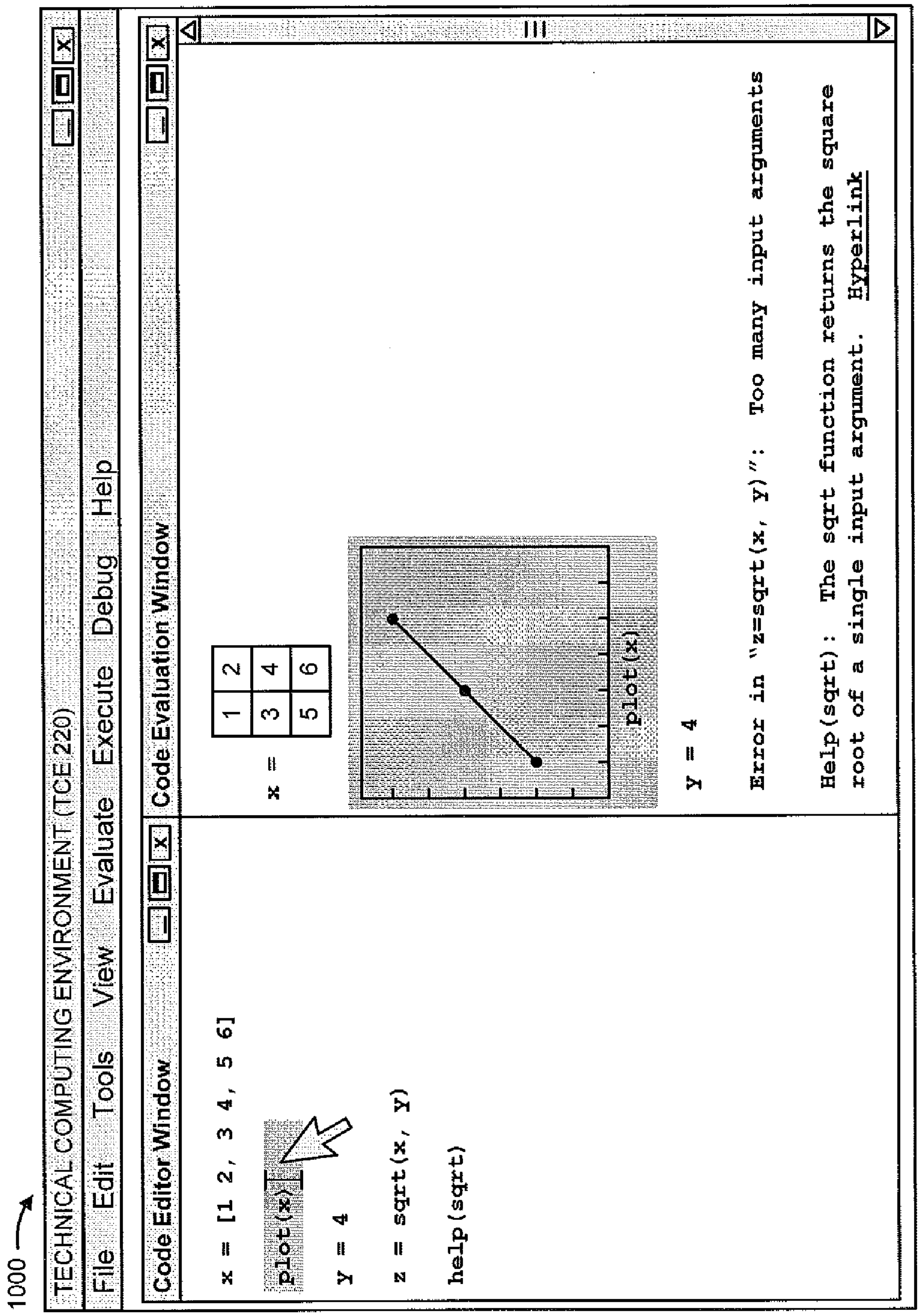

As shown in FIG. 10B, assume that a user interacts with TCE 220 to select a second line of program code displayed in a code editor window, shown as "plot(x)." Based on receiving the user selection, client device 210 highlights the second line of program code, and also highlights a corresponding result displayed in the code evaluation window, shown as a plot generated by executing the second line of program code. In this example, client device 210 highlights the second line of code and the corresponding result using two separate highlighted areas of the same color.

In the example of FIG. 10B, client device 210 does not align the top boundaries of the second line of code and the corresponding result, so as to maximize the quantity of results displayed in the code evaluation window. For example, alignment of the top boundaries of the second line of code and the corresponding result may cause the table associated with the first line of code to scroll up and out of the code evaluation window (e.g., compare to FIG. 10C, where results have scrolled out of the window), and may cause the bottom portion of the code evaluation window (e.g., below the help message corresponding to the fifth line of code) to be filled with blank space (e.g., because the help message is the last result). Client device 210 may determine that alignment will cause such scrolling behavior (e.g., replacement of a result with blank space), and may not align the second line of code and the corresponding result based on the determination.

Figure 10C:
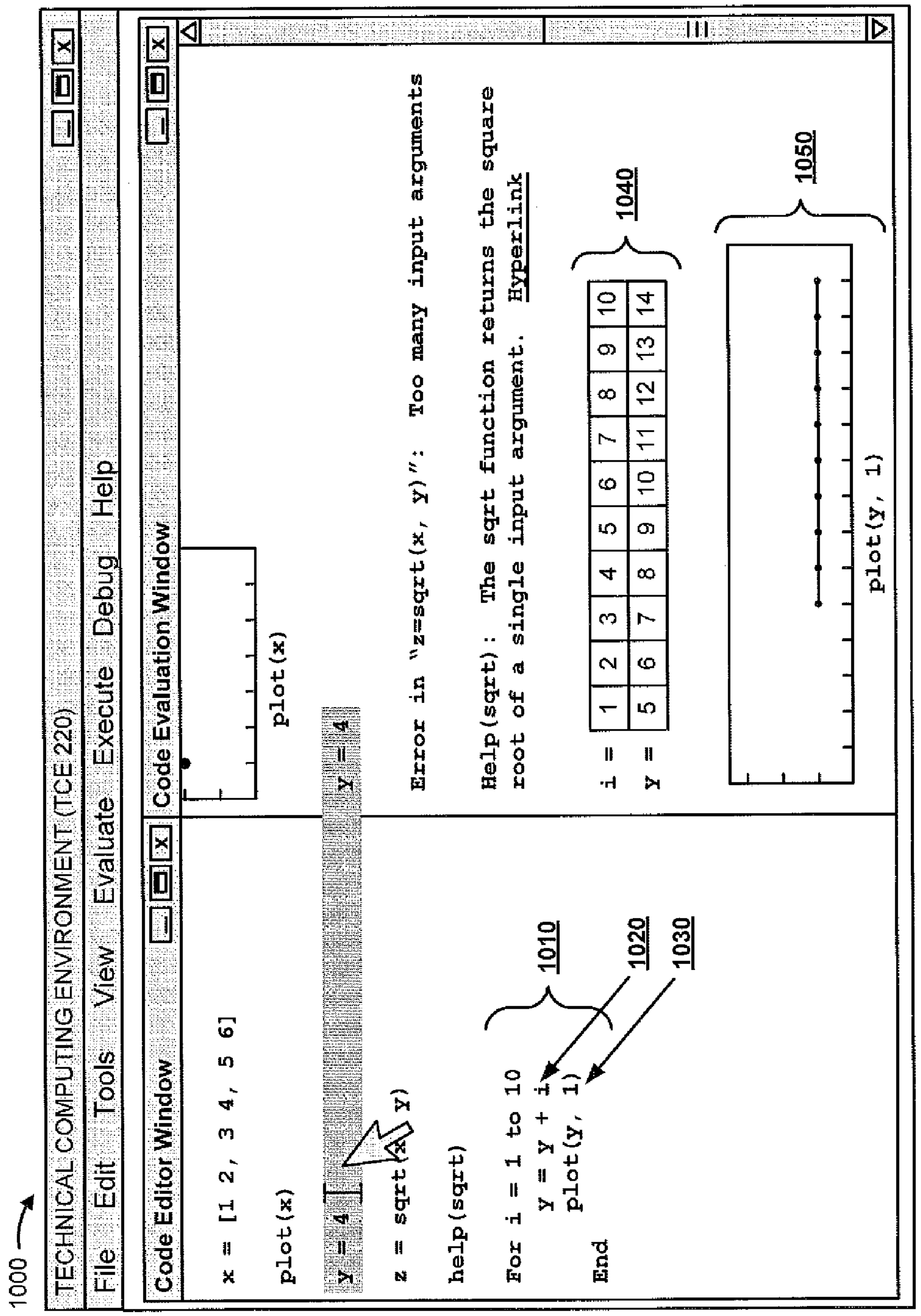

As shown in FIG. 10C, assume that the user inputs an additional portion of program code, shown by reference number 1010. Code portion 1010 represents a block of program code that includes a FOR loop. Code portion 1010 includes, within the FOR loop, code portion 1020 (e.g., y=y+i) and code portion 1030 (e.g., plot(y, 1)). Based on detecting user input of code portion 1010, client device 210 evaluates code portion 1010 to generate a result 1040 corresponding to code portion 1020, and a result 1050 corresponding to code portion 1030. Result 1040 represents a table that indicates values of a variable i used as a loop counter in the FOR loop (e.g., For i=1 to 10), and corresponding values of a variable y calculated based on code portion 1020 (e.g., y=y+i) during each iteration of the loop. Result 1050 represents a plot generated based on executing code portion 1030 (e.g., plot(y, 1)) over each iteration of the loop.

As further shown in FIG. 10C, assume that a user interacts with TCE 220 to select a third line of program code displayed in a code editor window, shown as "y=4." Based on receiving the user selection, client device 210 highlights the third line of program code, and also highlights a corresponding result displayed in the code evaluation window, shown as text indicating that y=4. In this example, client device 210 highlights the third line of code and the corresponding result using a single continuous highlighted area of the same color. Client device 210 also aligns the top boundaries of the third line of code and the corresponding result.

As further shown in FIG. 10C, alignment of the boundaries of the third line of code and the corresponding result causes client device 210 to scroll results provided via the code evaluation window. As shown, client device 210 has scrolled the table, associated with the first line of code, up and completely out of the code evaluation window, and has scrolled the plot, associated with the second line of code (e.g., plot(x)), up and partially out of the code evaluation window. Client device 210 has also scrolled results 1040 and 1050 up and into the code evaluation window. In this example, client device 210 may determine that alignment will not cause replacement of a result with blank space in the code evaluation window (e.g., will cause replacement of a first result, at the top of the window, with a second result, at the bottom of the window), and may align the third line of code and the corresponding result based on the determination.

Figure 10D:
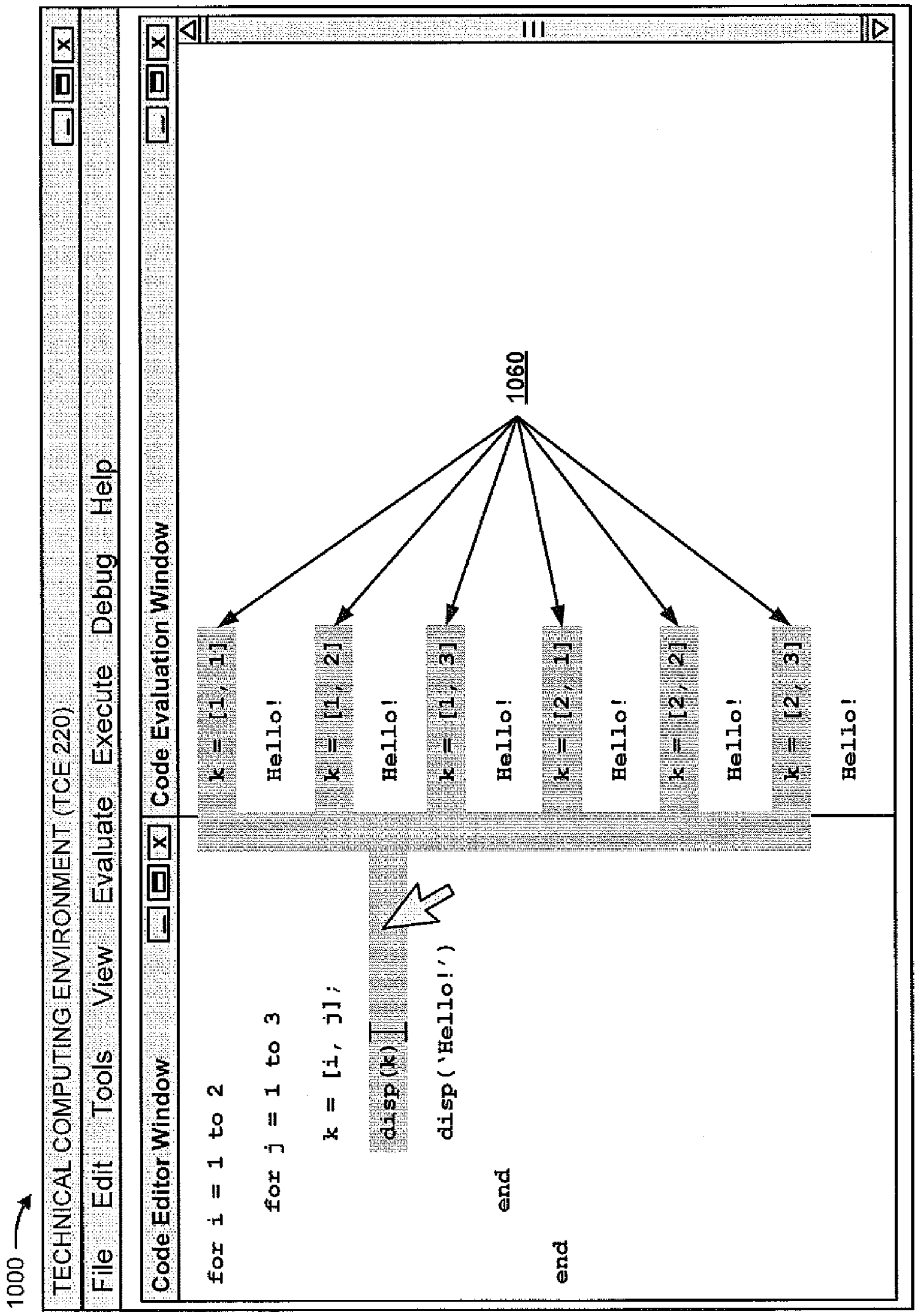

As shown in FIG. 10D, a user may input program code representing a nested loop. Assume that the nested loop includes a first loop counter i that counts from one to two (e.g., for i=1 to 2) and a second loop counter j that counts from one to three (e.g., for j=1 to 3). Further assume that during each iteration of the loop, client device 210 determines an array k based on i and j (e.g., k=[i, j]), displays the array k (e.g., disp(k)), and displays the text "Hello!" (e.g., disp('Hello!)). As shown by reference number 1060, the user may select the line of code that displays the array k (e.g., disp(k)), and client device 210 may provide one or more correspondence indicators between the selected line of code and the multiple results corresponding to the selected line of code (e.g., k=[1, 1], k=[1, 2], k=[1, 3], k=[2, 1], k=[2, 2], k=[2, 3]). For example, client device 210 may highlight the selected line of code and the multiple corresponding results using the same color, as shown.

Figure 10E:
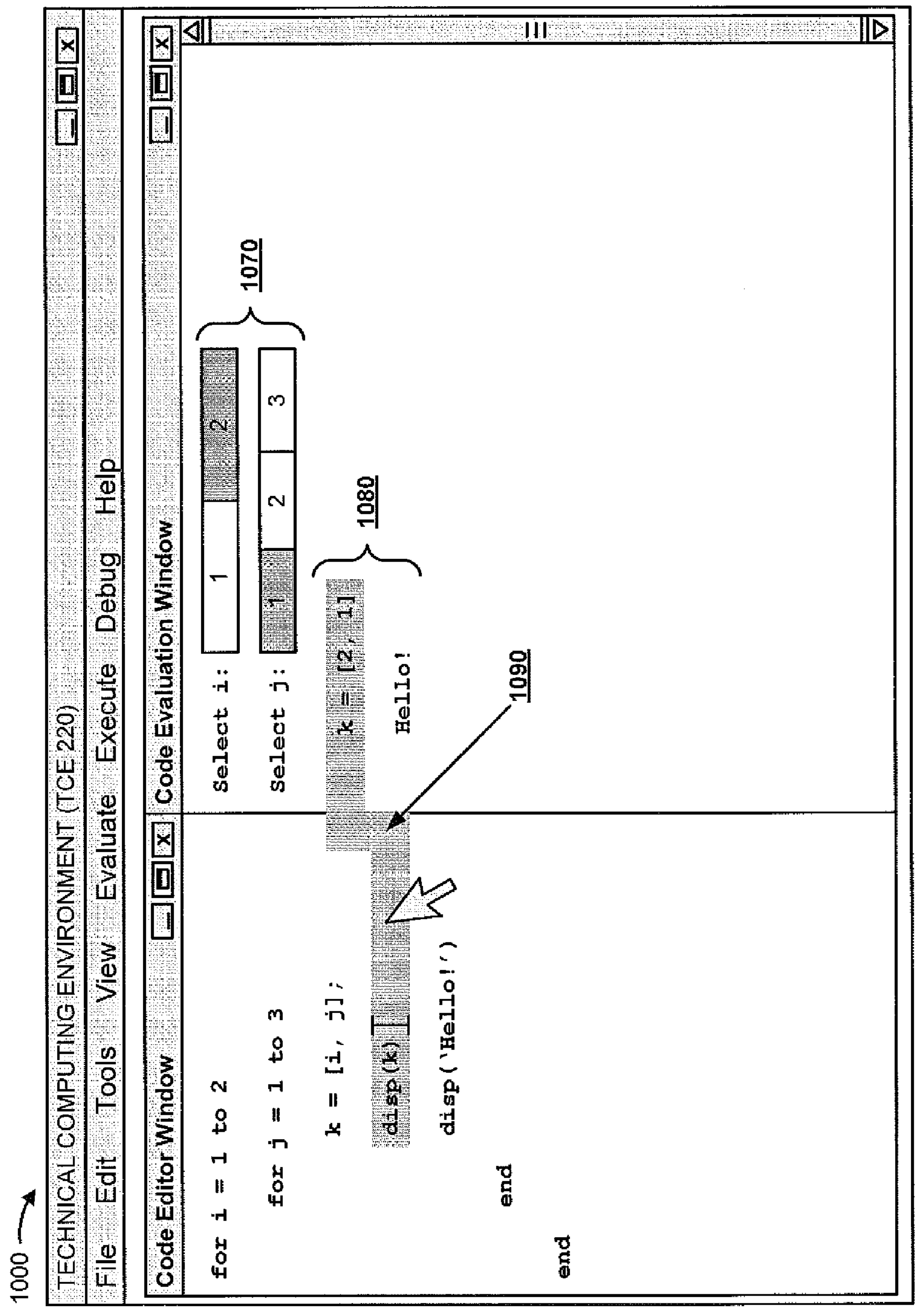

As shown in FIG. 10E, rather than displaying all of the multiple corresponding results at the same time, client device 210 may provide a loop navigator mechanism, as shown by reference number 1070. The loop navigator mechanism permits the user to control a result that is displayed in the code evaluation window and/or indicated using a correspondence indicator. In some implementations, a user may provide input to switch between using a loop navigator mechanism and not using a loop navigator mechanism (e.g., by adjusting a configuration parameter). Additionally, or alternatively, the loop navigator mechanism may be provided differently based on a quantity of loop counter values. For example, the loop navigator mechanism may be provided as a series of buttons, as shown, when the quantity of loop counter values is less than (or less than or equal to) a threshold (e.g., less than ten), and may be provided as a slider when the quantity of loop counter values is greater than or equal to (or greater than) a threshold (e.g., greater than or equal to ten).

As further shown in FIG. 10E, assume that the user has selected a loop counter value of two for loop counter i, and has selected a loop counter value of one for loop counter j. Based on this user input, client device 210 displays results 1080, which are results determined in an iteration of the loop where i=2 and j=1. As shown by reference number 1090, the user may select the line of code that displays the array k (e.g., disp(k)), and client device 210 may provide a correspondence indicator between the selected line of code and the result corresponding to the selected line of code when i=2 and j=1. In this way, client device 210 may reduce the quantity of results displayed in the code evaluation window, and may create free space in the code evaluation window to display results other than results associated with the loop.

As indicated above, FIGS. 10A-10E are provided merely as an example. Other examples are possible and may differ from what was described with regard to FIGS. 10A-10E.

Figure 11:
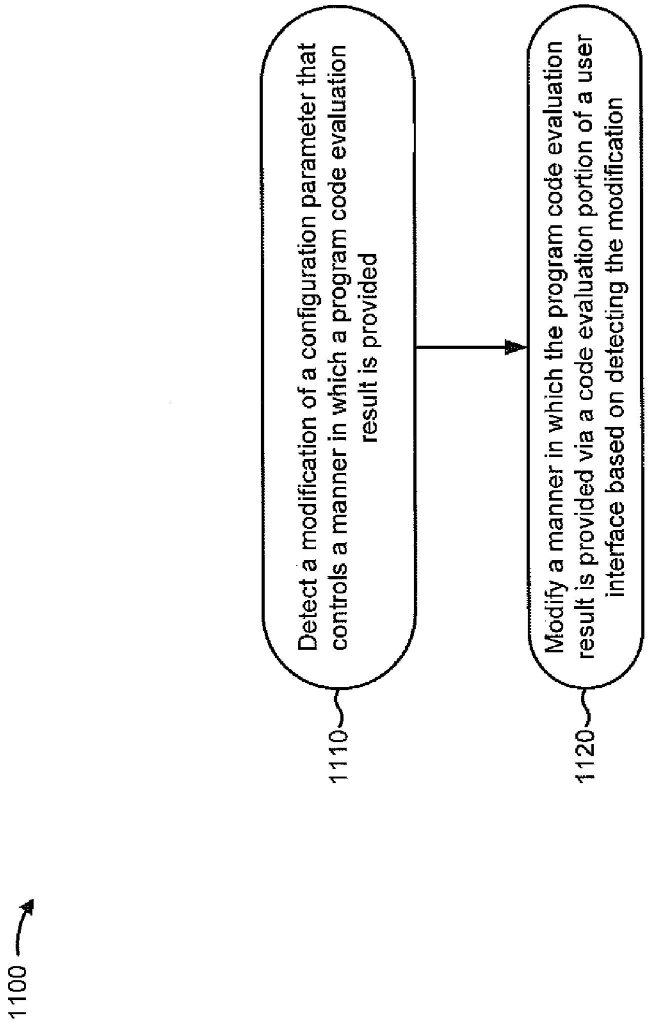
FIG. 11 is a flow chart of an example process for modifying a manner in which program code evaluation results are displayed based on a modification of a configuration parameter.

FIG. 11 is a flow chart of an example process 1100 for modifying a manner in which program code evaluation results are displayed based on a modification of a configuration parameter. In some implementations, one or more process blocks of FIG. 11 may be performed by client device 210. In some implementations, one or more process blocks of FIG. 11 may be performed by another device or a group of devices separate from or including client device 210, such as server device 230.

As shown in FIG. 11, process 1100 may include detecting a modification of a configuration parameter that controls a manner in which a program code evaluation result is provided (block 1110), and modifying a manner in which the program code evaluation result is provided via a code evaluation portion of the user interface based on detecting the modification (block 1120). For example, client device 210 may detect a modification of a configuration parameter (e.g., based on user input identifying information associated with the configuration parameter). The configuration parameter may control a manner in which one or more program code evaluation results are provided and/or displayed (e.g., in the code evaluation window), and/or may control a manner in which one or more portions of program code are provided and/or displayed (e.g., in the code editor window). Based on detecting the modification of the configuration parameter (and/or information identifying a new configuration parameter), client device 210 may modify a manner in which program code evaluation results are provided and/or displayed (e.g., in the code evaluation window), and/or may modify a manner in which one or more portions of program code are provided and/or displayed (e.g., in the code editor window).

A configuration parameter may specify one or more results to be treated as active results, and/or one or more results to be treated as inactive results, in some implementations. For example, a user may provide input indicating that only a result corresponding to a selected portion of code is to be treated as an active result. When this option is selected, client device 210 may provide a correspondence indicator only for the selected portion of code and a result generated by evaluating the selected portion of code, and may not provide a correspondence indicator for inactive results (e.g., other results generated by evaluating other portions of code). Additionally, or alternatively, client device 210 may show (e.g., display), in the code evaluation window, only the result generated by evaluating the selected portion of code (e.g., may hide, or not display, inactive results generated by evaluating other portions of code).

As another example, a user may provide input indicating that a result corresponding to the selected portion of code (e.g., a corresponding result) and other results related to the selected portion of code (e.g., related result(s)) are to be treated as active results. A related result may include a result that is not directly generated by evaluating the selected portion of code, but that is generated by evaluating another portion of code that depends on the selected portion of code (e.g., that depends on the selected portion of code to provide input to the other portion of code). For example, a first line of code may specify a value of a variable (e.g., x=9), and a second line of code may perform a mathematical operation on the variable (e.g., y=x+10), may generate a graph using the variable (e.g., plot(x)), may use the value of the variable as a condition (e.g., if x>4 . . . ), or may otherwise use the variable as an input. Client device 210 may generate a first result (e.g., a corresponding result) by evaluating the first line of code, and may generate a second result (e.g., a related result) by evaluating the second line of code.

In this case, when the user indicates that the corresponding result and related results are to be treated as active results and selects the first line of code, client device 210 may provide a correspondence indicator between the first line of code and both the first result and the second result. Additionally, or alternatively, client device 210 may provide a first correspondence indicator between the first line of code and the first result, and may provide a second correspondence indicator between the second line of code and the second result. Client device 210 may not provide a correspondence indicator for inactive results. Additionally, or alternatively, client device 210 may show the first and second results in the code evaluation window, and may hide inactive results generated by evaluating other portions of code besides the first line of code and the second line of code.

As another example, a user may provide input indicating that only related results are to be treated as active results. When this option is selected and the user selects the first line of code from the example above, client device 210 may provide a correspondence indicator between the second line of code and the second result (e.g., client device 210 may not provide a correspondence indicator for inactive results, such as by not providing a correspondence indicator between the first line of code and the first result). Additionally, or alternatively, client device 210 may show the second result in the code evaluation window, and may hide inactive results, including the first result, generated by evaluating portions of code other than the second line of code.

As another example, a user may provide input indicating that all results are to be treated as active results. When this option is selected, client device 210 may show all results in the code evaluation window.

In some implementations, a user may input a search string, and client device 210 may set portions of program code and/or program code evaluation results associated with the search string (e.g., that include the search string, that are identified by the search string, etc.) as active results. For example, the user may input information identifying a variable (e.g., y), and client device 210 may set program code evaluation results that include the variable as active, and/or may set program code evaluation results generated by evaluating a portion of program code that includes the variable as active.

As discussed above, client device 210 may provide active results in a different manner than inactive results, in some implementations. For example, client device 210 may show (e.g., display) active results, and may hide (e.g., not display) inactive results, based on user input associated with a configuration parameter that specifies whether to show or hide active and/or inactive results. As another example, client device 210 may provide one or more correspondence indicators for active results, and may not provide correspondence indicators for inactive results, based on user input associated with a configuration parameter that specifies whether correspondence indicators are to be displayed for active and/or inactive results.

As another example, client device 210 may display active results in a first user interface portion (e.g., an active results window), and may display inactive results in a second user interface portion (e.g., an inactive results window). As another example, client device 210 may display active results in a first position within a user interface portion (e.g., a left side of the code evaluation window), and may display inactive results in a second position within the user interface portion (e.g., a right side of the code evaluation window). As another example, client device 210 may display active results using a first color, and may display inactive results using a second color, based on user input associated with a configuration parameter that specifies the first color and/or the second color.

In some implementations, client device 210 may display active results more prominently than inactive results. For example, client device 210 may display active results using a first size that is larger than a second size with which inactive results are displayed. As another example, client device 210 may display active results using a first tint, a first shade, and/or a first tone that is different from a second tint, a second shade, and/or a second tone with which inactive results are displayed (e.g., inactive results may be grayed out).

A configuration parameter may specify a degree to which active results are displayed more prominently than inactive results, in some implementations. For example, a user may provide input to adjust the first size of the active results, the second size of the inactive results, and/or a relative size between the active results and the inactive results (e.g., to different sizes or the same size). As another example, the user may provide input to adjust the first tint, shade, and/or tone of the active results, the second tint, shade, and/or tone of the inactive results, and/or a relative tint, shade, and/or tone between the active results and the inactive results (e.g., to different tints, shades, and/or tones, or to the same tint, shade, and/or tone).

In some implementations, a configuration parameter may control a manner in which a correspondence indicator is displayed. The configuration parameter may control a style of the correspondence indicator. For example, a user may provide input specifying whether the correspondence indicator is to highlight a code portion and a corresponding result, outline the code portion and the corresponding result, mark the code portion and the corresponding result (e.g., using a character, a number, a letter, a symbol, etc.), or the like. Additionally, or alternatively, the user may provide input identifying a color for the highlighting, a line style for the outlining, a marking indicator for the marking (e.g., using numbers, letters, etc.), or the like. Client device 210 may display the correspondence indicator based on the configuration parameter.

Additionally, or alternatively, a configuration parameter may control a manner in which one or more correspondence indicators are applied to different types of results and/or corresponding code portions. For example, a first correspondence indicator may be applied to a first result (e.g., of a first result type), and a second correspondence indicator may be applied to a second result (e.g., of a second result type). As another example, a first correspondence indicator may be applied to an active result, and a second correspondence indicator may be applied to an inactive result. As another example, a first correspondence indicator may be applied to a corresponding result (e.g., generated by evaluating a first code portion), and a second correspondence indicator may be applied to a related result (e.g., generated by evaluating a second code portion that receives input based on the first code portion). The different correspondence indicators may be provided using, for example, different colors, different line styles (e.g., solid, dashed, dotted, etc.), different markings (e.g., different numbers, letters, symbols, etc.), or the like. Client device 210 may apply the correspondence indicator to the result (e.g., may display the correspondence indicator) based on the configuration parameter.

A configuration parameter may identify a result type to be shown (e.g., displayed) or hidden (e.g., not displayed), in some implementations. A result type may include, for example, a table, a matrix, an array, a graph, a plot, an image, different types of images, a video, a variable, a variable value, an error message, a help message, a loop result (e.g., a result of executing a FOR loop, a result of executing a WHILE loop, etc.), a mathematical operation result (e.g., a result of executing a mathematical operation), a conditional result (e.g., a result of evaluating code within a conditional statement, such as an IF statement, a SWITCH statement, etc.), a Boolean result (e.g., a TRUE when a conditional statement is satisfied, a FALSE when the conditional statement is not satisfied, etc.), a text-only result (e.g., a result that only displays text), a non-text-only result (e.g., a result that does not display text), a mixed text and non-text result, an out-of-date result (e.g., a result for which corresponding code has been modified or deleted, resulting in a new result that is different from the out-of-date result; a result with an associated value, such as a variable value, that is modified based on input of additional program code; a result associated with stale data that has been updated;

etc.), or the like. A user may provide input associated with a configuration parameter that specifies one or more result types to be shown or hidden, and client device 210 may show or hide results, based on the types of the results and the configuration parameter.

In some implementations, when a particular result is hidden (e.g., not displayed), client device 210 may modify the corresponding code portion to indicate that the result corresponding to the code portion has been hidden. For example, client device 210 may insert a semicolon (;) at the end of a line of code when a result corresponding to that line of code is hidden.

A configuration parameter may permit a user to toggle between different results and/or result types associated with a particular portion of program code, in some implementations. For example, a particular portion of program code may generate a set of values. The user may provide input to toggle between providing the values via a table and/or providing the values via a graph. Based on the user input, client device 210 may display the result using a table, may display the result using a graph, or may display the result using both a table and a graph. In some implementations, client device 210 may select a result type based on a quantity of values associated with a result (e.g., the quantity of values satisfying a threshold). For example, if the result includes fewer than twenty values, then client device 210 may provide the result as a table, and if the result includes twenty or more values, then client device 210 may provide the result as a graph. Additionally, or alternatively, client device 210 may receive input that identifies a result type to be used for a particular type of program code (e.g., a particular function, a particular object, a particular class, program code that generates a particular result, etc.).

A user may modify a configuration parameter to pin a result, in some implementations. Pinning a result may cause client device 210 to display the result in the same position when a user scrolls through the code evaluation window. For example, other results may scroll through the code evaluation window, but the pinned result may remain stationary (e.g., in the same position) while the other results scroll around the pinned result (e.g., move positions). Additionally, or alternatively, pinning a result may cause the result to be shown (e.g., displayed) when the result would otherwise be hidden. For example, a user may pin a result of a particular result type, and may provide input indicating that results of the particular result type are to be hidden. Client device 210 may show the pinned result, and may hide other results of the particular result type.

A user may modify a configuration parameter to pop-out a result into a separate user interface portion (e.g., to display the result in a window separate from the code evaluation window), in some implementations. Client device 210 may hide the popped-out result in the code evaluation window while the popped-out result is displayed in the separate window, or may show the popped-out result in the code evaluation window while the popped-out result is displayed in the separate window. This may allow a user to scroll through the code evaluation window to compare the popped-out result side-by-side with other results. The user may modify the configuration parameter to pop-in the result back into the code evaluation window. For example, the user may close the separate window, which may cause the popped-out result to be popped back into (e.g., displayed in) the code evaluation window.

A configuration parameter may specify that first information, included in a first result, that is a subset of second information included in a second result, is not to be displayed more than once. For example, a first line of code may cause client device 210 to display an image, and a second line of code may specify a title for the image. Rather than displaying the image a first time (e.g., based on the first line of code), and also displaying the image a second time (e.g., along with a title, based on the second line of code), client device 210 may display the image once, along with the title. This may allow for additional space in the code evaluation window for other results to be displayed.

A configuration parameter may specify whether to display results associated with active code portions and/or whether to display results associated with inactive code portions, in some implementations. An active code portion may refer to a portion of code that is executed and/or evaluated when a program that includes the portion of code is executed. An inactive code portion may refer to a portion of code that is not executed and/or evaluated when a program that includes the portion of code is executed. For example, a conditional statement may include a condition, may include an active code portion that is executed when the condition is satisfied, and may include an inactive code portion that is not executed when the condition is satisfied. When the condition is satisfied, client device 210 may show a result of executing the active code portion, and may hide a result of executing the inactive code portion. This may allow a user to easily see portions of program code that are being executed and portions of program code that are not being executed, which may aid in debugging a program.

In some implementations, client device 210 may store one or more configuration parameters (e.g., configuration parameter values) as a user preference, and may apply the stored configuration parameters based on receiving input identifying a user (e.g., when the user logs in to TCE 220, when TCE 220 is loaded on a same client device 210 where the configuration parameters are stored, etc.).

Although FIG. 11 shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

Figure 12B:
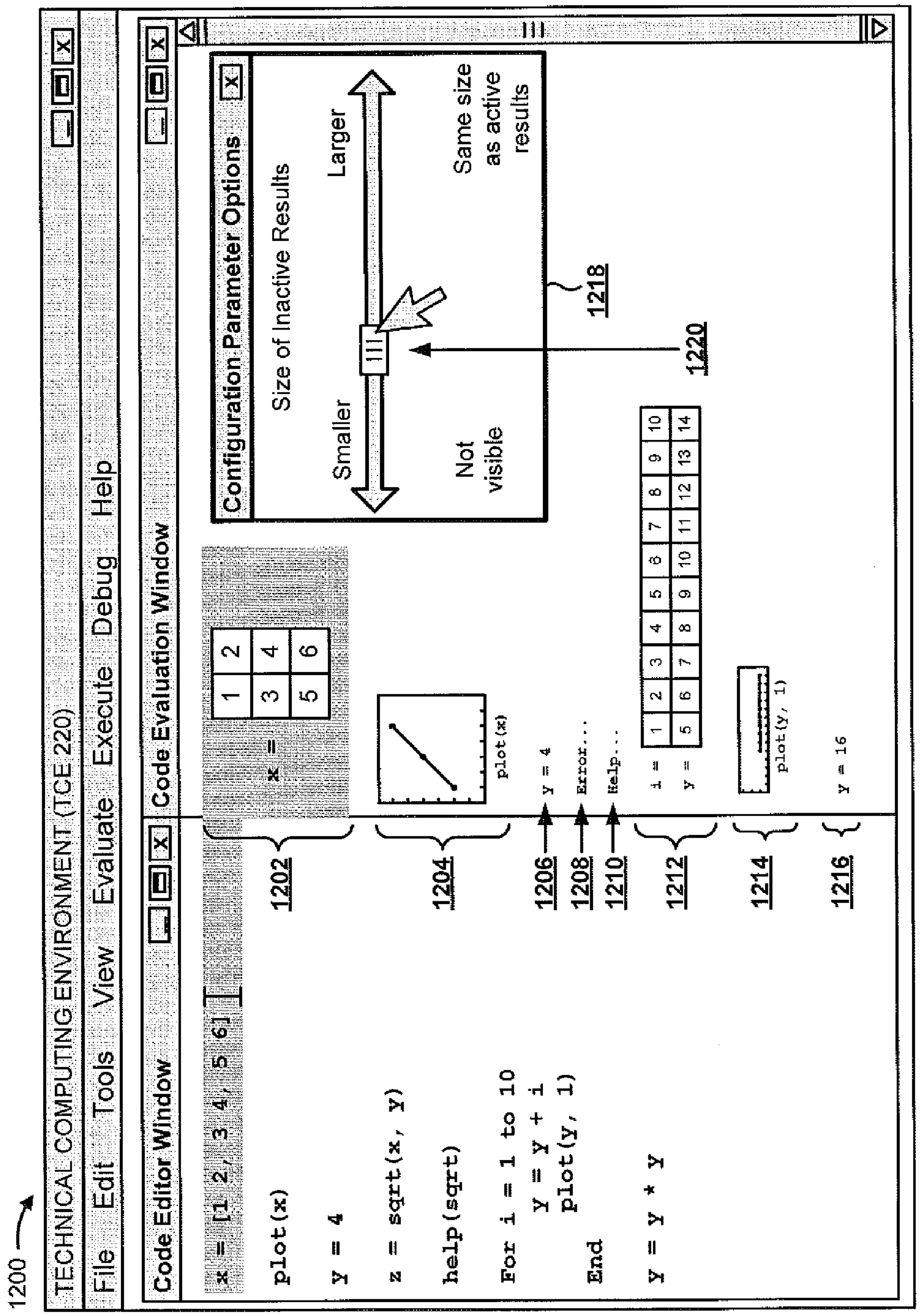
FIGS. 12A-12P are diagrams of an example implementation relating to the example process shown in FIG. 11.
Figure 12C:
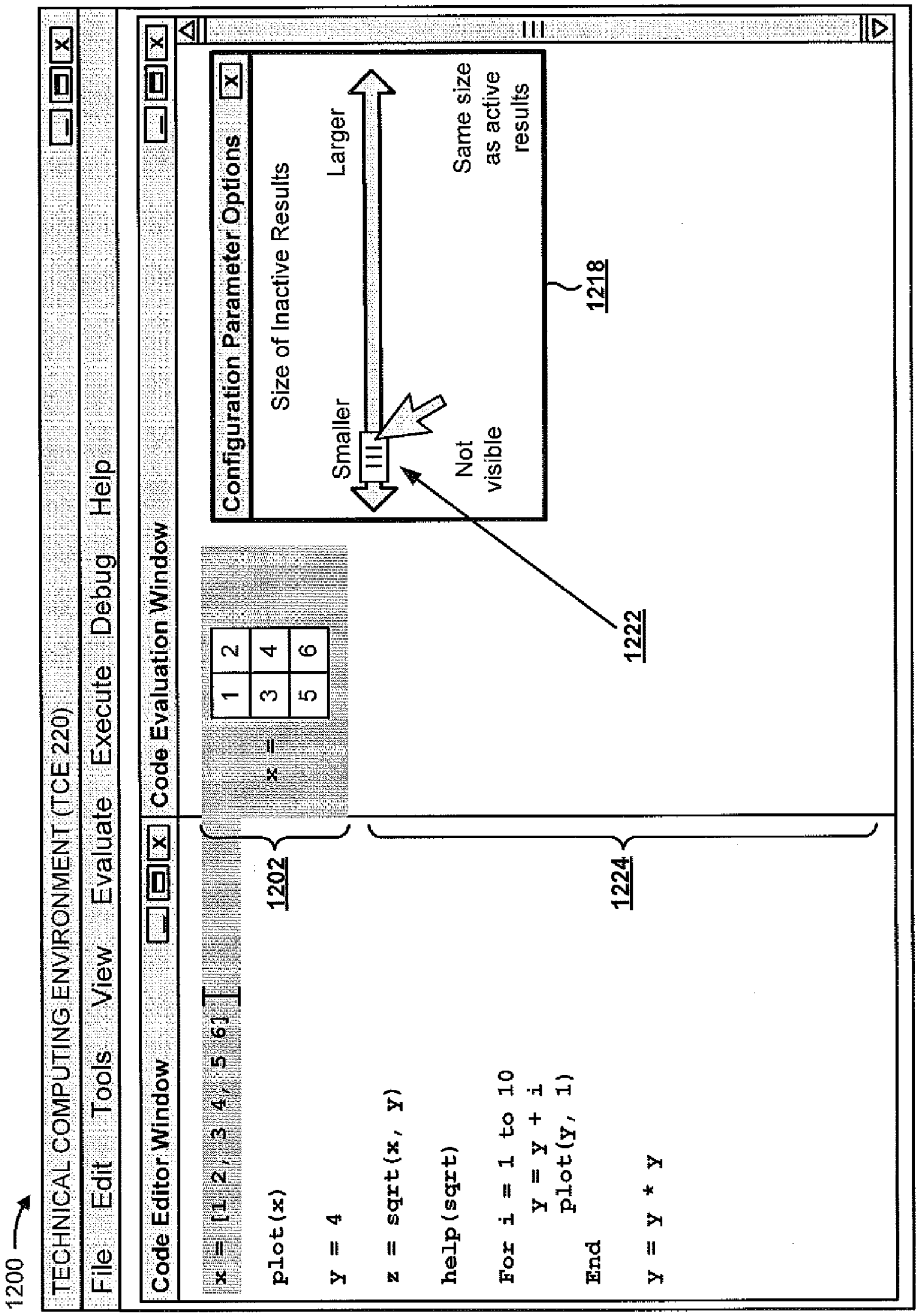
Figure 12D:
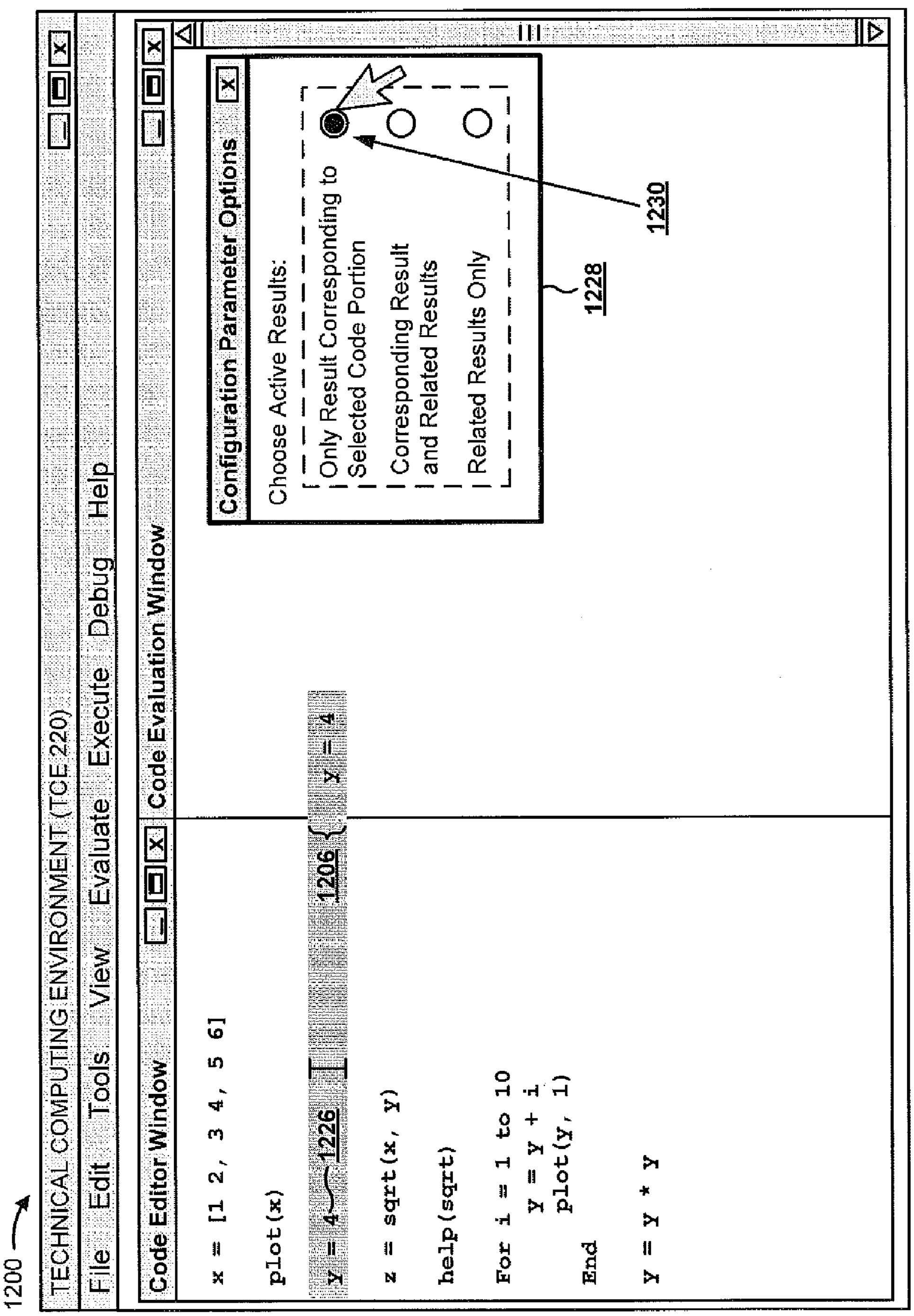
Figure 12E:
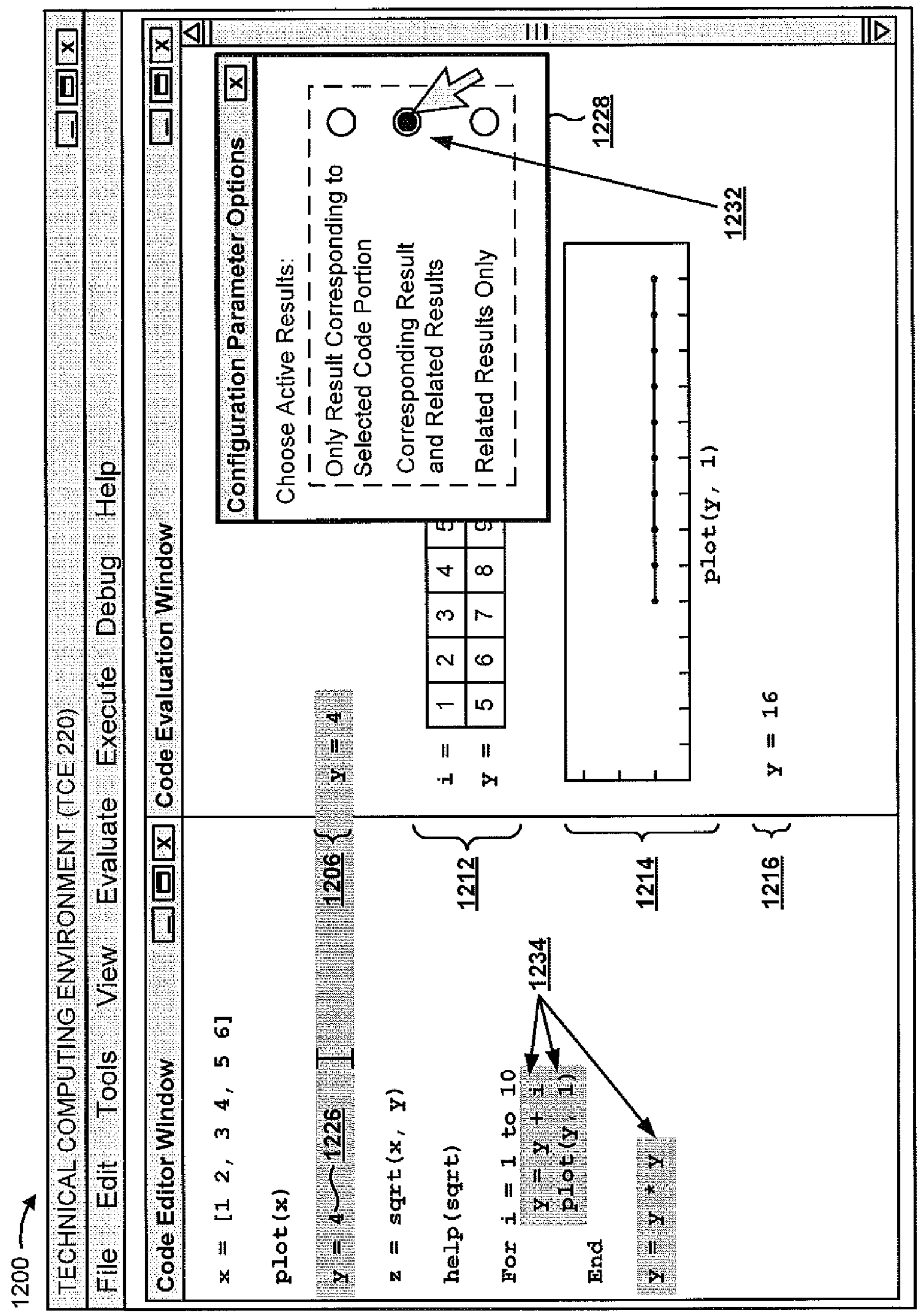
Figure 12F:
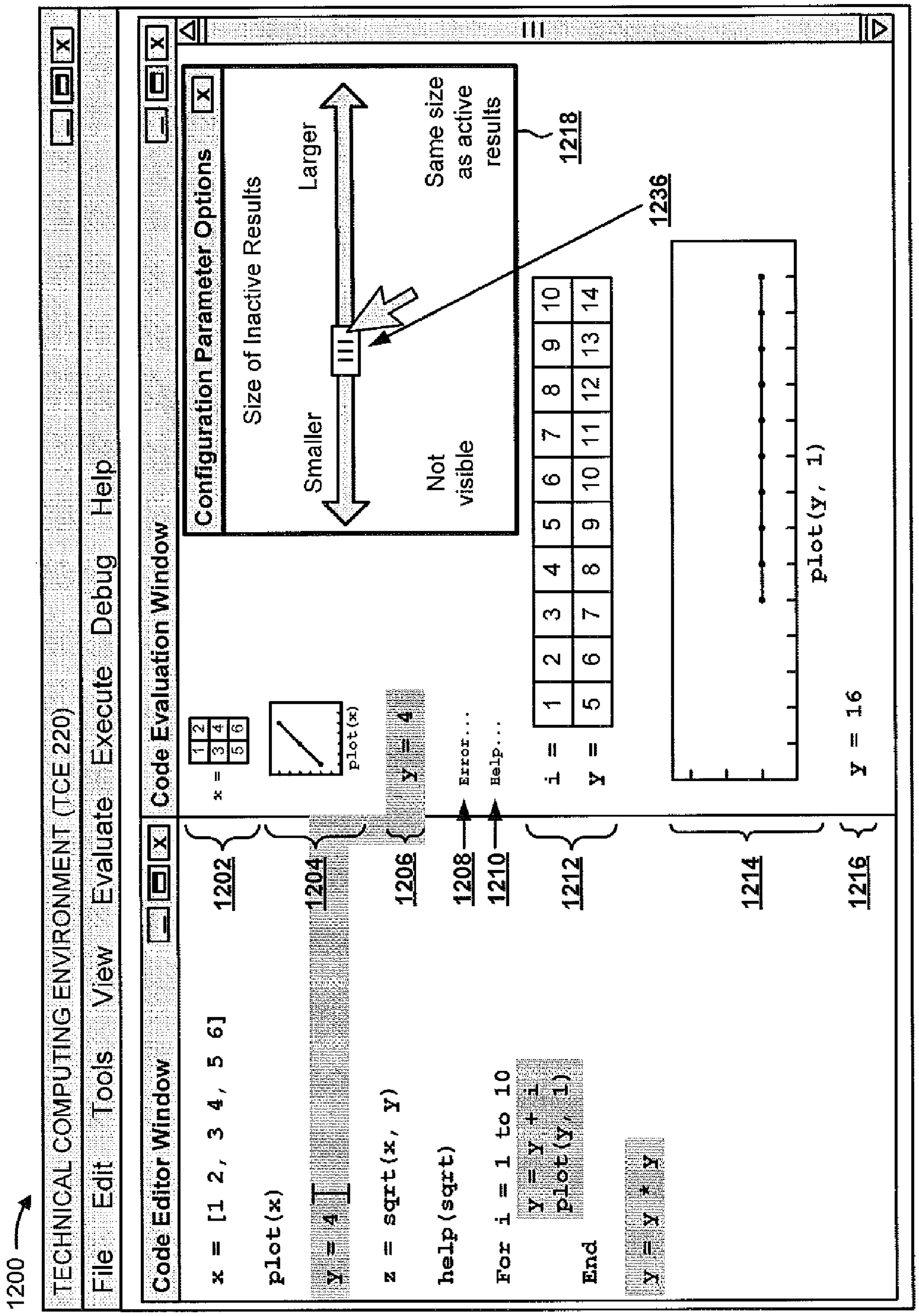
Figure 12G:
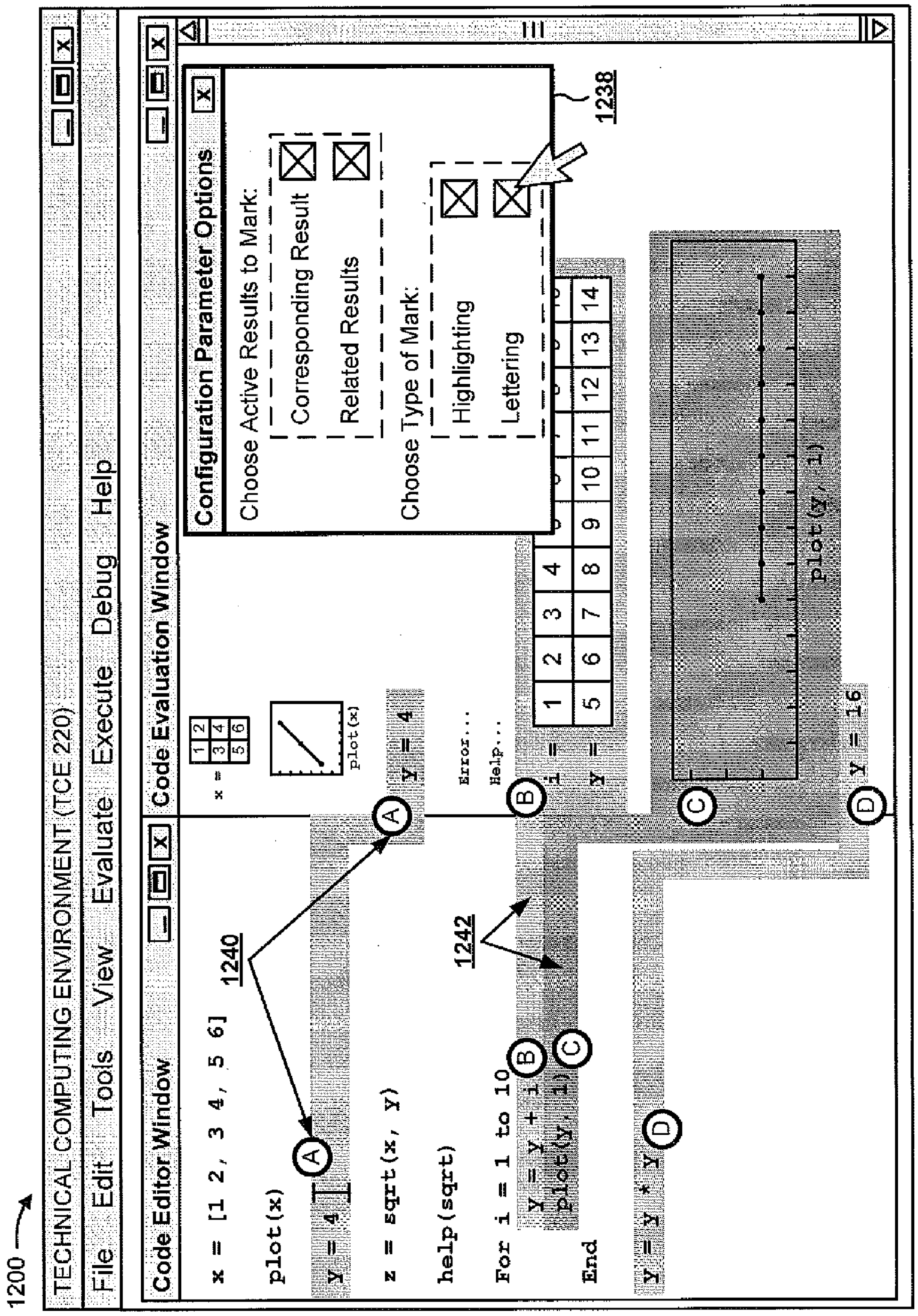
Figure 12H:
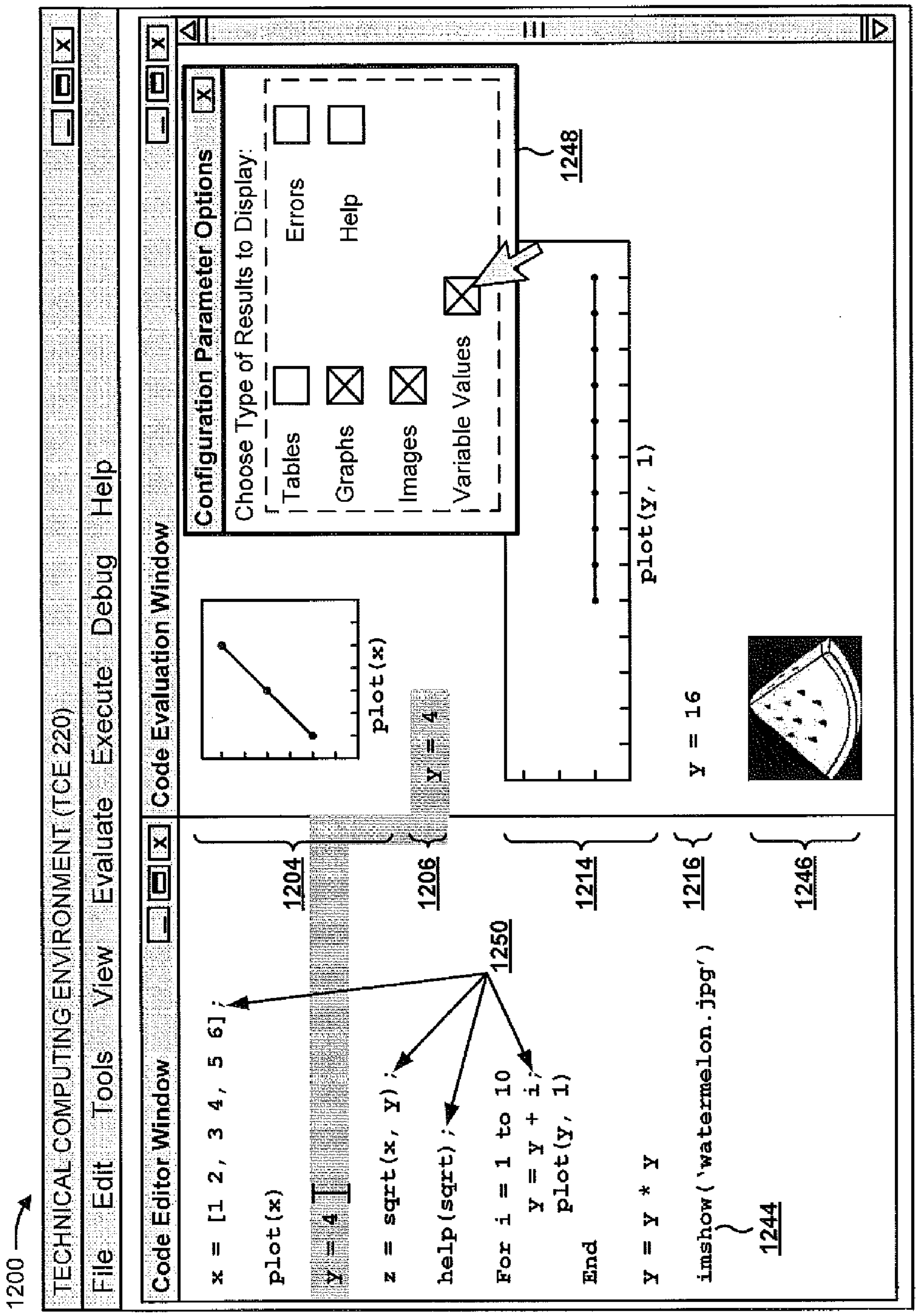
Figure 12I:
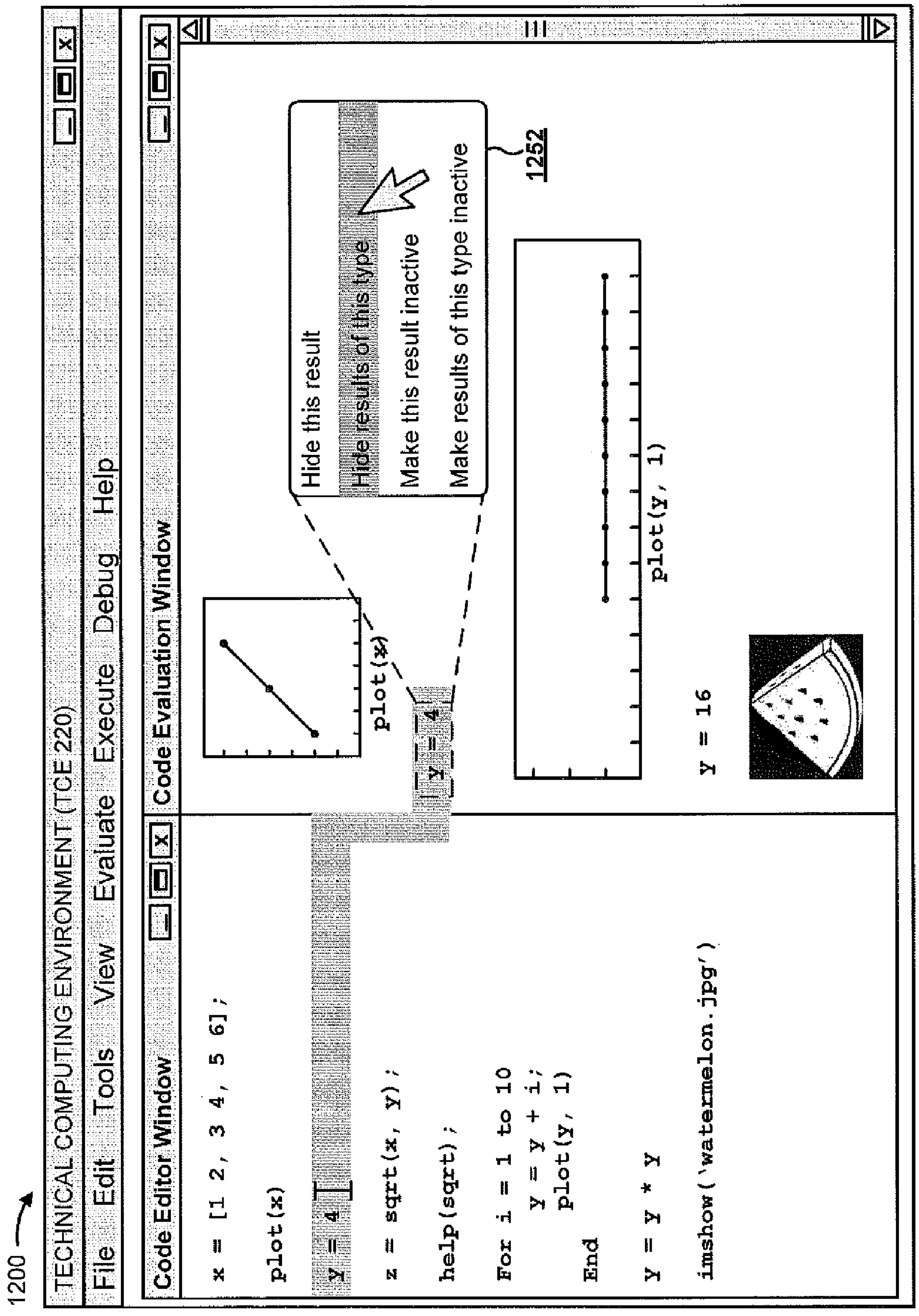
Figure 12J:
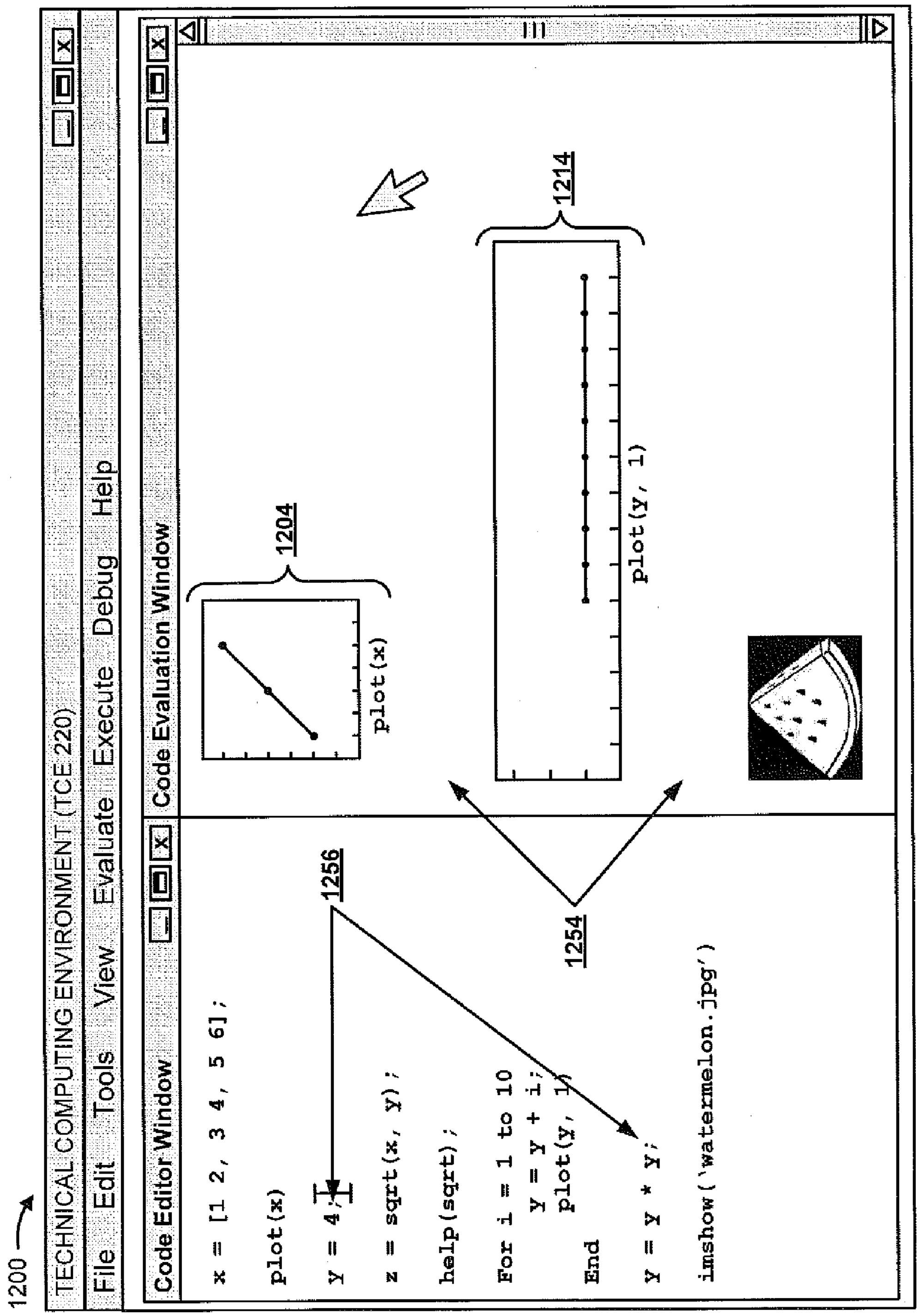
Figure 12K:
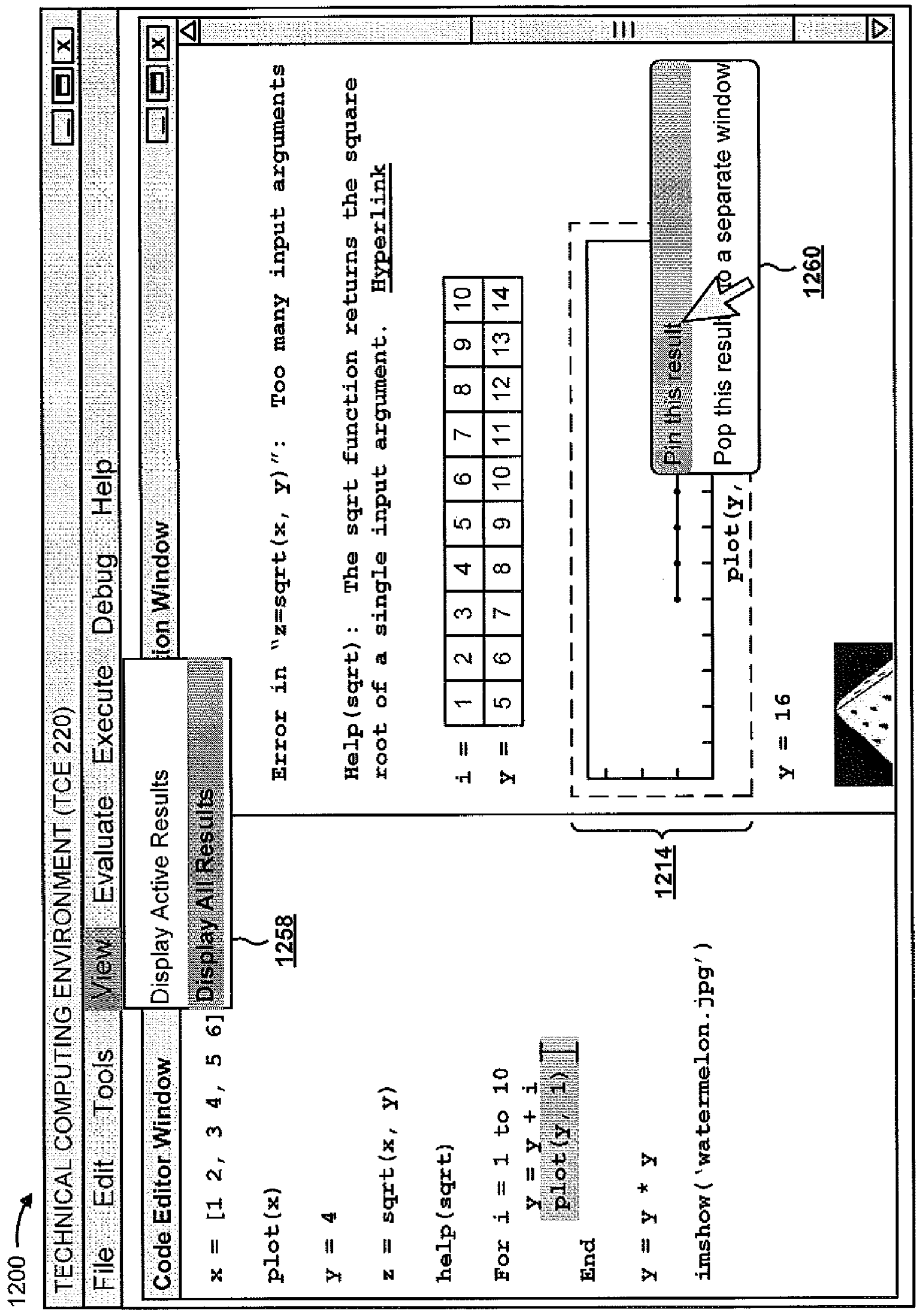
Figure 12L:
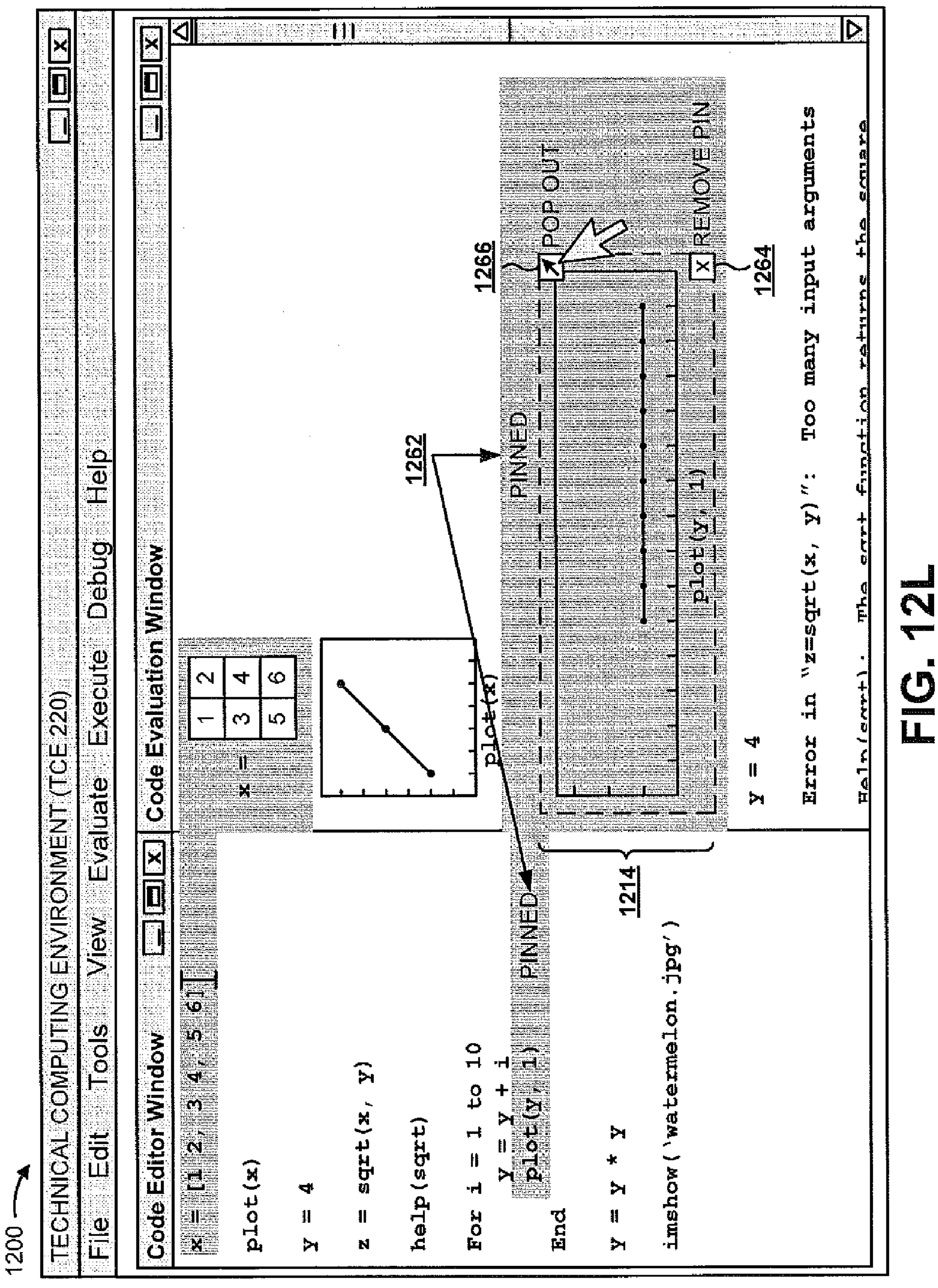
Figure 12M:
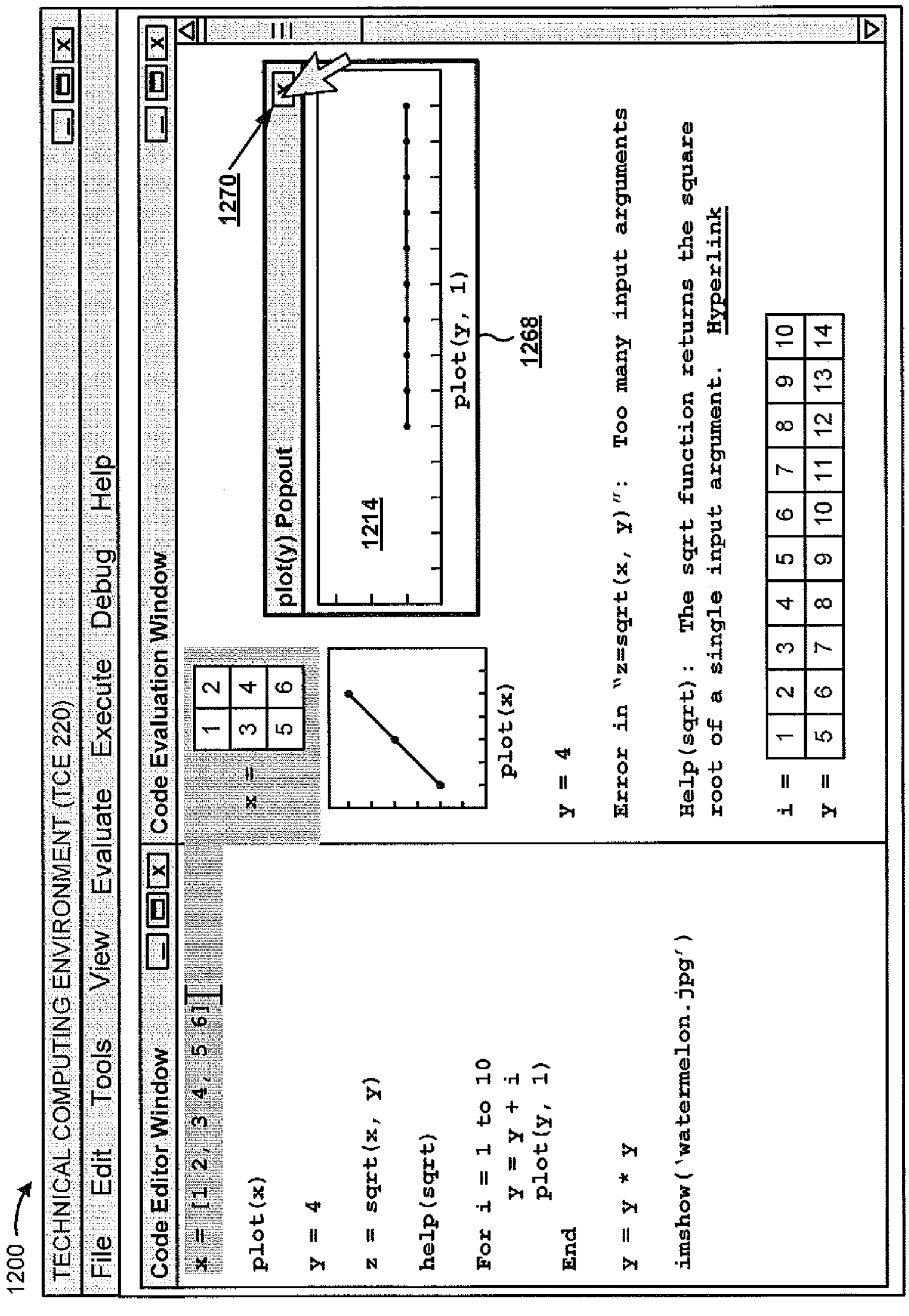
Figure 12N:
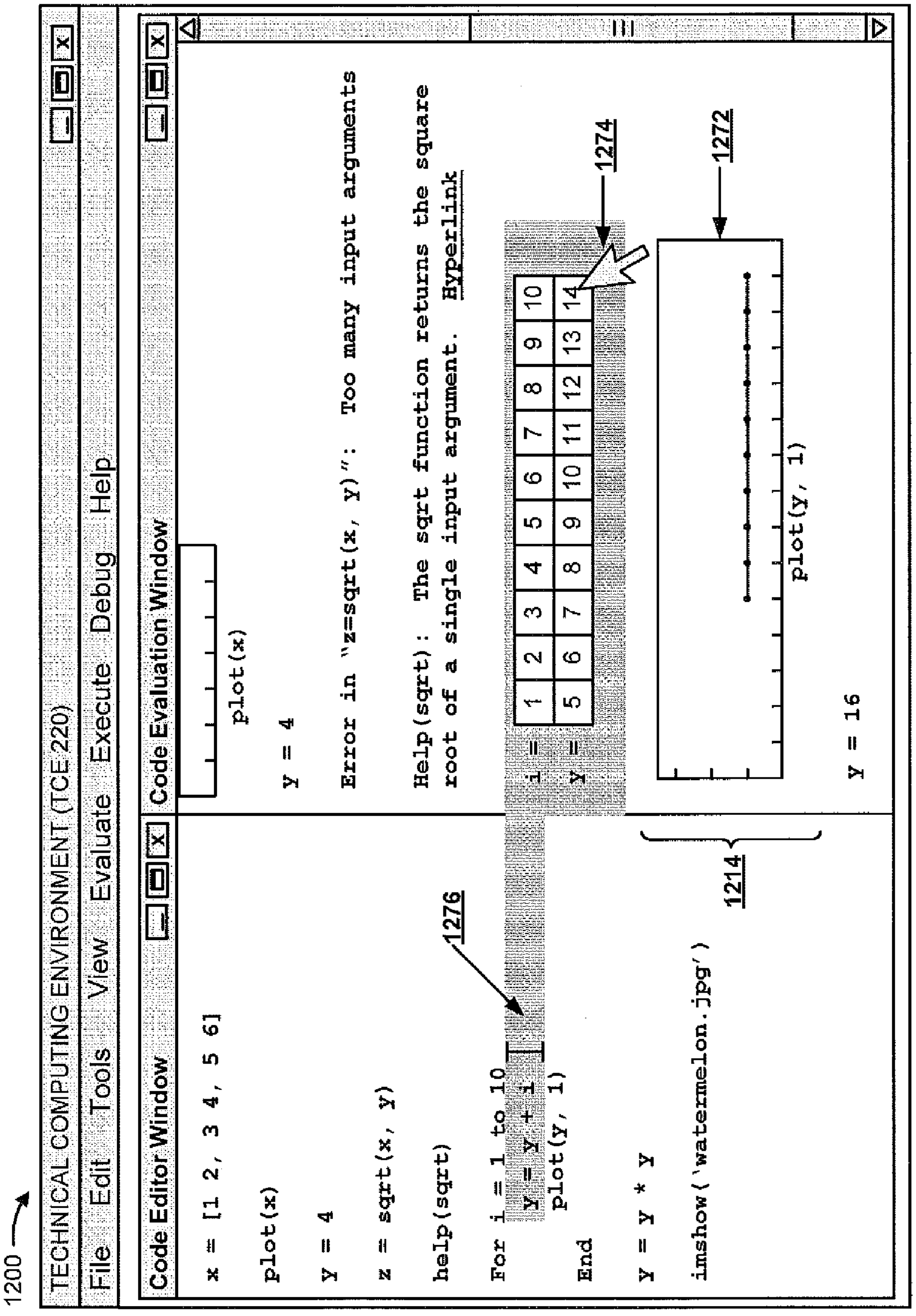
Figure 12O:
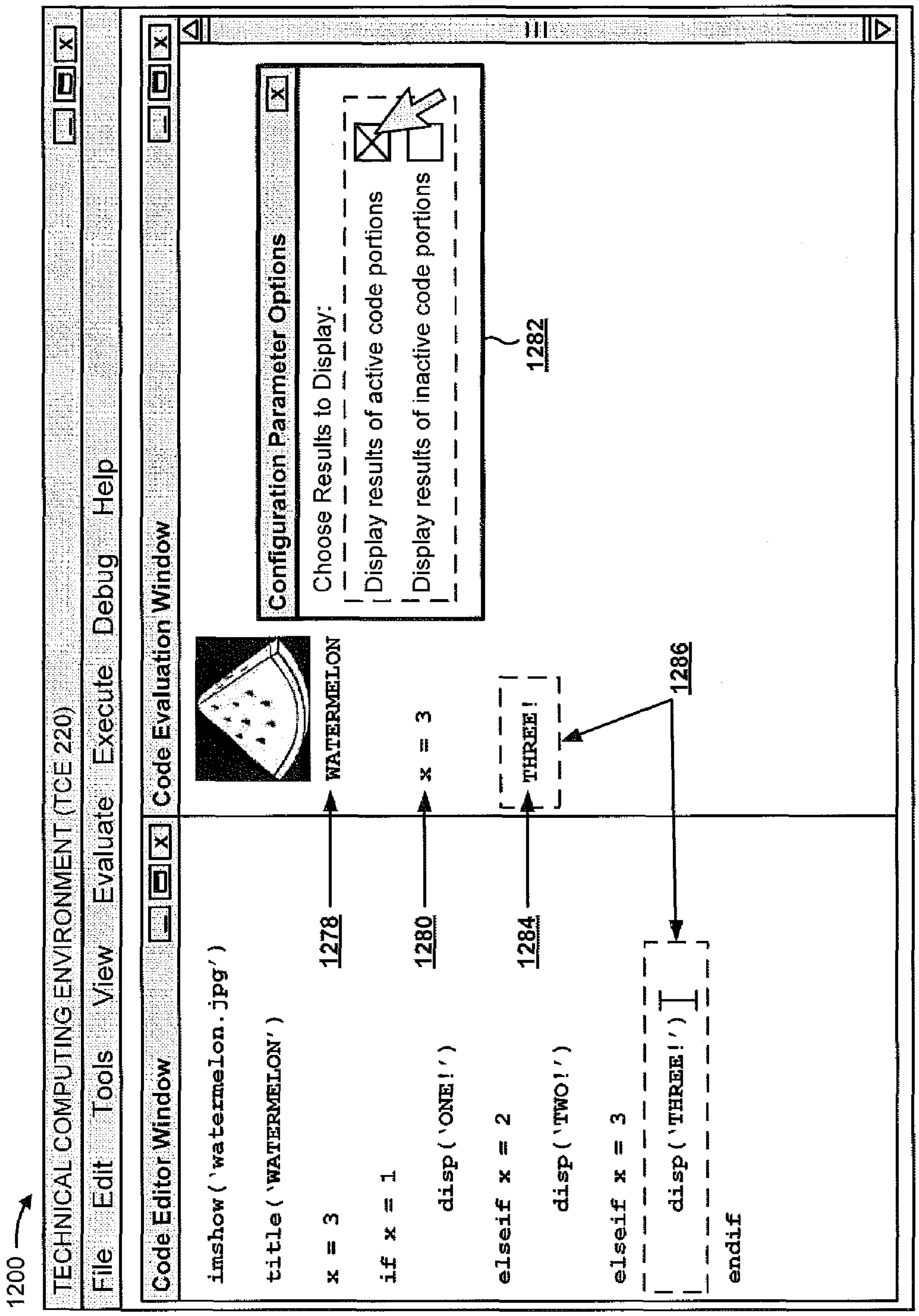
Figure 12P:
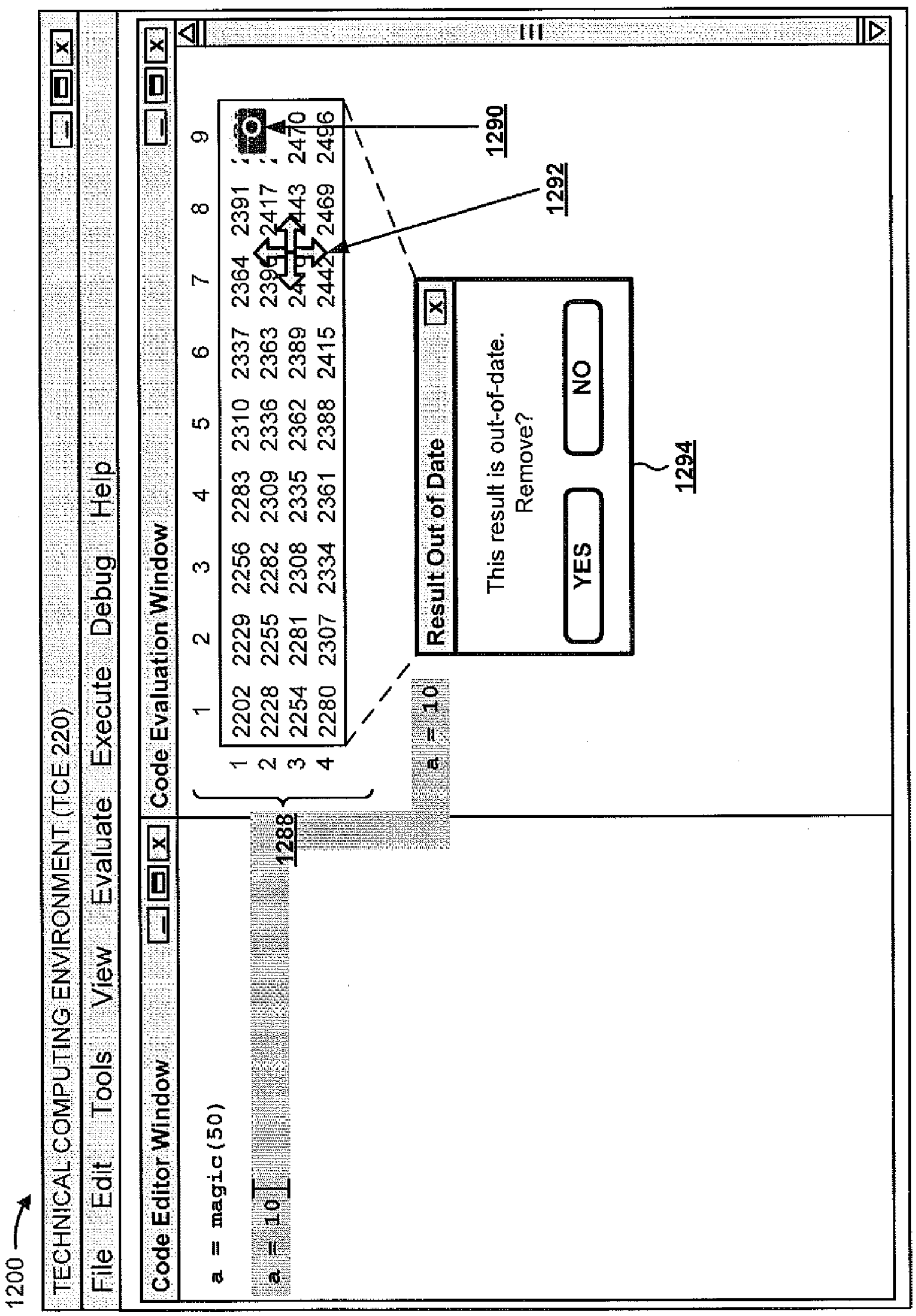

FIGS. 12A-12P are diagrams of an example implementation 1200 relating to example process 1100 shown in FIG. 11. FIGS. 12A-12P depict examples where client device 210 detects user input of a configuration parameter (e.g., modification of a configuration parameter), and modifies a manner in which a portion of program code and/or a program code evaluation result is provided, based on the configuration parameter.

As shown in FIG. 12A, assume that a user has input the following program code into a code editor window of TCE 220:

```
x=[1 2, 3 4, 5 6]
plot(x)
y=4
z=sqrt(x, y)
help(sqrt)
For i=1 to 10
  y=y+i
  plot(y, 1)
End
Y=y*y.
```

As further shown in FIG. 12A, assume that client device 210 has evaluated the program code to generate program code evaluation results corresponding to the evaluated program code. For example, assume that client device 210 evaluates the first line of program code, x=[1 2, 3 4, 5 6], to generate a three by two array stored using the variable x, and provides a result 1202 representing the three by two array stored in x, as shown. Further, assume that client device 210 evaluates the second line of program code, plot(x), to generate a plot based on the three by two array stored in x, and provides a result 1204 representing the plot, as shown. Further, assume that client device 210 evaluates the third line of program code, y=4, to store a value of 4 using the variable y, and provides a result 1206 representing the value stored using y, as shown.

Further, assume that client device 210 evaluates the fourth line of program code, z=sqrt(x, y), and provides a result 1208 representing an error message indicating that the fourth line of program code cannot be executed (e.g., "Error in z=sqrt(x, y): Too many input arguments"). Further, assume that client device 210 evaluates the fifth line of program code, help(sqrt), and provides a result 1210 representing a help message indicating a computing operation performed by the sqrt function, and provides a link to a help document that includes additional help information associated with the sqrt function. Finally, assume that client device 210 evaluates code lines six through nine, associated with a FOR loop (e.g., For i=1 to 10 . . . ), and that client device 210 evaluates the tenth line of program code, y=y*y. Assume that there is not enough space in the code evaluation window to display results of evaluating code lines six through ten (e.g., results 1212, 1214, and 1216, shown in FIG. 12B), but that the user may scroll down to cause these results to be displayed in the code evaluation window. As further shown in FIG. 12A, assume that the user has placed a cursor on the first line of program code, and client device 210 has provided a correspondence indicator to indicate a correspondence between the first line of code and result 1202.

As further shown in FIG. 12A, assume that the user interacts with TCE 220 to cause client device 210 to provide an input mechanism 1218, which permits the user to adjust a configuration parameter that controls a size of inactive results. For example, input mechanism 1218 may include a slider (e.g., a track bar) that may be used to make inactive results larger than, smaller than, or the same size as active results (e.g., by varying degrees of relative size). Additionally, input mechanism 1218 may be used to hide inactive results. As shown in FIG. 12A, assume that a default configuration parameter setting is to display active results and inactive results using the same size.

As shown in FIG. 12B, and by reference number 1220, assume that the user slides an element of the slider to indicate that inactive results are to be displayed using a size that is smaller as compared to the size of active results. Further assume that result 1202 is an active result, and results 1204-1216 are inactive results. As shown, user interaction with the slider (e.g., input mechanism 1218) causes results 1204-1216 to be displayed using a smaller relative size than result 1202 (e.g., compared to the size of results 1204-1210 in FIG. 12A). In this way, the user may be able to view more results in the code evaluation window at a particular time. For example, results 1202-1216 are visible in FIG. 12B, while only results 1202-1210 are visible in FIG. 12A.

As shown in FIG. 12C, and by reference number 1222, assume that the user slides the element of the slider to indicate that inactive results are not to be displayed in the code evaluation window. Further assume that result 1202 is still an active result, and results 1204-1216 are still inactive results. As shown by reference number 1224, user interaction with the slider (e.g., input mechanism 1218) causes results 1204-1216 to be hidden, while result 1202 remains shown (e.g., compared to FIG. 12B, where results 1204-1216 are shown). In this way, the user may choose to display results that correspond to and/or that are related to a selected portion of program code.

As shown in FIG. 12D, assume that the user navigates to a program code portion 1226. For example, the user may click on program code portion 1226, may use arrow keys on a keyboard to navigate to program code portion 1226, or the like. Further, assume that the user interacts with TCE 220 to cause client device 210 to provide an input mechanism 1228, which permits the user to adjust a configuration parameter that controls which results are active results. As shown by reference number 1230, assume that the user has selected that only results corresponding to the selected program code portion (e.g., program code portion 1226) are to be active results. As further shown, based on the user selection of this configuration parameter option, and based on user navigation to program code portion 1226, client device 1220 displays result 1206, and hides other results.

As shown in FIG. 12E, and by reference number 1232, assume that the user has selected that a corresponding result (e.g., a result generated by evaluating program code portion 1226) and related results (e.g., results generated by evaluating program code portions that depend from program code portion 1226) are to be active results. Based on the user selection of this configuration parameter option, and based on user navigation to program code portion 1226, client device 210 displays corresponding result 1206, displays related results 1212, 1214, and 1216, and hides other results. Results 1212-1216 are considered related results because the portions of program code used to generate results 1212-1216 include the variable y, which was first defined in program code portion 1226 (e.g., these portions of program code depend from program code portion 1226). As shown by reference number 1234, client device 210 may provide a correspondence indicator for (e.g., may highlight) the program code portions that depend from program code portion 1226 (e.g., the program code portions that correspond to results 1212-1216) based on the user selection.

As shown in FIG. 12F, assume that the user interacts with TCE 220 to cause client device 210 to provide input mechanism 1218. As shown by reference number 1236, further assume that the user slides the element of the slider to indicate that inactive results are to be displayed using a smaller size than active results (e.g., whereas in FIG. 12E, the inactive results were hidden). Based on the user interaction, and based on the user indicating that a corresponding result and related results are active results, client device 210 may display inactive results 1202, 1204, 1208, and 1210 using a smaller size than active results 1206, 1212, 1214, and 1216 (which remain the same size as shown in FIG. 12E), as shown.

As shown in FIG. 12G, assume that the user interacts with TCE 220 to cause client device 210 to provide an input mechanism 1238, which permits a user to adjust a configuration parameter that controls a marking type to use when marking active results, and a type of result to be considered an active result. As shown, assume that the user has selected to mark a corresponding result and related results, and has further selected to mark the corresponding result and related results using highlighting and lettering. As shown by reference number 1240, based on the user selections, client device 210 uses letters as correspondence indicators (e.g., A, B, C, and D, as shown). As further shown, client device 210 uses highlighting as a further correspondence indicator based on the user selections. As shown by reference number 1242, client device 210 may use different color highlighting to indicator a correspondence between different program code portions and respective results. In some implementations, client device 210 may use different color highlighting for adjacent correspondence indicators (e.g., correspondence indicators associated with adjacent program code portions and/or adjacent results) to differentiate the correspondence indicators.

As shown in FIG. 12H, assume that the user inputs a new program code portion 1244, shown as imshow('watermelon.jpg). Further, assume that client device 210 evaluates program code portion 1244 to generate a result 1246, which is an image of a watermelon, loaded from memory by client device 210 (e.g., from a memory location identified by watermelon.jpg). Further, assume that the user interacts with TCE 220 to cause client device 210 to provide an input mechanism 1248, which permits the user to adjust a configuration parameter that controls one or more result types to display (e.g., a table, a graph, an image, a variable value, an error message, a help message, etc.).

As shown, assume that the user has selected to display results with a result type of graph, image, or variable value. Based on the user selections, client device 210 may display result 1204 (e.g., a graph), result 1206 (e.g., a variable value), result 1214 (e.g., a graph), result 1216 (e.g., a variable value), and result 1246 (e.g., an image). Also based on the user selections, client device 210 may not display result 1202 (e.g., a table), result 1208 (e.g., an error message), result 1210 (e.g., a help message), and result 1212 (e.g., a table). As shown by reference number 1250, client device 210 may modify program code portions corresponding to the hidden results (e.g., results 1202, 1208, 1210, and 1212), such as by inserting a semicolon (;) at the end of the corresponding program code portions. In some implementations, client device 210 may hide a result when a user inserts a semicolon (or one or more other characters) at the end of a corresponding line of program code. The user may learn about this technique for hiding results by observing that client device 210 inserts the semicolon when the user selects to hide results.

As shown in FIG. 12I, assume that the user interacts with TCE 220 to cause client device 210 to provide an input mechanism 1252, which permits the user to adjust a configuration parameter that controls one or more result types to display. For example, a user may select a particular result by right-clicking on the particular result, which may cause client device 210 to display input mechanism 1252. The user may interact with input mechanism 1252 to hide the particular result, to hide results of the same type as the particular result, to make the particular result inactive, to make results of the same type as the particular result inactive, to make the particular result active, to make results of the same type as the particular result active, or the like. As shown, assume that the user selects to hide results of the same type as the result y=4 (e.g., to hide variable values).

As shown in FIG. 12J, and by reference number 1254, based on the user selection, client device 210 causes result 1206 (e.g., y=4, a variable value) and result 1216 (e.g., y=16, a variable value) to be hidden. As shown by reference number 1256, client device 210 has inserted a semicolon (;) at the end of the respective program code portions corresponding to results 1206 and 1216. As further shown, client device 210 has removed the correspondence indicator between the program code y=4 and result 1206 because result 1206 is no longer displayed. In some implementations, client device 210 may provide a correspondence indicator between the program code y=4 and an area of the code evaluation window between result 1204 and result 1214 (e.g., a blank space between the results), to indicate that result 1206 has been hidden.

As shown in FIG. 12K, assume that the user interacts with TCE 220 to cause client device 210 to display all results, as shown by reference number 1258. Further, assume that the user interacts with TCE 220 to cause client device 210 to provide an input mechanism 1260, which permits the user to adjust a configuration parameter that controls whether to pin a result and/or whether to pop-out a result into a separate window. For example, the user may right-click on result 1214, which may cause client device 210 to provide input mechanism 1260. Assume that the user selects to pin result 1214, as shown.

As shown in FIG. 12L, and by reference number 1262, client device 210 may pin result 1214 based on the user selection, and may display a pin indicator (e.g., "PINNED") that indicates that result 1214 has been pinned. Pinning result 1214 may cause client device 210 to display result 1214 in the same position when a user scrolls through the code evaluation window. For example, assume that the user has scrolled up in the code evaluation window in FIG. 12L, as compared to FIG. 12K. However, result 1214 has remained in the same position, while the other results have scrolled around result 1214. As further shown, client device 210 may provide an input mechanism 1264 that permits the user to unpin result 1214 (e.g., resume normal scrolling behavior). As further shown, client device 210 may provide an input mechanism 1266 that permits the user to pop-out result 1214 into a separate window.

As shown in FIG. 12M, assume that the user interacts with input mechanism 1266 to pop-out result 1214 into a pop-out window 1268. As further shown, client device 210 has removed result 1214 from the code evaluation window. In this way, the user may scroll results provided in the code evaluation window to compare popped-out result 1214 to other results, provided in the code evaluation window. Assume that the user interacts with an input mechanism 1270 that causes client device 210 to close pop-out window 1268.

As shown in FIG. 12N, based on user interaction with input mechanism 1270, client device 210 pops result 1214 back into the code evaluation window, as shown by reference number 1272. As further shown in FIG. 12N, and by reference number 1274, a user may select a result in the code evaluation window, which may cause a correspondence indicator to be displayed between the selected result and a corresponding portion of program code, as shown by reference number 1276.

As shown in FIG. 12O, assume that the user has input the following program code into the code editor window of TCE 220:

```
imshow('watermelon.jpg')
title('WATERMELON')
x=3
if x=1
    disp('ONE!')
elseif x=2
    disp('TWO!')
elseif x=3
    disp('THREE!')
endif.
```

As further shown in FIG. 12O, assume that client device 210 evaluates the program code to generate program code evaluation results corresponding to the evaluated program code. For example, assume that client device 210 evaluates the first line of program code, imshow('watermelon.jpg'), to load an image of a watermelon. Further, assume that client device 210 evaluates a second line of program code, title (‘WATERMELON’), to generate a title for the loaded watermelon.jpg image. Client device 210 may insert the title in a position associated with the loaded image (e.g., above, below, etc.), without displaying the loaded image again. For example, as shown by reference number 1278, client device 210 may insert the title below the image.

As further shown in FIG. 12O, assume that client device 210 evaluates a third line of program code, x=3, to store a value of 3 using the variable x, and provides a result 1280 representing the value stored using x, as shown.

As further shown in FIG. 12O, assume that the user interacts with TCE 220 to cause client device 210 to provide an input mechanism 1282, which permits the user to adjust a configuration parameter that controls whether to display results corresponding to active code portions, inactive code portions, or both. Assume that the user selects to display results corresponding to active code portions. Based on the user selection, client device 210 may display a result 1284 (e.g., “THREE!”) based on determining that the line of program code disp(‘THREE!’) is active (e.g., is executed when x=3). Client device 210 may hide results corresponding to the lines of program code disp(‘ONE!’) and disp (‘TWO!’) because these lines of code are inactive (e.g., are not executed when x=3). As shown by reference number 1286, client device 210 may display a correspondence indicator (e.g., a box with a dotted outline) to indicate a correspondence between the active code (e.g., disp (‘THREE!’)) and result 1284.

As shown in FIG. 12P, assume that the user inputs program code a=magic(50), which causes client device 210 to display a result 1288, which represents a table of values for a 50×50 magic square. At a later time, assume that the user inputs a new line of program code a=10, which causes a value of 10 to replace the magic square stored by the variable a. Based on the user input of the new line of program code, result 1288 becomes out-of-date. As shown by reference number 1290, client device 210 may provide an out-of-date indicator (e.g., a camera icon) to indicate that result 1288 is out-of-date. However, as shown by reference number 1292, the user may still be permitted to interact with out-of-date result 1288 (e.g., by scrolling, zooming, clicking to view more detail, etc.). In some implementations, client device 210 may provide an input mechanism 1294 that permits the user to remove out-of-date result 1288 and/or to adjust a configuration parameter that controls whether out-of-date results are displayed.

As indicated above, FIGS. 12A-12P are provided merely as an example. Other examples are possible and may differ from what was described with regard to FIGS. 12A-12P.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles “a” and “an” are intended to include one or more items, and may be used interchangeably with “one or more.” Also, as used herein, the term “set” is intended to include one or more items, and may be used interchangeably with “one or more.” Where only one item is intended, the term “one” or similar language is used. Further, the phrase “based on” is intended to mean “based, at least in part, on” unless explicitly stated otherwise.

What is claimed is:

1. A computer-readable medium storing instructions, the instructions comprising:

one or more instructions that, when executed by one or more processors, cause the one or more processors to:
receive an indication to evaluate a plurality of portions of program code provided via a user interface;
evaluate the plurality of portions of program code based on receiving the indication to evaluate the plurality of portions of program code;
determine a plurality of results based on evaluating the plurality of portions of program code,
each result, of the plurality of results, being associated with a respective portion of program code of the plurality of portions of program code; and
provide the plurality of results via the user interface based on determining the plurality of results,
the plurality of results being provided in a manner that indicates a correspondence between a result, of the plurality of results, and a corresponding portion of program code, of the plurality of portions of program code.

2. The computer-readable medium of claim 1, where the plurality of portions of program code are provided via a first portion of the user interface; and where the one or more instructions, that cause the one or more processors to provide the plurality of results, further cause the one or more processors to:
provide the plurality of results via a second portion of the user interface,
the second portion being different from the first portion.

3. The computer-readable medium of claim 2, where the one or more instructions further cause the one or more processors to:

receive an indication to switch from providing the plurality of portions of program code and the plurality of results in different portions of the user interface to providing the plurality of results in-line with the plurality of portions of program code; and
provide the plurality of results in-line with the plurality of portions of program code based on receiving the indication to switch.

4. The computer-readable medium of claim 1, where the one or more instructions, that cause the one or more processors to provide the plurality of results, further cause the one or more processors to:

provide the plurality of results in-line with the plurality of portions of program code.

5. The computer-readable medium of claim 4, where the one or more instructions further cause the one or more processors to:

receive an indication to switch from providing the plurality of results in-line with the plurality of portions of program code to providing the plurality of portions of program code and the plurality of results in different portions of the user interface; and provide the plurality of portions of program code via a first portion of the user interface and provide the plurality of results in a second portion of the user interface based on receiving the indication to switch, the first portion being different from the second portion.

6. The computer-readable medium of claim 1, where the one or more instructions, that cause the one or more processors to provide the plurality of results, further cause the one or more processors to:

provide the plurality of results in a same window, of the user interface, as the plurality of portions of program code.

7. The computer-readable medium of claim 1, where the one or more instructions, that cause the one or more processors to provide the plurality of results, further cause the one or more processors to:

provide the plurality of results in a different window, of the user interface, than the plurality of portions of program code.

8. The computer-readable medium of claim 1, where the one or more instructions, that cause the one or more processors to evaluate the plurality of portions of program code, further cause the one or more processors to:

generate at least one of:

a first result based on execution of a portion of program code included in the plurality of portions of program code, a second result that identifies an error associated with the portion of program code, or a third result that includes help information associated with the portion of program code; and where the plurality of results includes at least one of:

the first result, the second result, or the third result.

9. A computer-implemented method, comprising:

evaluating a plurality of portions of program code presented for display via a user interface, the evaluating being performed by one or more devices;

determining a plurality of results based on evaluating the plurality of portions of program code, each result, of the plurality of results, being associated with a respective portion of program code of the plurality of portions of program code, the determining being performed by the one or more devices; and presenting the plurality of results for display via the user interface based on determining the plurality of results, the plurality of results being presented in a manner that indicates a correspondence between a result, of the plurality of results, and a corresponding portion of program code of the plurality of portions of program code, the presenting the plurality of results being performed by the one or more devices.

10. The computer-implemented method of claim 9, further comprising:

detecting an interaction with the corresponding portion of program code; and presenting a correspondence indicator, that indicates the correspondence between the result and the corresponding portion of program code, based on detecting the interaction with the corresponding portion of program code.

11. The computer-implemented method of claim 9, further comprising:

detecting an interaction with the result; and presenting a correspondence indicator, that indicates the correspondence between the result and the corresponding portion of program code, based on detecting the interaction with the result.

12. The computer-implemented method of claim 9, where presenting the plurality of results comprises:

presenting the plurality of results in a separate portion of the user interface than the plurality of portions of program code, such that the plurality of results are not interlaced with the plurality of portions of program code.

13. The computer-implemented method of claim 12, further comprising:

receiving an indication to switch from presenting the plurality of results in the separate portion to presenting the plurality of results in a same portion of the user interface as the plurality of portions of program code; and presenting the plurality of results in the same portion of the user interface as the plurality of portions of program code based on receiving the indication to switch.

14. The computer-implemented method of claim 9, where presenting the plurality of results comprises:

presenting the plurality of results in a same portion of the user interface as the plurality of portions of program code, such that the plurality of results are interlaced with the plurality of portions of program code.

15. The computer-implemented method of claim 14, further comprising:

receiving an indication to switch from presenting the plurality of results in the same portion to presenting the plurality of results in a separate portion of the user interface than the plurality of portions of program code; and presenting the plurality of results in the separate portion of the user interface based on receiving the indication to switch.

16. A device, comprising:

one or more processors to:

receive an indication to evaluate a first portion of program code and a second portion of program code provided via a user interface;

cause the first portion of program code and the second portion of program code to be evaluated based on receiving the indication to evaluate the first portion of program code and the second portion of program code;

determine a first result corresponding to the first portion of program code and a second result corresponding to the second portion of program code based on causing the first portion of program code and the second portion of program code to be evaluated; and provide the first result and the second result, via the user interface, in a manner that indicates a first correspondence between the first result and the first portion of program code and that indicates a second correspondence between the second result and the second portion of program code.

17. The device of claim 16, where the one or more processors, when providing the first result and the second result, are to:

provide the first result and the second result in a separate window of the user interface than the first portion of program code and the second portion of program code.

18. The device of claim 17, where the one or more processors are further to:

receive an indication to switch from providing the first result and the second result in the separate window to providing the first result and the second result in a same window of the user interface as the first portion of program code and the second portion of program code; and provide the first result and the second result in the same window of the user interface as the first portion of program code and the second portion of program code based on receiving the indication to switch.

19. The device of claim 16, where the one or more processors, when providing the first result and the second result, are to:

provide the first result and the second result in a same window of the user interface as the first portion of program code and the second portion of program code.

20. The device of claim 19, where the one or more processors are further to:

receive an indication to switch from providing the first result and the second result in the same window to providing the first result and the second result in a separate window of the user interface than the first portion of program code and the second portion of program code; and provide the first result and the second result in the separate window of the user interface than the first portion of program code and the second portion of program code based on receiving the indication to switch.

* * * * *